United States Patent
Owada et al.

(10) Patent No.: US 11,668,381 B2
(45) Date of Patent: Jun. 6, 2023

(54) TRANSMISSION STRUCTURE

(71) Applicant: Kanzaki Kokyukoki Mfg. Co., Ltd., Amagasaki (JP)

(72) Inventors: Kazuhiro Owada, Amagasaki (JP); Koji Iwaki, Amagasaki (JP); Ryo Motooka, Amagasaki (JP); Kohei Ogura, Amagasaki (JP); Takumi Takahashi, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 17/867,641

(22) Filed: Jul. 18, 2022

(65) Prior Publication Data
US 2023/0014393 A1     Jan. 19, 2023

(30) Foreign Application Priority Data

Jul. 19, 2021 (JP) .............................. JP2021-118386
Jun. 22, 2022 (JP) .............................. JP2022-100246

(51) Int. Cl.
| | | |
|---|---|---|
| *F16H 61/462* | (2010.01) | |
| *F16H 3/44* | (2006.01) | |
| *F16H 47/04* | (2006.01) | |
| *F16H 61/30* | (2006.01) | |
| *F16H 61/46* | (2010.01) | |
| *F16H 61/682* | (2006.01) | |

(52) U.S. Cl.
CPC .............. *F16H 47/04* (2013.01); *F16H 61/30* (2013.01); *F16H 61/46* (2013.01); *F16H 61/682* (2013.01)

(58) Field of Classification Search
CPC ........ F16H 61/682; F16H 61/46; F16H 61/30; F16H 47/04
See application file for complete search history.

(56) References Cited

U.S. PATENT DOCUMENTS

| | | | | |
|---|---|---|---|---|
| 8,308,597 | B2 * | 11/2012 | Hiraoka | ................. F16H 47/04 475/219 |
| 8,696,509 | B2 * | 4/2014 | Panizzolo | ............... F16H 47/04 475/329 |
| 9,555,806 | B2 * | 1/2017 | Bulgrien | .......... B60W 30/18118 |

FOREIGN PATENT DOCUMENTS

| | | |
|---|---|---|
| JP | 5822761 B2 | 11/2015 |
| JP | 2020-152364 A | 9/2020 |

* cited by examiner

*Primary Examiner* — Tinh Dang
(74) *Attorney, Agent, or Firm* — Sterne, Kessler, Goldstein & Fox P.L.L.C.

(57) ABSTRACT

A transmission structure of the present invention causes, during a period from a time point when a rotational speed of a drive rotational power reaches a predetermined first/second speed stage shift-up start speed until a first/second speed stage shift-up end time point, one of an input-side clutch mechanism pair and an output-side clutch mechanism pair to be in a double transmitting state, and causes, in the double transmitting state, a first clutch mechanism and a second clutch mechanism of the other one of the input-side clutch mechanism pair and the output-side clutch mechanism pair to be shifted to a disengagement sate and an engagement state, respectively, while having frictional plate slid.

24 Claims, 19 Drawing Sheets

TRANSMISSION STRUCTURE

CROSS-REFERENCE TO RELATED APPLICATIONS

This application claims priority to Japanese Patent Application No. 2021-118386, filed Jul. 19, 2021, and Japanese Patent Application No. 2022-100246, filed Jun. 22, 2022, which are hereby incorporated by reference herein in their entireties.

TECHNICAL FIELD

The present invention relates to a transmission structure including a hydromechanical transmission structure (HMT) that has a hydrostatic transmission (HST) and a planetary gear mechanism.

BACKGROUND

An HMT in which an HST and a planetary gear mechanism are combined is used in a travel system transmission path of a work vehicle such as combine and tractor, and various configurations have been proposed to expand a variable range of the vehicle-traveling speed.

For example, Patent Document 1 below discloses a transmission structure that has an HMT and a multi-stage speed-changing device serially arranged in a travel system transmission path to expand the variable range of the vehicle-traveling speed, wherein the multi-stage speed changing device includes three speed stages including a low speed stage, a medium speed stage and a high speed stage. However, the transmission structure described in the Patent Document 1 is designed to perform the speed change operation of the multi-stage speed-changing device in advance before the start of vehicle traveling, and therefore causes the following inconveniences if the speed change operation of the multi-stage speed-changing device is performed during the vehicle traveling.

In this respect, a description will be made about an example of the case in which the HMT, with the multi-stage speed-changing device engaged in the low speed stage, is operated thereby to increase the vehicle traveling speed, and at the time point when the vehicle traveling speed reaches a predetermined speed, the multi-stage speed-changing device is changed from the low speed stage to the medium speed stage.

In this case, when the output of the HMT, with the multi-stage speed-changing device in the low speed stage engaged state, reaches the maximum speed or the near maximum speed, the multi-stage speed-changing device, with the output of the HMT kept at the maximum speed or the near the maximum speed, is changed from the low speed stage to the medium speed stage; as a result, a large vehicle speed change is caused at the time of the speed stage change, which makes the riding uncomfortable and applies an excessive load to the travel system transmission path.

In this respect, the present applicant has proposed a transmission structure that includes an HST; a planetary gear mechanism that has first to third elements and that receives an HST output input at the third element; a speed change output shaft operatively driven by a planetary output portion of the planetary gear mechanism; an input-side first transmission mechanism and an input-side second transmission mechanism capable of operatively transmitting a rotational power from a drive source to the first element and second element of the planetary gear mechanism, respectively; an input-side first clutch mechanism and an input-side second clutch mechanism that engage and disengage power transmissions of the input-side first transmission mechanism and the input-side second transmission mechanism, respectively; an output-side first transmission mechanism and an output-side second transmission mechanism capable of operatively transmitting rotational powers of the second element and the first element to the speed change output shaft, respectively; an output-side first clutch mechanism and an output-side second clutch mechanism that engage and disengage power transmissions of the output-side first transmission mechanism and the output-side second transmission mechanism, respectively; a speed-change operating member; and a control device (see Patent Document 2 below).

The control device is so configured that, in a low-speed state in which the rotational speed of the speed change output shaft is less than a predetermined switching speed, the control device engages the input and output-side first clutch mechanisms and disengages the input and output-side second clutch mechanisms thereby to create a first transmitting state in which the first element is caused to act as a planetary input portion to input a reference power from the drive source and the second element is caused to act as a planetary output portion, and operates an output adjusting member so that the HST output is changed from a first HST speed toward a second HST speed according to the speed increasing operation of the speed-change operating member. The control device is also so configured that, in a high-speed state in which the rotational speed of the speed change output shaft is higher than or equal to the switching speed, the control device disengages the input and output-side first clutch mechanisms and engages the input and output-side second clutch mechanisms thereby to create a second transmitting state in which the first element is caused to act as the planetary output portion and the second element is caused to act as the planetary input portion, with the output adjusting member so operated that the HST output is changed from the second HST speed to the first HST speed according to the speed increasing operation of the speed-change operating member.

The speed change ratio of the input-side first transmission mechanism (input-side first speed change ratio) and the speed change ratio of the input-side second transmission mechanism (input-side second speed change ratio) are so set that the second element's rotational speed that is acquired when the HST output is set to the second HST speed in the first transmission state is same as the second element's rotational speed by the rotational power transmitted via the input-side second transmission mechanism in the second transmitting state, and the first element's rotational speed that is acquired when the HST output is set to the second HST speed in the second transmission state is same as the first element's rotational speed by the rotational power transmitted via the input-side first transmission mechanism in the first transmitting state.

The speed change ratio of the output-side first transmission mechanism (output-side first speed change ratio) and the speed change ratio of the output-side second transmission mechanism (output-side second speed change ratio) are set so that the rotational speeds created on the speed change output shaft when the HST output is set to the second HST speed in the first and second transmitting states are same as each other.

Compared to the transmission structure described in the Patent Document 1, the transmission structure described in the Patent Document 2 is useful in being capable of enlarging the speed change width of the speed change output shaft without causing a sudden change in rotational speed of the speed change output shaft.

However, there is room for improvement in the switching between the first HMT transmitting state (low-speed transmitting state) in which the input and output-side first clutch mechanisms are engaged and the input and output-side second clutch mechanisms are disengaged, and the second HMT transmitting state (high-speed transmitting state) in which the input and output-side first clutch mechanisms are disengaged and the input and output-side second clutch mechanisms are engaged.

PRIOR ART DOCUMENTS

Patent Documents

Patent document 1: U.S. Pat. No. 5,822,761
Patent document 2: Japanese Unexamined Patent Application Publication No. 2020-152364

SUMMARY

Problems to be Solved by the Invention

The present invention has been made in view of the above conventional technology, and therefore it is an object of the present invention to provide a transmission structure that has an HST receiving a rotational power from a drive source and a planetary gear mechanism having first to third elements and receiving, at the third element, an output rotational power from the HST, and that is capable of switching between a first HMT transmitting state in which the rotational power from the drive source is input to the first element and a combined rotational power is output from the second element, and a second HMT transmitting state in which the rotational power from the drive source is input to the second element and the combined rotational power is output from the first element, wherein transmission structure is capable of smoothly switching between the first and second HMT transmitting states.

In order to achieve the object, the present invention provides a transmission structure continuously changing a rotational speed of a rotational power that is operatively transmitted from a drive source and outputting a rotational power whose rotational speed has been changed toward a driving wheel, the transmission structure including: an HST that continuously changes the rotational speed of the rotational power operatively transmitted from the drive source to a rotational speed including a range of at least between a first HST speed and a second HST speed in accordance with an operating position of an output adjusting member and that outputs a rotational power whose rotational speed has been changed; an HST speed change actuator that actuates the output adjusting member; a planetary gear mechanism that includes first to third elements and that is configured so that the third element acts as an input portion inputting the rotational power that the HST outputs; an input-side first transmission mechanism capable of operatively transmitting the rotational power, which operatively receives from the drive source, to the first element at an input-side first speed change ratio; an input-side second transmission mechanism capable of operatively transmitting the rotational power, which operatively receives from the drive source, to the second element at an input-side second speed change ratio; an input-side clutch mechanism pair including input-side first and second clutch mechanisms of a frictional plate type that engage and disengage the power transmissions of the input-side first and second transmission mechanisms, respectively; a speed change output shaft; an output-side first transmission mechanism capable of operatively transmitting the rotational power, which operatively receives from the second element, to the speed change output shaft at an output-side first speed change ratio; an output-side second transmission mechanism capable of operatively transmitting the rotational power, which operatively receives from the first element, to the speed change output shaft at an output-side second speed change ratio; an output-side clutch mechanism pair including output-side first and second clutch mechanisms that engage and disengage the power transmissions of the output-side first and second transmission mechanisms, respectively; a speed-change operating member capable of being operated within an area including a vehicle speed zero position, a first speed stage area and a second speed stage area that is arranged on a higher speed side than the first speed stage; a control device performing controls of the HST speed change actuator, the input-side clutch mechanisms and the output-side clutch mechanisms, wherein, when the speed-change operating member is positioned in an area including the vehicle speed zero position and the first speed stage area, the control device causes the input-side first and second input-side clutch mechanisms to be brought into the engagement state and the disengagement state, respectively, thereby to realize a first HMT transmitting state in which the first element acts as a reference power input portion, which inputs a reference power from the drive source, and the second element acts as a combined power output portion, which outputs, toward the speed change output shaft, a combined rotational power, and then causes the output-side first and second clutch mechanisms to be brought into the engagement state and the disengagement state, respectively, thereby to operatively transmit the rotational power of the second element to the speed change output shaft, wherein, when the speed-change operating member is positioned in the second speed stage area, the control device causes the input-side first and second clutch mechanisms to be brought into the disengagement state and the engagement state, respectively, thereby to realize a second HMT transmitting state in which the second element acts as the reference power input portion and the first element acts as the combined power output portion, and then causing the output-side first and second clutch mechanisms to be brought into the disengagement state and the engagement state, respectively, thereby to operatively transmit the rotational power of the first element to the speed change output shaft, wherein the planetary gear mechanism is so configured that the rotational speed of the rotational power output from the second element is zero when the rotational speed of the HST output is set to the first HST speed in the first HMT transmitting state, wherein the input-side first and second speed change ratios are so set that the rotational speed of the second element at the time when the HST output is set to the second HST speed in the first HMT transmitting state is same as that of the second element driven by the rotational power that is operatively transmitted via the input-side second transmission mechanism in the second HMT transmitting state, and the rotational speed of the first element at the time when the HST output is set to the second HST speed in the second HMT transmitting state is same as that of the first element driven by the rotational power that is operatively transmitted via the input-side first transmission mechanism in the first HMT transmitting state, wherein the control device operates the HST speed change actuator so that the HST output has the first HST speed according to the operation of the speed-change operating member to the vehicle speed zero position, and the HST output is accelerated according to the accelerating operation of the speed-change operating member from the vehicle speed zero position, and wherein, when the speed-change operating member is shifted up from the first speed stage area to the second speed stage area, the control device causes, at a first/second speed stage shift-up start time point when the drive rotational power has reached a predetermined first/second speed stage shift-up start speed, the second clutch mechanism of one clutch mechanism pair out of the input-side clutch mechanism pair and the output-side clutch mechanism pair to be instantly shifted from the disengagement state to the engagement, and causes, at a first/second speed stage shift-up end time point after an elapse of a predetermined time from the first/second speed stage shift-up start time point, the first clutch mechanism of the one clutch mechanism pair to be instantly shifted from the engagement state to the disengagement state, thereby to realize a shift-up double transmitting state in which both of the first and second clutch mechanisms in the one clutch mechanism pair are engaged during the period from the first/second speed stage shift-up start time point until the first/second speed stage shift-up end time point, and also causes, in the shift-up double transmitting state, the first clutch mechanism of the other one clutch pair out of the input-side clutch mechanism pair and the output-side clutch mechanism pair to be gradually shifted from the engagement state to the disengagement state while having the frictional plate being frictionally slid, and causes the second clutch mechanism of the other one clutch mechanism pair to be gradually shifted from the disengagement state to the engagement state while having the friction plate being frictionally slid, thereby to switch from the engagement state of the first clutch mechanism to the engagement state of the second clutch mechanism in the other one clutch mechanism pair.

The transmission structure according to the present invention, which include the an HST receiving a rotational power from a drive source and a planetary gear mechanism having first to third elements and receiving, at the third element, an output rotational power from the HST, makes it possible to smoothly switch between a first HMT transmitting state in which the rotational power from the drive source is input to the first element and a combined rotational power is output from the second element, and a second HMT transmitting state in which the rotational power from the drive source is input to the second element and the combined rotational power is output from the first element.

In a preferable configuration, the first/second speed stage shift-up start speed is set to a speed of the drive rotational power that is realized on the speed change output shaft via the output-side first transmission mechanism when the rotational speed of the HST output is set to the second HST speed in the first HMT transmitting state.

In one embodiment, the input-side first and second clutch mechanisms and the output-side first and second clutch mechanisms each is of a hydraulic type in which the engagement state and the disengagement state are switched in response to supply and discharge of operation oil.

In this case, the transmission structure is provided with an input-side solenoid valve pair including input-side first and second solenoid valves that switch supply and discharge of the operation oil to and from the input-side first and second clutch mechanisms, respectively, in response to the control by the control device and an output-side solenoid valve pair including output-side first and second solenoid valves that switch supply and discharge of the operation oil to and from the output-side first and second clutch mechanisms, respectively, in response to the control by the control device.

The solenoid valves of one of the input-side solenoid valve pair and the output-side solenoid valve pair are solenoid proportional valves capable of gradually increasing and decreasing hydraulic pressures of the corresponding clutch mechanisms, and the solenoid valves of the other one of the input-side solenoid valve pair and the output-side solenoid valve pair are solenoid switching valves that instantly increase and decrease hydraulic pressures of the corresponding clutch mechanisms.

In any one of the above-mentioned various configurations, the output-side first and second speed change ratios are preferably so set that the rotational speed that is realized on the speed change output shaft when the HST output is set to the second HST speed in the first HMT transmitting state is substantially same as the rotational speed that is realized on the speed change output shaft when the HST output is set to the second HST speed in the second HMT transmitting state.

In any one of the above-mentioned various configurations, the control device may be, for example, configured to start, before the first/second speed stage shift-up start time point, the shifting movement of the first clutch mechanism of the other one clutch pair from the engagement state to the disengagement state while the frictional plate being frictionally slid and the shifting movement of the second clutch mechanism of the other one clutch mechanism pair from the disengagement state to the engagement state while the friction plate being frictionally slid, and complete the shifting movements after the first/second speed stage shift-up end time point.

In a preferable configuration of any one of the above-mentioned various configurations, when the speed-change operating member is shifted down from the second speed stage area to the first speed stage area, the control device causes, at a second/first speed stage shift-down start time point when the drive rotational power reaches a predetermined second/first speed stage shift-down start speed, the first clutch mechanism of one clutch mechanism pair out of the input-side clutch mechanism pair and the output-side clutch mechanism pair to be instantly shifted from the disengagement state to the engagement state, and causes, at a second/first speed stage shift-down end time point after an elapse of a predetermined time from the second/first speed stage shift-down start time point, the second clutch mechanism of the one clutch mechanism pair to be instantly shifted from the engagement state to the disengagement state, thereby to realize a shift-down double transmitting state in which both of the first and second clutch mechanisms in the one clutch mechanism pair are engaged during the period from the second/first speed stage shift-down start time point until the second/first speed stage shift-down end time point, and the control device also causes, in the shift-down double transmitting state, the first clutch mechanism of the other one clutch pair out of the input-side clutch mechanism pair and the output-side clutch mechanism pair to be gradually shifted from the disengagement state to the engagement state while having the frictional plate being frictionally slid, and causes the second clutch mechanism of the other one clutch mechanism pair to be gradually shifted from the engagement state to the disengagement state while having the friction plate being frictionally slid, thereby to switch from the engagement state of the second clutch mechanism to the engagement state of the first clutch mechanism in the other one clutch mechanism pair.

The second/first speed stage shift-down start speed may be preferably set to the speed of the drive rotational power that is realized on the speed change output shaft (45) when the HST output is set to the second HST speed in the second HMT transmitting state.

The control device may be, for example, configured to start, before the second/first speed stage shift-down start time point, the shifting movement of the second clutch mechanism of the other one clutch pair from the engagement state to the disengagement state while the frictional plate being frictionally slid and the shifting movement of the first clutch mechanism of the other one clutch mechanism pair from the disengagement state to the engagement state while the friction plate being frictionally slid, and complete the shifting movements after the second/first speed stage shift-down end time point.

The rotational speed of the rotational power that defines the second/first speed stage shift-down start time point may be preferably substantially same as the rotational speed of the rotational power that defines the first/second speed stage shift-up start time point.

In a preferable configuration, the transmission structure according to the present invention may further include a travel output shaft that outputs the drive rotational power toward the driving wheel, a forward-side transmission mechanism and a rearward-side transmission mechanism that operatively transmit the rotational power of the speed change output shaft to the travel output shaft as a forward drive rotational power and a rearward drive rotational power, respectively, and a friction plate type forward-side clutch mechanism and a friction plate type rearward-side clutch mechanism that engage and disengage the power transmissions of the forward-side transmission mechanism and rearward-side transmission mechanism, respectively.

In this case, the HST is configured to be capable of outputting the rotational power in both forward and reverse directions so that the HST output having the first HST speed is the rotational power in one of the forward and rearward directions and the HST output having the second HST speed is the rotational power in the other one of the forward and rearward directions.

The planetary gear mechanism is so configured that the rotational speed of the combined rotational power output from the second element is increased as the rotational speed of the HST output is changed from the first HST speed side to the second HST speed side in the first HMT transmitting state, and the rotational speed of the combined rotational power output from the first element is increased as the rotational speed of the HST output is changed from the second HST speed side to the first HST speed side in the second HMT transmitting state.

The first speed stage area includes a forward-side first speed stage area and a rearward-side first speed stage area, the second speed stage area includes a forward-side second speed stage area higher than the forward-side first speed stage area and a rearward-side second speed stage area higher than the rearward-side first speed stage area, and the control device causes the forward-side clutch mechanism and the rearward-side clutch mechanism to be engaged and disengaged, respectively, in response to the operation of the speed-change operating member to the forward side, and causes the forward-side clutch mechanism and the rearward-side clutch mechanism to be disengaged and engaged, respectively, in response to the operation of the speed-change operating member to the rearward side.

In one embodiment, the forward-side and rearward-side clutch mechanisms each is of a hydraulic type in which the engagement state and the disengagement state are switched in response to supply and discharge of operation oil. In this case, the transmission structure is provided with a forward-rearward switch solenoid valve pair including forward-side and rearward-side solenoid valves that switch supply and discharge of the operation oil to and from the forward-side and rearward-side clutch mechanisms, respectively, in response to the control by the control device.

In the configuration where the travel output shaft, the forward-side transmission mechanism, the rearward-side transmission mechanism, the forward-side clutch mechanism and the rearward-side clutch mechanism, the transmission structure may preferably further include an output-side third transmission mechanism capable of operatively transmitting, as a forward drive rotational power, the rotational power of the first element to the travel output shaft, the output-side third transmission mechanism having a speed change ratio set so that the rotational speed of the travel output shaft that is realized when the rotational power of the first element is operatively transmitted to the travel output shaft via the output-side third transmission mechanism is higher than that of the travel output shaft that is realized when the rotational power of the first element is operatively transmitted to the travel output shaft via the output-side second transmission mechanism and the forward-side transmission mechanism, and an output-side third clutch mechanism that engages and disengages the power transmission of the output-side third transmission mechanism.

In this case, the speed-change operating member is configured to be also operable in a forward-side third speed stage area higher than the forward-side second speed stage area. When the speed-change operating member is positioned in the forward-side third speed stage area, the control device brings the output-side first and second clutch mechanisms into the disengagement state and also brings the output-side third clutch mechanism into the engagement state with realizing the second HMT transmitting state, and then also operates the HST speed change actuator such that the rotational speed of the drive rotational power becomes the rotational speed that corresponds to the operating position of the speed-change operating member.

In a first example regarding the shift-up from the forward-side second speed stage to the forward-side third speed stage, the control device is configured to cause, at a second/third speed stage shift-up start time point when the drive rotational power has reached a predetermined second/third speed stage shift-up start speed, the output-side second clutch mechanism and the forward-side clutch mechanism to be instantly shifted from the engagement state to the disengagement state, and cause, at a second/third speed stage shift-up end time point after an elapse of a predetermined time from the second/third speed stage shift-up start time point, the output-side third clutch mechanism to be shifted from the disengagement state to the engagement state, thereby to realize a shift-up free-running state in which the power transmission to the travel output shaft is cut off during the period from the second/third speed stage shift-up start time point to the second/third speed stage shift-up end time point, and the control device is also configured to change, during the shift-up free-running state, the rotational speed of the HST output via the HST speed change actuator so that the rotational speed of the travel output shaft that is driven, at the second/third speed stage shift-up end time point, by the rotational power operatively transmitted via the output-side third transmission mechanism matches or approaches the rotational speed of the travel output shaft that is driven, at the second/third speed stage shift-up start time point, by the rotational power operatively transmitted via the output-side second transmission mechanism and the forward-side transmission mechanism.

In a second example regarding the shift-up from the forward-side second speed stage to the forward-side third speed stage, the control device is configured to cause one of the output-side second clutch mechanism and the forward-side clutch mechanism to be gradually shifted from the engagement state to the disengagement state while having the friction plates frictionally slid, cause, after an elapse of a predetermined time from the time point when the one of the output-side second clutch mechanism and the forward-side clutch mechanism is shifted to the disengagement state, the other one of the output-side second clutch mechanism and the forward-side clutch mechanism to be shifted from the engagement state to the disengagement state, and cause, after an elapse of a predetermined time from the time point when the other one of the output-side second clutch mechanism and the forward-side clutch mechanism is shifted to the disengagement state, the output-side third clutch mechanism to be shifted from the disengagement state to the engagement state, thereby to realize a shift-up free-running state in which the power transmission to the travel output shaft is cut off during the period from the time point when the one of the output-side second clutch mechanism and the forward-side clutch mechanism is shifted to the disengagement state until the time point when the output-side third clutch mechanism is shifted to the engagement state, and the control device is further configured to change, during the shift-up free-running state, the rotational speed of the HST output via the HST speed change actuator so that the rotational speed of the travel output shaft that is driven, at the time point when the output-side third clutch mechanism is shifted to the engagement state, by the rotational power operatively transmitted via the output-side third transmission mechanism matches or approaches the actual rotational speed realized on the travel output shaft just before the output-side third clutch mechanism is shifted to the engagement state.

In a third example regarding the shift-up from the forward-side second speed stage to the forward-side third speed stage, the control device is configured to cause the output-side second clutch mechanism to be gradually shifted from the engagement state to the disengagement state while having the friction plates frictionally slid and causes the output-side third clutch mechanism to be gradually shifted from the disengagement state to the engagement state while having the friction plates frictionally slid, and also cause the forward-side clutch mechanism to be shifted from the engagement to the disengagement before the output-side third clutch mechanism is shifted to the engagement state, thereby to realize a shift-up free-running state in which the power transmission to the travel output shaft is cut off during the period from the time point when the forward-side clutch mechanism is shifted to the disengagement state until the time point when the output-side third clutch mechanism is shifted to the engagement state, and the control device is further configured to change, during the shift-up free-running state, the rotational speed of the HST output via the HST speed change actuator so that the rotational speed of the travel output shaft that is driven, at the time point when the output-side third clutch mechanism is shifted to the engagement state, by the rotational power operatively transmitted via the output-side third transmission mechanism matches or approaches the actual rotational speed realized on the travel output shaft just before the output-side third clutch mechanism is shifted to the engagement state.

In one embodiment, the output-side third clutch mechanism is of a hydraulic type in which the engagement state and the disengagement state are switched in response to supply and discharge of operation oil. In this case, the transmission structure is provided with an output-side third solenoid valve that switches supply and discharge of the operation oil to and from the output-side third clutch mechanism, in response to the control by the control device.

In a first example regarding the shift-down from the forward-side third speed stage to the forward-side second speed stage in the transmission structure including the output-side third transmission mechanism and the output-side third clutch mechanism, the control device is configured to cause, at a third/second speed stage shift-down start time point when the drive rotational power has reached a predetermined third/second speed stage shift-down start speed, the output-side third clutch mechanism to be shifted from the engagement state to the disengagement state, and cause, at a third/second speed stage shift-up end time point after an elapse of a predetermined time from the third/second speed stage shift-up start time point, the output-side second clutch mechanism and the forward-side clutch mechanism to be shifted from the disengagement state to the engagement state, thereby to realize a shift-down free-running state in which the power transmission to the travel output shaft is cut off during the period from the third/second speed stage shift-down start time point until the third/second speed stage shift-down end time point, and the control device is further configured to change, during the shift-down free-running state, the rotational speed of the HST output via the HST speed change actuator so that the rotational speed of the travel output shaft that is driven, at the third/second speed stage shift-down end time point, by the rotational power operatively transmitted via the output-side second transmission mechanism and the forward-side transmission mechanism matches or approaches the rotational speed of the travel output shaft that is driven, at the third/second speed stage shift-down start time point, by the rotational power operatively transmitted via the output-side third transmission mechanism.

In a preferable configuration, the third/second speed stage shift-down start speed is substantially same as the second/third speed stage shift-up start speed.

In a second example regarding the shift-down from the forward-side third speed stage to the forward-side second speed stage in the transmission structure including the output-side third transmission mechanism and the output-side third clutch mechanism, the control device is configured to perform the shifting movement of the output-side third clutch mechanism from the engagement state to the disengagement state, the shifting movement of the forward-side clutch mechanism from the disengagement state to the engagement state and the shifting movement of the output-side second clutch mechanism from the disengagement state to the engagement state in this order, thereby to realize a shift-down free-running state in which the power transmission to the travel output shaft is cut off during the period from the time point when the output-side third clutch mechanism is shifted to the disengagement state until the time point when the output-side second clutch mechanism is shifted to the engagement state, and the control device is further configured to change, during the shift-down free-running state, the rotational speed of the HST output via the HST speed change actuator so that the rotational speed of the travel output shaft that is driven, at the time point when the output-side second clutch mechanism is shifted to the engagement state, by the rotational power operatively transmitted via the output-side second transmission mechanism and the forward-side transmission mechanism matches or approaches the actual rotational speed that is realized on the travel output shaft just before the output-side second clutch mechanism is shifted to the engagement state.

In a third example regarding the shift-down from the forward-side third speed stage to the forward-side second speed stage in the transmission structure including the output-side third transmission mechanism and the output-side third clutch mechanism, the control device is configured to perform the shifting movement of the output-side third clutch mechanism from the engagement state to the disengagement state, the shifting movement of the output-side second clutch mechanism from the disengagement state to the engagement state and the shifting movement of the forward-side clutch mechanism from the disengagement state to the engagement state and in this order, thereby to realize a shift-down free-running state in which the power transmission to the travel output shaft is cut off during the period from the time point when the output-side third clutch mechanism is shifted to the disengagement state until the time point when t the forward-side clutch mechanism is shifted to the engagement state, and the control device is further configured to change, during a period between the time point when the output-side third clutch mechanism is shifted from the engagement state to the disengagement state and the time point when the output-side second clutch mechanism is shifted from the disengagement state to the engagement state, the rotational speed of the HST output via the HST speed change actuator so that the rotational speed of the speed change output shaft that is driven, at the time point when the output-side second clutch mechanism is shifted from the disengagement state to the engagement state, by the rotational power operatively transmitted via the output-side second transmission mechanism matches or approaches the actual rotational speed that is realized on the speed change output shaft just before the output-side second clutch mechanism is shifted to the engagement state, and the control device is still further configured to change, during a period between the time point when the output-side second clutch mechanism is shifted to the engagement state and the time point when the forward-side clutch mechanism is shifted to the engagement state, the rotational speed of the HST output via the HST speed change actuator so that the rotational speed of the travel output shaft that is driven via the output-side second transmission mechanism and the forward-side transmission mechanism at the time point when the forward-side clutch mechanism is shifted from the disengagement state to the engagement state matches or approaches the actual rotational speed realized on the travel output shaft just before the forward-side clutch mechanism is shifted to the engagement state.

In a preferable configuration in any one of the first to third examples regarding the shift-down from the forward-side third speed stage to the forward-side second speed stage, the shifting movement of the output-side second clutch mechanism from the disengagement state to the engagement state in the shift-down operation from the forward-side third speed stage to the forward-side second speed stage is gradually performed.

In a preferable configuration when shifting up from the forward-side second speed stage to the forward-side third speed state, during a start period from the speed stage shift-up start time point when starting the shifting movement from the forward-side second speed stage to the forward-side third speed stage until a time point after an elapse of a predetermined time from the speed stage shift-up start time point, the control device is configured to set, as a target rotational speed of the HST output, a rotational speed that is increased to an opposite side of a third-speed-stage-side second/third speed stage switch speed from the actual rotational speed of the HST output at the shift-up start time point when one of the output-side second clutch mechanism and the forward-side clutch mechanism is shifted to the disengagement state, the third-speed-stage-side second/third speed stage switch speed being set to a rotational speed that makes the rotational speed of the travel output shaft, which is driven by the rotational power operatively transmitted via the output-side third transmission mechanism at the time when the output-side third clutch mechanism is shifted to the engagement state, coincident with the rotational speed of the travel output shaft at the shift-up start time point, and, after the start period, the control device is further configured to set, as the target rotational speed of the HST output, a rotational speed of the HST output that causes the rotational speed of the travel output shaft, which is driven by the rotational power operatively transmitted via the output-side third transmission mechanism at the time point when the output-side third clutch mechanism is shifted to the engagement state, to match the actual rotational speed realized on the travel output shaft just before the output-side third clutch mechanism is shifted to the engagement state.

In a more preferable configuration, the target rotational speed in the HST speed-change control during the start period is set to one of the first and second HST speeds that is positioned on an opposite side of the actual rotational speed of the HST output at the shift-up start time point.

In a preferable configuration when shifting down from the forward-side third speed stage to the forward-side second speed state, during a start period from the speed stage shift-down start time point when starting the shifting movement from the forward-side third speed stage to the forward-side second speed stage until a time point after an elapse of a predetermined time from the speed stage shift-down start time point, the control device is configured to set, as a target rotational speed of the HST output, a rotational speed that is increased to an opposite side of a second-speed-stage-side third/second speed stage switch speed from the actual rotational speed of the HST output at the shift-down start time point, the second-speed-stage-side third/second speed stage switch speed being set to a rotational speed that makes the rotational speed of the travel output shaft, which is driven by the rotational power operatively transmitted via the output-side second transmission mechanism and the forward-side transmission mechanism at the time when the output-side second clutch mechanism is shifted to the engagement state, coincident with the rotational speed of the travel output shaft, which is driven by the rotational power operatively transmitted via the output-side third transmission mechanism at the shift-down start time point, and, after the start period, the control device is further configured to set, as the target rotational speed of the HST output, a rotational speed of the HST output that causes the rotational speed of the travel output shaft, which is driven by the rotational power operatively transmitted via the output-side second transmission mechanism and the forward-side transmission mechanism at the time point when the output-side second clutch mechanism is shifted to the engagement state, to match the actual rotational speed realized on travel output shaft just before the output-side second clutch mechanism is shifted to the engagement state.

In a more preferable configuration, the target rotational speed of the HST output during the start period is set to one of the first and second HST speeds that is positioned on an opposite side of the actual rotational speed of the HST output at the shift-down start time point.

DETAILED DESCRIPTION

Figure 1:
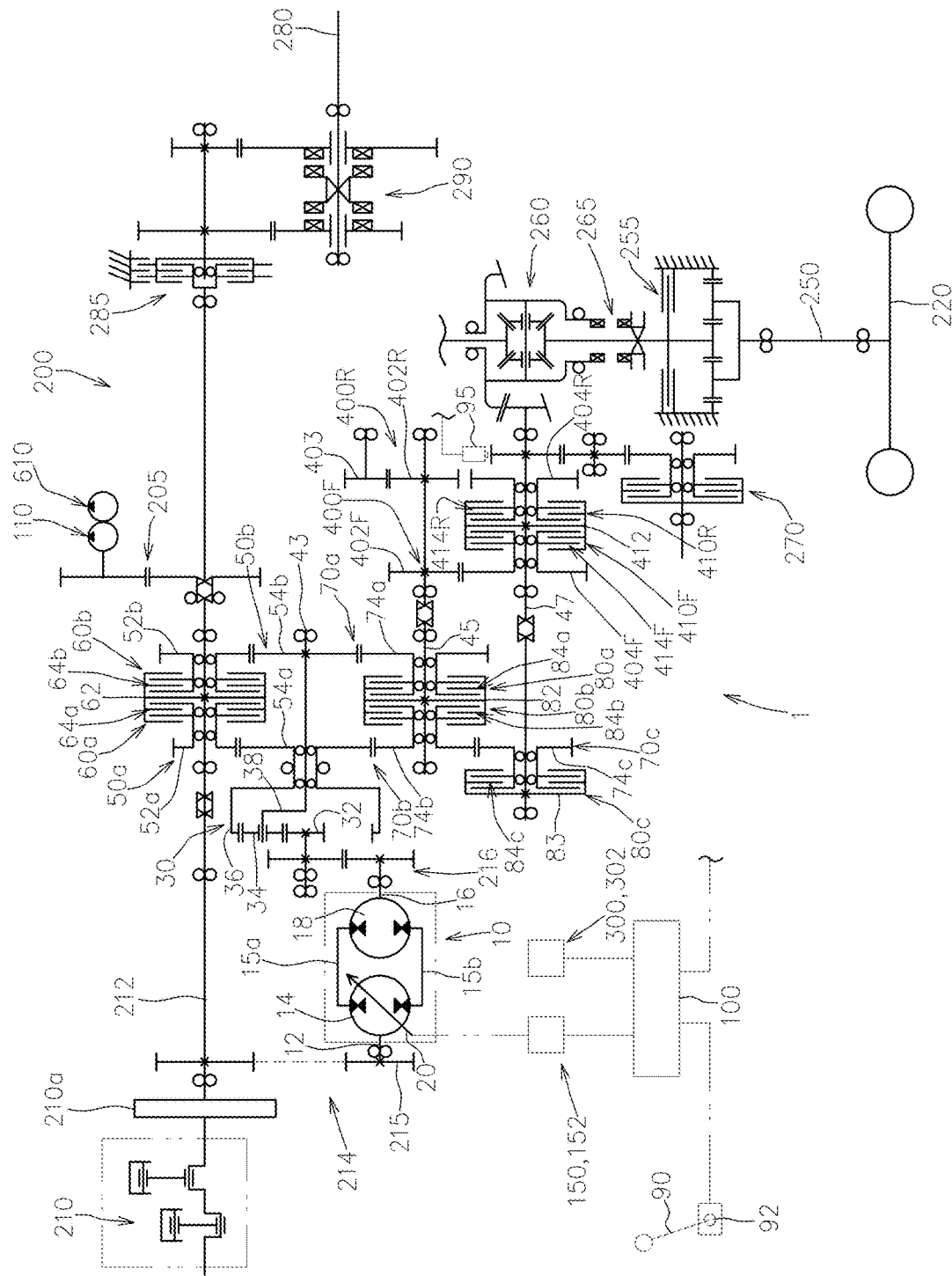
FIG. 1 is a schematic diagram of a power transmission of a work vehicle to which a transmission structure according to one embodiment of the present invention is applied.
Figure 2:
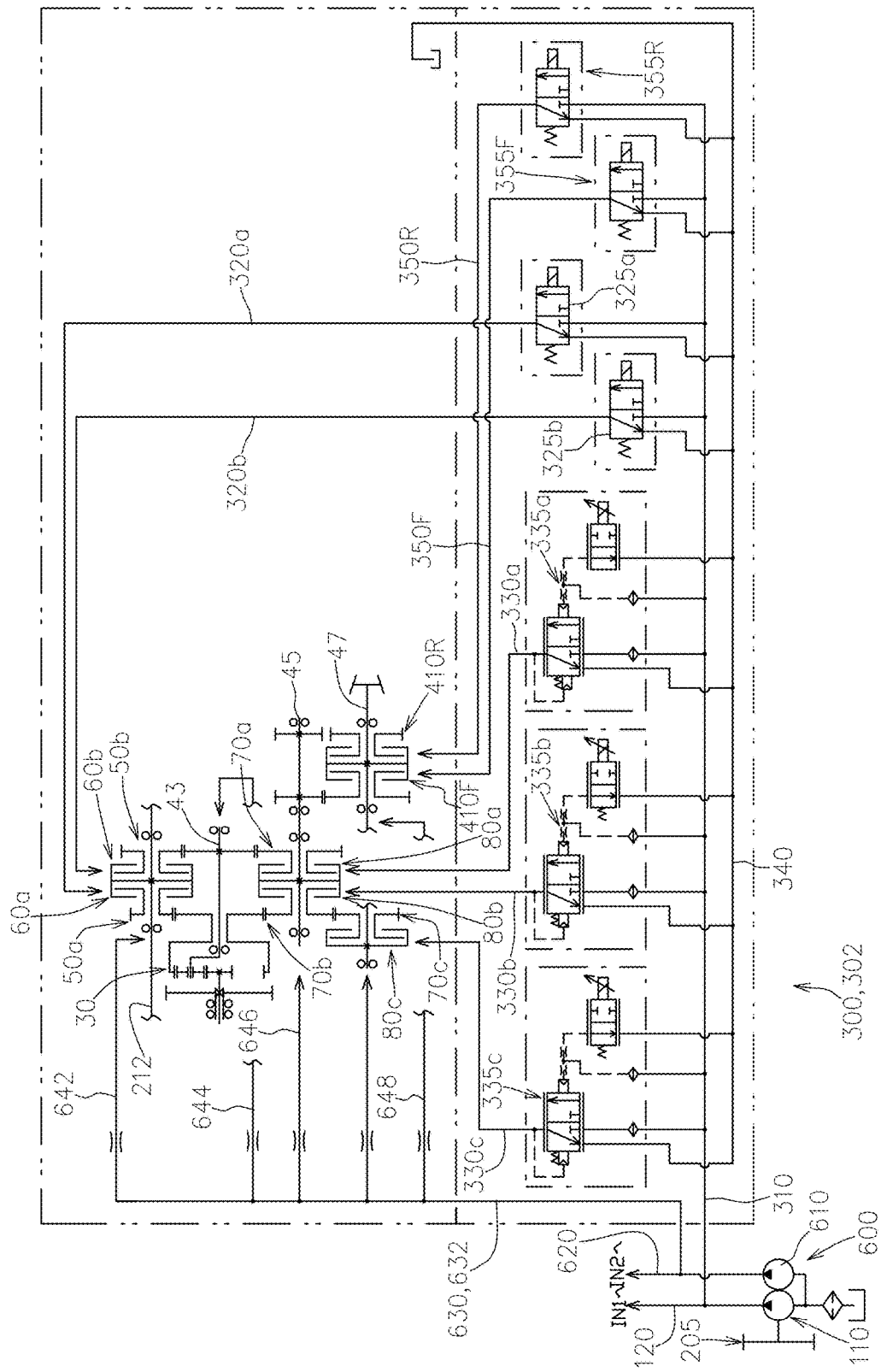
FIG. 2 is a hydraulic circuit diagram of a part of the transmission structure according to the embodiment.
Figure 3:
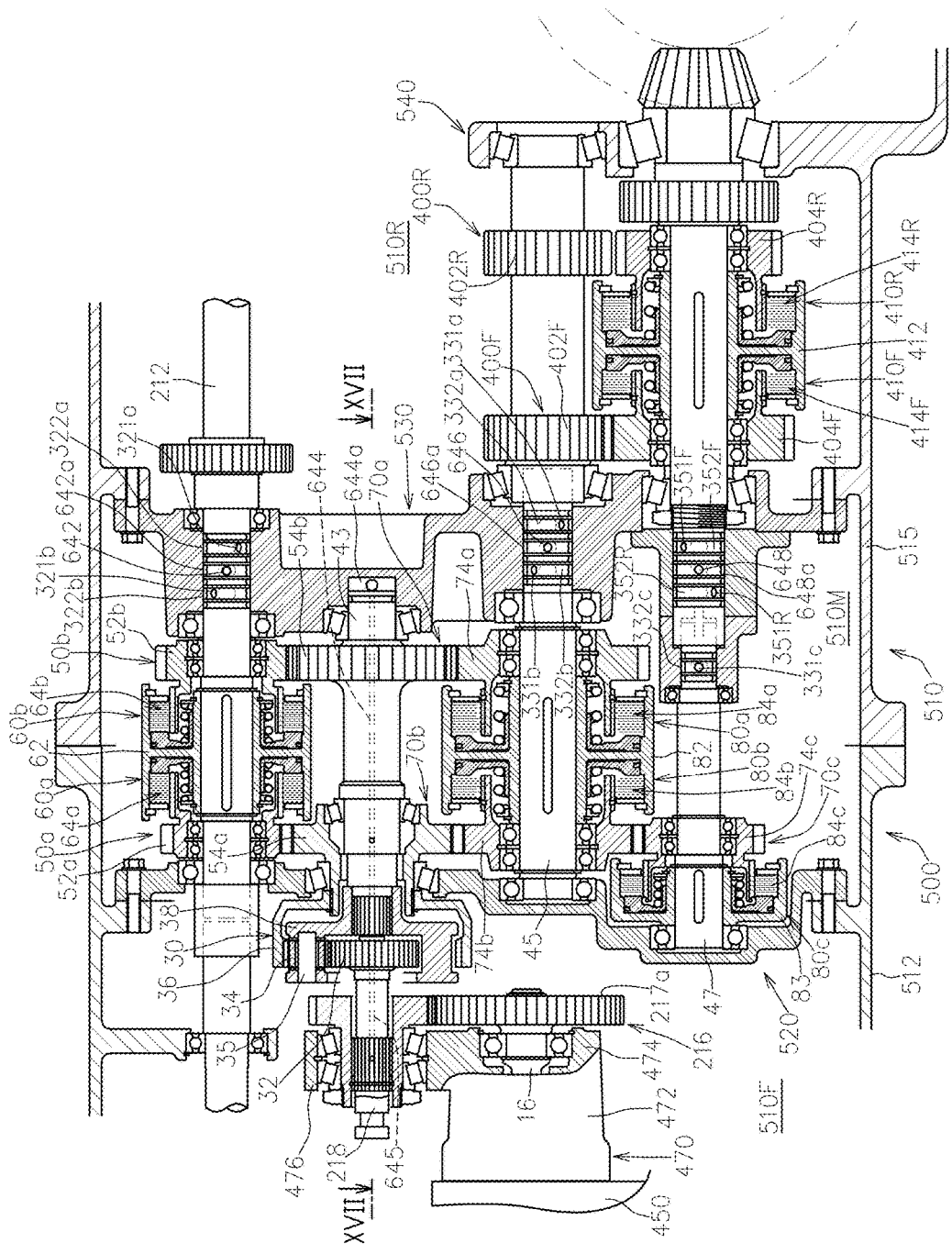
FIG. 3 is a vertical-cross-sectional side view of the transmission structure according to the embodiment.

The following is a description of one embodiment of a transmission structure according to the present invention, with reference to the accompanying drawings. FIG. 1 shows a schematic diagram of a power transmission of a work vehicle 200 to which a transmission structure 1 according to the present embodiment is applied. Further, FIG. 2 shows a hydraulic circuit diagram of a part of the transmission structure 1. Further, FIG. 3 shows a vertical-cross-sectional side view of the transmission structure 1.

As shown in FIG. 1, the work vehicle 200 includes a drive source 210, driving wheels 220 and the transmission structure 1 interposed in a travel system transmission path from the drive source 210 to the driving wheels 220. The reference numeral 210a in FIGS. 1 and 2 is a flywheel included in the drive source 210.

As shown in FIG. 1, the transmission structure 1 includes a hydrostatic transmission (HST) 10, a planetary gear mechanism 30 that forms an HMT (hydromechanical transmission structure) in combination with the HST 10, a speed change output shaft 45, a speed-change operating member 90 such as a speed change lever, and a control device 100.

Figure 4:
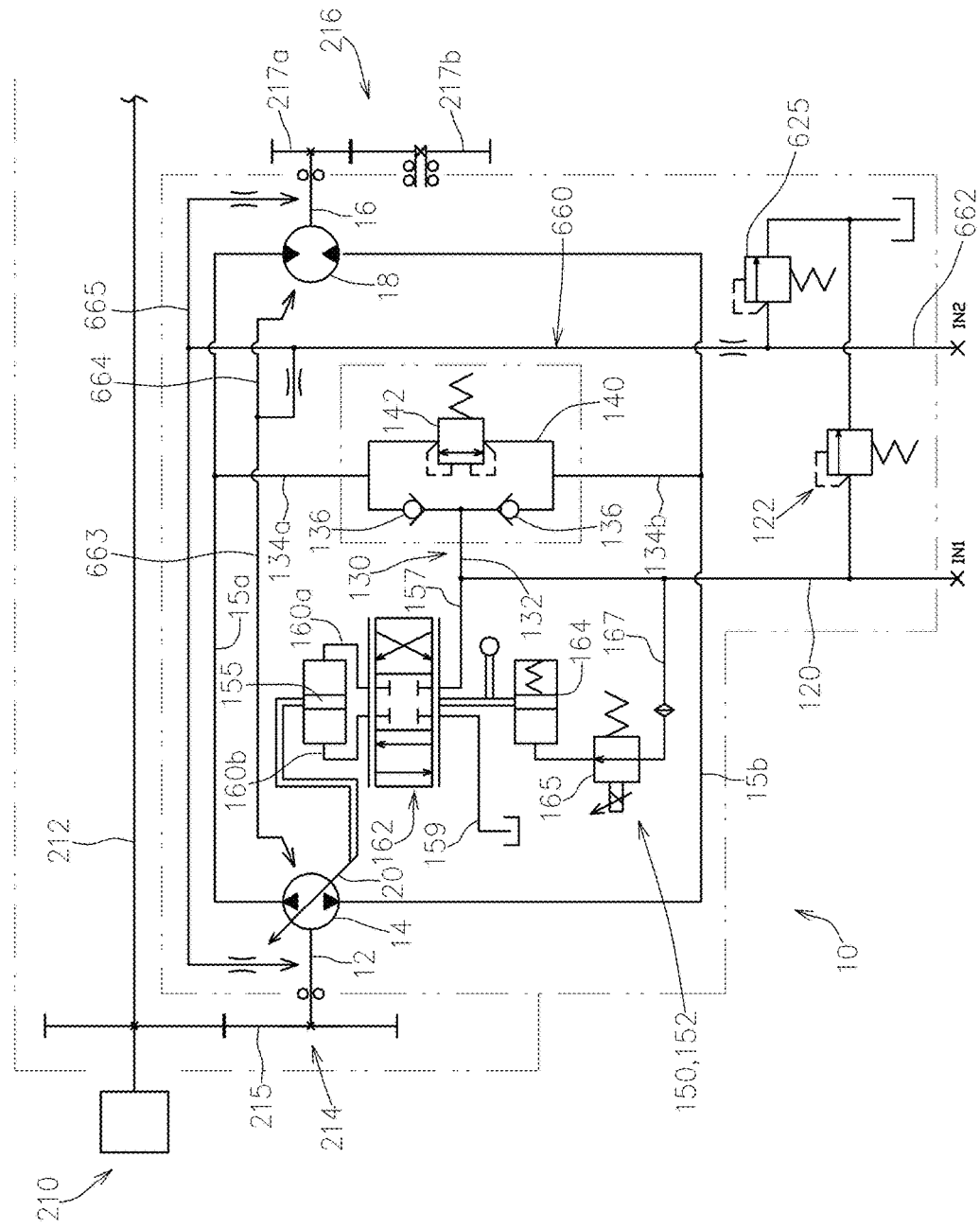
FIG. 4 is a hydraulic circuit diagram of an HST that is one component of the transmission structure according to the embodiment.

FIG. 4 shows a hydraulic circuit diagram of the HST 10. Note that IN1 and IN2 in FIG. 2 are fluidly connected to IN1 and IN2, respectively.

As shown in FIGS. 1 and 4, the HST 10 includes a pump shaft 12 that is operatively rotatably driven by the drive source 210, an HST pump 14 supported by the pump shaft 12 in a relatively non-rotatable manner with respect thereto, an HST motor 18 that is fluidly connected to the HST pump 14 via a pair of first and second HST lines 15a, 15b and hydraulically driven by the HST pump 14, a motor shaft 16 that supports the HST motor 18 in a relatively non-rotatable manner with respect thereto, and an output adjusting member 20 that changes a volume or a capacity of at least one of the HST pump 14 and the HST motor 18.

The HST 10 is so designed as to continuously vary, according to the operating position of the output adjusting member 20, the ratio of the rotational speed of the HST output from the motor shaft 16 with respect to the rotational speed of the power input to the pump shaft 12 (i.e., the speed change ratio of the HST 10).

That is, in a case where a reference input speed represents the rotational speed of the rotational power operatively input to the pump shaft 12 from the drive source 210, the HST 10 can continuously change the rotational power having the reference input speed to a rotational power having a rotational speed, between at least the first HST speed and the second HST speed, according to the operating position of the output adjusting member 20 and output the resultant rotational power from the motor shaft 16.

In the present embodiment, as shown in FIGS. 1 and 4, the pump shaft 12 is connected via an HST input gear train 214 to a main driving shaft 212 that is operatively connected to the drive source 210.

In the present embodiment, the HST 10 is capable of switching the rotational direction of the HST output between forward and reverse. That is, the HST 10 is so configured that, in a case where the rotation direction of the reference input speed is defined as the forward direction, positioning the output adjusting member 20 in a first operating position causes the motor shaft 16 to output a rotational power of the first HST speed in one direction of the forward and reverse directions (e.g., reverse direction), and positioning the output adjusting member 20 in a second operating position causes the motor shaft 16 to output a rotational power of the second HST speed in the other direction of the forward and reverse directions (e.g., forward direction).

In this case, positioning the output adjusting member 20 in a neutral position between the first and second operating positions causes the rotational speed of the HST output to be a neutral speed (zero speed).

In the present embodiment, as the output adjusting member 20, the HST 10 has a movable swash plate, which is commonly known in an axial piston pump, changing the volume of the HST pump 14 by being swung about a swing axis. The movable swash plate can swing to one side and another side about the swing axis, with sandwiching the neutral position that sets the discharge volume, which is discharged from the HST pump 14, to zero (see FIG. 10 below).

When the movable swash plate is positioned in the neutral position, there is no operation oil discharge from the HST pump 14, bringing the HST 10 into a neutral state in which the output of the HST motor 18 is zero.

When the movable swash plate is swung from the neutral position to the forward rotation side on one side about the swing axis, an operation oil is supplied from the HST pump 14 to one of a pair of HST lines 15 (e.g., the first HST line 15a), and thereby the one first HST line 15a becomes the high pressure side, and the other second HST line 15b becomes the low pressure side. With this, the HST motor 18 is rotatably driven to the forward rotation side, and the HST 10 is brought into the forward rotation output state.

Conversely, when the movable swash plate is swung from the neutral position to the reverse side on the other side about the swing axis, the operation oil is supplied from the HST pump 14 to the other of the pair of HST lines 15 (e.g., the second HST line 15b), and thereby the other second HST line 15b becomes the high pressure side, and the one first HST line 15a becomes the low pressure side. With this, the HST motor 18 is rotatably driven to the reverse rotation side, and the HST 10 is brought into the reverse rotation output state. In the HST 10, the HST motor 18 has its volume fixed by a fixed swash plate.

As shown in FIG. 4, the HST 10 is provided with a charge line 130 that supplies the operation oil to the first and second HST lines 15a, 15b.

In detail, as shown in FIG. 2, the transmission structure 1 has a first hydraulic pump 110 operatively driven by the drive source 210, and an operation oil line 120 to which the discharge oil from the first hydraulic pump 110 is supplied.

In the present embodiment, the first hydraulic pump 110 is operatively connected to the main driving shaft 212 via a pump driving gear train 205 (see FIG. 1). The hydraulic pressure of the operation oil line 120 is set by a relief valve 122 (see FIG. 4).

As shown in FIG. 4, the charge line 130 includes a common portion 132 having a base end side fluidly connected to the operation oil line 120, a first branch portion 134a having a base end side fluidly connected to the common portion 132 and a tip side fluidly connected to the first HST line 15a, and a second branch portion 134b having a base end side fluidly connected to the common portion 132 and a tip side fluidly connected to the second HST line 15b.

Check valves 136 that allow the operation oil flow from the common portion 132 to the corresponding HST lines 15a, 15b while preventing the oil flow in the reverse direction are interposed in the first and second branch portions 134a, 134b.

As shown in FIG. 4, the HST 10 also includes a communication line 140 that communicates between the pair of first and second HST lines 15a, 15b, and a bidirectional relief valve 142 interposed in the communication line 140. When one of the pair of HST lines 15a, 15b should have an abnormally high pressure, the communication line 140 and the bidirectional relief valve 142 cause the pressurized oil to flow from the one HST line to the other HST line.

As shown in FIG. 1, the output adjusting member 20 is operatively controlled by the control device 100 according to the operation of the speed-change operating member 90.

That is, the transmission structure 1 according to the present embodiment has an HST speed change actuator 150 that actuates the output adjusting member 20, and the control device 100 is so designed as to operate the output adjusting member 20 via the HST speed change actuator 150 according to the operation of the speed-change operating member 90.

The HST speed change actuator 150 can take various configurations, such as an electric motor and a hydraulic mechanism, as long as being able to be operatively controlled by the control device 100.

As shown in FIG. 4, the transmission structure 1 according to the present embodiment has a hydraulic servo mechanism 152 as the HST speed change actuator 150.

The hydraulic servo mechanism 152 has a servo piston 155 that is axially reciprocable with first and second oil chambers defined on one side and another side in the axial direction respectively, a servo operation oil line 157 having a base end side fluidly connected to the operation oil line 120, a drain line 159, first and second servo supply-discharge lines 160*a*, 160*b* fluidly connected to the first and second oil chambers respectively, a servo switching valve 162 that switches the connecting state between the servo operation oil line 157, the drain line 159 and the first and second servo supply-discharge lines 160*a*, 160*b*, and an operating piston 164 operatively connected to the servo switching valve 162.

The servo piston 155 is operatively connected to the movable swash plate in a manner to cause the movable swash plate, which acts as the output adjusting member 20, to swing about the swing axis according to the axial movement of the servo piston 155.

The servo switching valve 162 is so designed as to selectively take a closing position where the first and second servo supply-discharge lines 160*a*, 160*b* are closed, a first operating position where the first servo supply-discharge line 160*a* is fluidly connected to the servo operation oil line 157 and the second servo supply-discharge line 160*b* is fluidly connected to the drain line 159, and a second operating position where the first servo supply-discharge line 160*a* is fluidly connected to the drain line 159 and the second servo supply-discharge line 160*b* is fluidly connected to the servo operation oil line 157.

The operating piston 164 is so configured as to take a first operating position, a holding position, and a second operating position that respectively positions the servo switching valve 162 in the first operating position, the closing position, and the second operating position.

In the present embodiment, the operating piston 164 is axially reciprocable with an oil chamber and a spring chamber defined on one side and another side in the axial direction, respectively, and is pressed in the direction to contract the oil chamber by a spring placed in the spring chamber.

The hydraulic servo mechanism 152 further includes a servo operation line 167 having a base end side fluidly connected to the operation oil line 120 and a tip side fluidly connected to the oil chamber, and an output adjusting valve 165 capable of adjusting the operation oil amount of the servo operation line 167.

The output adjusting valve 165 is operatively controlled by the control device 100.

That is, the control device 100 operates the output adjusting valve 165 so that the output adjusting member 20 is positioned in an operating position that corresponds to the operating position of the speed-change operating member 90.

The operating position of the speed-change operating member 90 is detected by an operating position sensor 92, such as a potentiometer, for example.

As shown in FIGS. 1 and 3, the planetary gear mechanism 30 includes a sun gear 32, planetary gears 34 that mesh with the sun gear 32, an internal gear 36 that meshes with the planetary gears 34, and carriers 38 that supports the corresponding planetary gear 34 in a rotatable manner around an axis line and rotate about the axis of the sun gear 32 in conjunction with the corresponding planetary gear 34's revolution about the sun gear 32, wherein the sun gear 32, the carrier 38 and the internal gear 36 form planetary three elements.

A third element, as one of the three planetary elements, is operatively connected to the motor shaft 16, and the third element is acting as a variable power input portion that inputs the HST output. As shown in FIGS. 1 and 3, the sun gear 32 is the third element in the present embodiment. In the present embodiment, the sun gear 32 is operatively connected to the motor shaft 16 via an HST output gear train 216.

The transmission structure 1 according to the present embodiment can switch between a first HMT transmitting state in which the first element is caused to act as a reference power input portion that inputs the reference rotational power from the drive source 210 and the second element is caused to act as a combined power output portion that outputs the combined rotational power, and a second HMT transmitting state in which the first element is caused to act as the combined power output portion and the second element is caused to act as the reference power input portion.

Specifically, as shown in FIGS. 1 to 3, the transmission structure 1 further has an input-side first transmission mechanism 50*a* and an input-side second transmission mechanism 50*b* that are capable of operatively transmitting the rotational power of the drive source 210 to the first element and the second element, respectively, an input-side clutch mechanism pair including an input-side first clutch mechanism 60*a* and an input-side second clutch mechanism 60*b* that engage and disengage the power transmissions of the input-side first transmission mechanism 50*a* and the input-side second transmission mechanism 50*b*, respectively, an output-side first transmission mechanism 70*a* and an output-side second transmission mechanism 70*b* that are capable of operatively transmitting the rotational powers of the second element and the first element, respectively, to the speed change output shaft 45, and an output-side clutch mechanism pair including an output-side first clutch mechanism 80*a* and an output-side second clutch mechanism 80*b* that engage and disengage the power transmissions of the output-side first transmission mechanism 70*a* and the output-side second transmission mechanism 70*b*, respectively.

In the present embodiment, the internal gear 36 and the carrier 38 act as the first and second elements, respectively.

The input-side first transmission mechanism 50*a* is so configured as to transmit the rotational power from the drive source 210 to the first element (the internal gear 36 in the present embodiment).

In detail, as shown in FIGS. 1 and 3, the input-side first transmission mechanism 50*a* has an input-side first driving gear 52*a* relatively rotatably connected to the main driving shaft 212, and an input-side first driven gear 54*a* that is meshed with the input-side first driving gear 52*a* and is operatively connected to the first element.

As shown in FIGS. 1 and 3, the transmission structure 1 according to the present embodiment has a speed change intermediate shaft 43 that is placed coaxially with the planetary gear mechanism 30 and that is connected to the second element in a relatively non-rotatable manner around an axis line with respect thereto. The input-side first driven gear 54a, in a state of being supported on the speed change intermediate shaft 43 in a relatively rotatable manner with respect thereto, is operatively connected to the input-side first driving gear 52a and the first element (the internal gear 36 in the present embodiment).

The input-side second transmission mechanism 50b is so configured as to transmit the rotational power of the drive source 210 to the second element (the carrier 38 in the present embodiment).

In detail, as shown in FIG. 1 and FIG. 3, the input-side second transmission mechanism 50b has an input-side second driving gear 52b supported on the main driving shaft 212 in a relatively rotatable manner with respect thereto, and an input-side second driven gear 54b that is meshed with the input-side second driving gear 52b and is operatively connected to the second element.

In the present embodiment, the input-side second driven gear 54b, in a state of being relatively non-rotatably supported on the speed change intermediate shaft 43 that is relatively non-rotatably connected to the second element, is meshed with the input-side second driving gear 52b.

In the present embodiment, the input-side first and second clutch mechanisms 60a, 60b are each a friction plate type clutch mechanism.

The input-side first and second clutch mechanisms 60a, 60b are supported on the main driving shaft 212 in a manner to engage and disengage the input-side first and second driving gears 52a, 52b with and from the main driving shaft 212, respectively.

In detail, the input-side first clutch mechanism 60a has an input-side clutch housing 62 relatively non-rotatably supported on the main driving shaft 212; an input-side first friction plate group 64a that includes a first driving-side friction plate relatively non-rotatably supported on the input-side clutch housing 62, and a first driven-side friction plate relatively non-rotatably supported on the input-side first driving gear 52a in a state of being opposed by the first driving-side friction plate; and an input-side first piston (not shown) that causes the input-side first friction plate group 64a to be in a frictional engagement state.

The input-side second clutch mechanism 60b has the input-side clutch housing 62; an input-side second friction plate group 64b that includes a second driving-side friction plate relatively non-rotatably supported on the input-side clutch housing 62, and a second driven-side friction plate relatively non-rotatably supported on the input-side second driving gear 52b in a state of being opposed by the second driving-side friction plate; and an input-side second piston (not shown) that causes the input-side second friction plate group 64b to be in a frictional engagement state.

The output-side first transmission mechanism 70a is so configured as to transmit the rotational power of the second element to the speed change output shaft 45.

In the present embodiment, the output-side first transmission mechanism 70a is so configured as to operatively transmit the rotational power of the second element to the speed change output shaft 45 with utilizing the input-side second driven gear 54b in the input-side second transmission mechanism 50b.

In detail, as shown in FIG. 1 and FIG. 3, the output-side first transmission mechanism 70a has the input-side second driven gear 54b, and an output-side first driven gear 74a that is operatively connected to the input-side second driven gear 54b in a state of being relatively rotatably supported on the speed change output shaft 45.

The output-side second transmission mechanism 70b is so configured as to transmit the rotational power of the first element to the speed change output shaft 45.

In the present embodiment, the output-side second transmission mechanism 70b is so configured as to operatively transmit the rotational power of the first element to the speed change output shaft 45 with utilizing the input-side first driven gear 54a in the input-side first transmission mechanism 50a.

In detail, as shown in FIG. 1 and FIG. 3, the output-side second transmission mechanism 70b has the input-side first driven gear 54a, and an output-side second driven gear 74b that is operatively connected to the input-side first driven gear 54a in a state of being relatively rotatably supported on the speed change output shaft 45.

The output-side first and second clutch mechanisms 80a, 80b are each a friction plate clutch mechanism.

In the present embodiment, the output-side first and second clutch mechanisms 80a, 80b are supported on the speed change output shaft 45 in a manner to engage and disengage the output-side first and second driven gears 74a, 74b with and from the speed change output shaft 45, respectively.

In detail, the output-side first clutch mechanism 80a has an output-side clutch housing 82 relatively non-rotatably supported on the speed change output shaft 45; an output-side first friction plate group 84a that includes a first driving-side friction plate relatively non-rotatably supported on the output-side first driven gear 74a, and a first driven-side friction plate relatively non-rotatably supported on the output-side clutch housing 82 in a state of being opposed by the first driving-side friction plate; and an output-side first piston (not shown) that causes the output-side first friction plate group 84a to be in a frictional engagement state.

The output-side second clutch mechanism 80b has the output-side clutch housing 82; an output-side second friction plate group 84b that includes a second driving-side friction plate relatively non-rotatably supported on the output-side second driven gear 74b, and a second driven-side friction plate relatively non-rotatably supported on the output-side clutch housing 82 in a state of being opposed by the second driving-side friction plate; and an output-side second piston (not shown) that causes the output-side second friction plate group 84b to be in a frictional engagement state.

The transmission structure 1 further has a transmitting state switching actuator 300 that switches the engagement and disengagement of the input-side first clutch mechanism 60a, the input-side second clutch mechanism 60b, the output-side first clutch mechanism 80a and the output-side second clutch mechanism 80b.

The transmitting state switching actuator 300 can take various configurations, such as an electric motor and a hydraulic mechanism, as long as being able to be operatively controlled by the control device 100.

As shown in FIG. 2, the transmission structure 1 according to the present embodiment has a transmitting state switching hydraulic mechanism 302 as the transmitting state switching actuator 300.

The transmitting state switching hydraulic mechanism 302 is so configured as to use the oil source (the first hydraulic pump 110) that is common to the charge line 130 of the HST 10 and to the hydraulic servo mechanism 152.

In detail, the transmitting state switching hydraulic mechanism 302 includes a clutch line 310 having a base end side fluidly connected to the operation oil line 120, an input-side first supply-discharge line 320a, an input-side second supply-discharge line 320b, an output-side first supply-discharge line 330a, and an output-side second supply-discharge line 330b that have tip sides fluidly connected to the input-side first clutch mechanism 60a, the input-side second clutch mechanism 60b, the output-side first clutch mechanism 80a, and the output-side second clutch mechanism 80b, respectively, a drain line 340, and an input-side first solenoid valve 325a, an input-side second solenoid valve 325b, an output-side first solenoid valve 335a, and an output-side second solenoid valve 335b that are respectively interposed between the following i) and ii): i) the clutch line 310 and the drain line 340, ii) the input-side first supply-discharge line 320a, the input-side second supply-discharge line 320b, the output-side first supply-discharge line 330a, and the output-side second supply-discharge line 330b.

The input-side first solenoid valve 325a, the input-side second solenoid valve 325b, the output-side first solenoid valve 335a, and the output-side second solenoid valve 335b are so designed as to be operatively controlled by the control device 100, making it possible to take a supply position to fluidly connect the corresponding supply-discharge lines 320a, 320b, 330a, 330b to the clutch line 310, and a drain position to fluidly connect the corresponding supply-discharge lines 320a, 320b, 330a, 330b to the drain line 340.

As shown in FIG. 2, in the present embodiment, the input-side first solenoid valve 325a and the input-side second solenoid valve 325b are solenoid switching valves that instantly increase/decrease the hydraulic pressure of the corresponding input-side first supply-discharge line 320a and input-side second supply-discharge line 320b.

Meanwhile, the output-side first solenoid valve 335a and the output-side second solenoid valve 335b are solenoid proportional valves capable of adjusting the increasing/decreasing rates of the hydraulic pressures of the corresponding output-side first supply-discharge line 330a and output-side second supply-discharge line 330b.

As shown in FIG. 1, FIG. 3, etc., the transmission structure 1 according to the present embodiment further includes a travel output shaft 47 that outputs a drive rotational power toward the driving wheels 220, a forward-side transmission mechanism 400F and a rearward-side transmission mechanism 400R that operatively transmit rotational power of the speed change output shaft 45 to the travel output shaft 47 as a forward drive rotational power and a rearward drive rotational power, respectively, and a friction plate type forward-side clutch mechanism 410F and a rearward-side clutch mechanism 410R that engage and disengage the power transmissions of the forward-side transmission mechanism 400F and rearward-side transmission mechanism 400R, respectively.

As shown in FIGS. 1 and 3, the forward-side transmission mechanism 400F has a forward-side gear train that includes a forward-side driving gear 402F supported on the speed change output shaft 45 and a forward-side driven gear 404F meshed with the forward-side driving gear 402F in a state of being supported on the travel output shaft 47.

In the present embodiment, the forward-side driving gear 402F is supported on the speed change output shaft 45 in a relatively non-rotatable manner with respect thereto, and the forward-side driven gear 404F is supported on the travel output shaft 47 in a relatively rotatable manner with respect thereto.

The rearward-side transmission mechanism 400R has a rear-side gear train that includes a rearward-side driving gear 402R supported on the speed change output shaft 45 and a rearward-side driven gear 404R meshed with the rearward-side driving gear 402R via an idle gear 403 (see FIG. 1) in a state where rearward-side driven gear 404R is supported on the travel output shaft 47.

In the present embodiment, the rearward-side driving gear 402R is supported on the speed change output shaft 45 in a relatively non-rotatable manner with respect thereto, and the rearward-side driven gear 404R is supported on the travel output shaft 47 in a relatively rotatable manner with respect thereto.

In the present embodiment, the forward-side clutch mechanism 410F and the rearward-side clutch mechanism 410R are supported on the travel output shaft 47 so as to engage and disengage the forward-side driven gear 404F and the rearward-side driven gear 404R with and from the travel output shaft 47, respectively.

In detail, the forward-side clutch mechanism 410F has a forward-rearward clutch housing 412 relatively non-rotatably supported on the travel output shaft 47; a forward-side friction plate group 414F that includes a forward driven-side friction plate relatively non-rotatably supported on the forward-rearward clutch housing 412, and a forward driving-side friction plate relatively non-rotatably supported on the forward-side driven gear 404F in a state of being opposed by the forward driven-side friction plate; and a forward-side piston (not shown) that causes the forward-side friction plate group 414F to be in a frictional engagement state.

The rearward-side clutch mechanism 410R has the forward-rearward clutch housing 412; a rearward-side friction plate group 414R that includes a rearward driven-side friction plate relatively non-rotatably supported on the forward-rearward clutch housing 412, and a rearward driving-side friction plate relatively non-rotatably supported on the rearward-side driven gear 404R in a state of being opposed by the rearward driven-side friction plate; and a rearward-side piston (not shown) that causes the rearward-side friction plate group 414R to be in a frictional engagement state.

The forward-side clutch mechanism 410F and the rearward-side clutch mechanism 410R are designed so as to switch, by the transmitting state switching actuator 300 (the transmitting state switching hydraulic mechanism 302 in the present embodiment), between engagement state and disengagement state.

That is, when recognizing that the speed-change operating member 90 is operated to the forward side, the control device 100 operates the transmitting state switching actuator 300 such that the forward-side clutch mechanism 410F is engaged and the rearward-side clutch mechanism 410R is disengaged, meanwhile when recognizing that the speed-change operating member 90 is operated to the rearward side, the control device 100 operates the transmitting state switching actuator 300 such that the forward-side clutch mechanism 410F is disengaged and the rearward-side clutch mechanism 410R is engaged.

As described above, the transmission structure 1 has the transmitting state switching hydraulic mechanism 302 as the transmitting state switching actuator 300.

As shown in FIG. 2, the transmitting state switching hydraulic mechanism 302 further includes a forward-side supply-discharge line 350F and a rearward-side supply-discharge line 350R having tip sides fluidly connected to the forward-side clutch mechanism 410F and the rearward-side clutch mechanism 410R, respectively, and a forward-side solenoid valve 355F and a rearward-side solenoid valve 355R interposed between the following i) and ii): i) the clutch line 310 and the drain line 340, ii) the forward-side supply-discharge line 350F and the rearward-side supply-discharge line 350R, respectively.

The forward-side solenoid valve 355F and the rearward-side solenoid valve 355R are so designed as to be operatively controlled by the control device 100, making it possible to take a supply position to fluidly connect the corresponding forward and rearward-side supply-discharge lines 350F, 350R to the clutch line 310, and a drain position to fluidly connect the corresponding forward and rearward-side supply-discharge lines 350F, 350R to the drain line 340.

As shown in FIG. 2, in the present embodiment, the forward-side solenoid valve 355F and the rearward-side solenoid valve 355R are solenoid switching valves that instantly increase/decrease the hydraulic pressure of the corresponding forward-side supply-discharge line 350F and rearward-side supply-discharge line 350R.

As shown in FIGS. 1 to 3, the transmission structure 1 according to the present embodiment further includes an output-side third transmission mechanism 70c capable of operatively transmitting, as a forward drive rotational power, the rotational power of the first element to the travel output shaft 47, and an output-side third clutch mechanism 80c that engages and disengages the power transmission of the output-side third transmission mechanism 70c.

The speed change ratio of the output-side third transmission mechanism 70c is so set that the rotational speed of the travel output shaft 47 that is realized when the rotational power of the first element is operatively transmitted to the travel output shaft 47 via the output-side third transmission mechanism 70c is higher than that of the travel output shaft 47 that is realized when the rotational power of the first element is operatively transmitted to the travel output shaft 47 via the output-side second transmission mechanism 70b and the forward-side transmission mechanism 400F.

In the present embodiment, the output-side third transmission mechanism 70c is so configured as to operatively transmit the rotational power of the first element to the travel output shaft 47 with utilizing the output-side second driven gear 74b of the output-side second transmission mechanism 70b.

In detail, as shown in FIGS. 1 and 3, the output-side third transmission mechanism 70c has the output-side second driven gear 74b and an output-side third driven gear 74c that, in a state of being relatively rotatably supported on the travel output shaft 47, is operatively connected to the output-side second driven gear 74b.

The output-side third clutch mechanism 80c is supported on the travel output shaft 47 so as to engage and disengage the output-side third driven gear 74c with and from the travel output shaft 47.

In detail, the output-side third clutch mechanism 80c has an output-side clutch housing 83 relatively non-rotatably supported on the travel output shaft 47; an output-side third friction plate group 84c that includes a third driving-side friction plate relatively non-rotatably supported on the output-side third driven gear 74c, and a third driven-side friction plate that, in a state of being opposed by the third driving-side friction plate, is relatively non-rotatably supported on the output-side clutch housing 83; and an output-side third piston (not shown) that causes the output-side third friction plate group 84c to be in a frictional engagement state.

The output-side third clutch mechanism 80c is so designed as to be switched between engagement state and disengagement state by the transmitting state switching actuator 300.

As described above, the transmission structure 1 has the transmitting state switching hydraulic mechanism 302 as the transmitting state switching actuator 300.

As shown in FIG. 2, the transmitting state switching hydraulic mechanism 302 further has an output-side third clutch line 330c having a tip side fluidly connected to the output-side third clutch mechanism 80c, and an output-side third solenoid valve 335c interposed between the following i) and ii): i) the clutch line 310 and the drain line 340, ii) the output-side third supply-discharge line 330c.

The output-side third solenoid valve 335c is so designed as to be operatively controlled by the control device 100, making it possible to take a supply position to fluidly connect the corresponding output-side third supply-discharge line 330c to the clutch line 310, and a drain position to fluidly connect the corresponding output-side third supply-discharge line 330c to the drain line 340.

As shown in FIG. 2, in the present embodiment, the output-side third solenoid valve 335c is a solenoid proportional valve capable of adjusting the increasing/decreasing rate of the hydraulic pressure of the third supply-discharge line 330c.

The work vehicle 200 has, as the driving wheels 220, a pair of right and left main driving wheels. Accordingly, the work vehicle 200, as shown in FIG. 1, further includes a pair of main driving axles 250 that respectively drive the pair of main driving wheels, and a differential mechanism 260 that differentially transmits the rotational power of the travel output shaft 47 to the pair of main driving axles 250.

As shown in FIG. 1, the work vehicle 200 further has a travel brake mechanism 255 that selectively applies a braking force to the main driving axles 250, a differential lock mechanism 265 that forcibly drives the pair of main driving axles 250 synchronously by a rotational power from the travel output shaft 47, and a subsidiary driving wheel-directed driving force takeout mechanism 270 capable of selectively outputting, to a subsidiary driving wheel, the rotational power taken out from the travel output shaft 47.

Further, the work vehicle 200 has a PTO shaft 280 that outputs a rotational power to the outside, and a PTO clutch mechanism 285 and a PTO multistage speed-change mechanism 290 that are interposed in a PTO transmission path from the drive source 210 to the PTO shaft 280.

Here, the speed change control by the control device 100 will be described. First, the speed change control that the control device 100 performs when the speed-change operating member 90 is operated in a forward accelerating direction from the vehicle speed zero position will be described.

Figure 5:
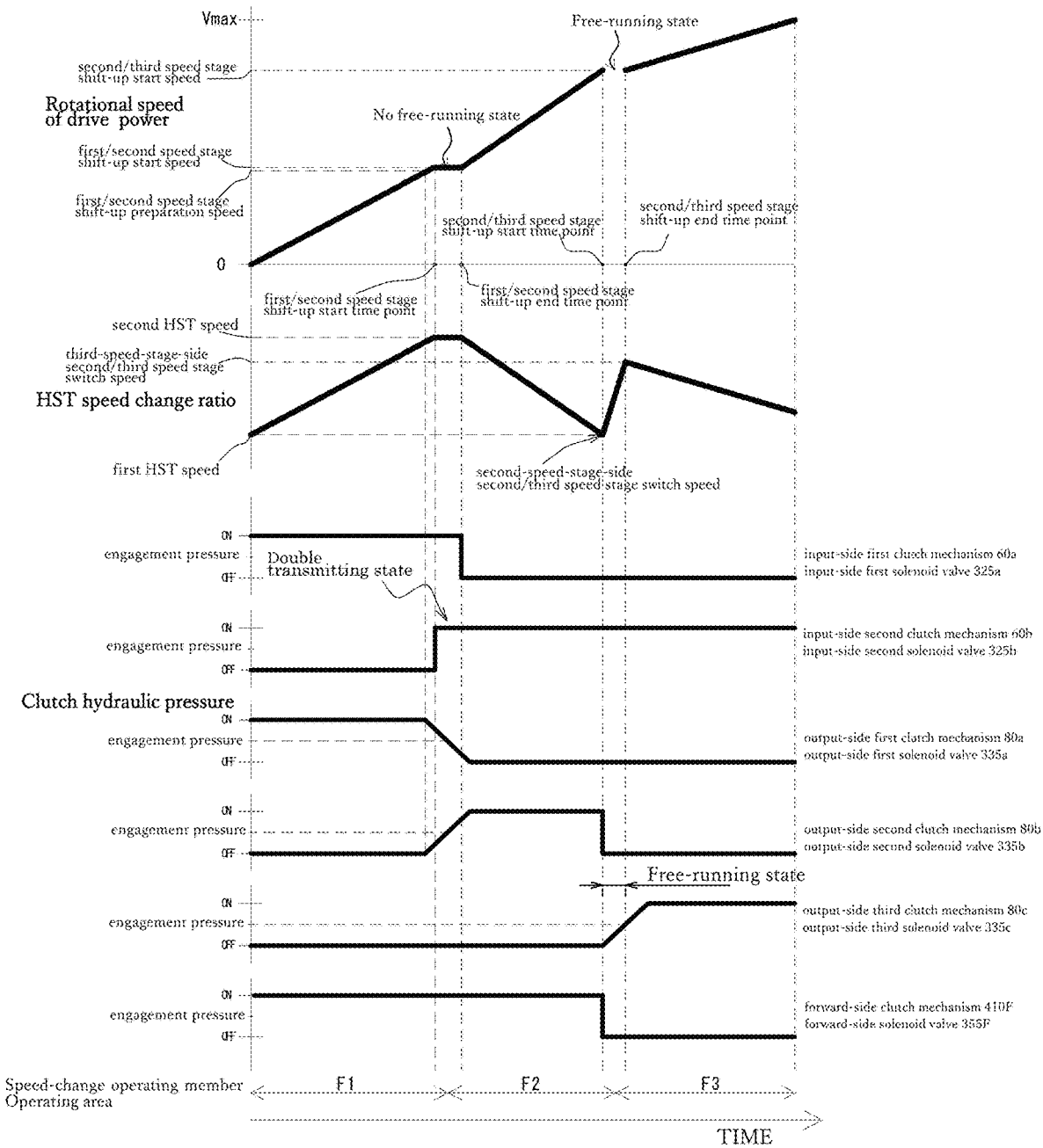
FIG. 5 is a graph showing a relation among a time lapse, a rotational speed of a drive rotational power of the transmission structure according to the embodiment, an output rotational speed of the HST, and hydraulic pressures of clutch mechanisms, in a case where a speed-change operating member is operated in a forward-side accelerating direction from a vehicle speed zero position.

FIG. 5 shows a relation among the time lapse, the rotational speed of the drive rotational power of the transmission structure 1, the output rotational speed of the HST 10, and the hydraulic pressures of the input-side first and second clutch mechanisms 60a, 60b, output-side first, second and third clutch mechanisms 80a, 80b, 80c, and the forward-side clutch mechanism 410F, in a case where the speed-change operating member 90 is operated in the forward-side accelerating direction from the vehicle speed zero position.

The speed-change operating member 90 is designed to be operable in the vehicle speed zero position, a forward-side first speed stage area F1 that is a forward-side low speed stage area, a forward-side second speed stage area F2 that is a higher speed stage area on the forward-side than the forward-side first speed stage area F1, and a forward-side third speed stage area F3 that is a higher speed stage area on the forward-side than the forward-side second speed stage area F2.

The speed-change operating member 90 can be operated, in addition to the forward-side, in a rearward-side first speed stage area that is a rearward-side low speed stage area, and in a rearward-side second speed stage area that is a higher speed stage area on the rearward-side than the rearward-side first speed stage area.

When the speed-change operating member 90 is positioned in the vehicle speed zero position and the first speed stage area (the forward-side first speed stage area F1 and the rearward-side first speed stage area), the control device 100 operates the transmitting state switching actuator 300 so that the input-side first and second input-side clutch mechanisms 60*a*, 60*b* are brought into the engagement state and the disengagement state, respectively, thereby to realize the first HMT transmitting state in which the first element acts as the reference power input portion and the second element acts as the combined power output portion that outputs, toward the speed change output shaft 45, the combined rotational power of the planetary gear mechanism 30.

Specifically, as shown in FIG. 5, when the speed-change operating member 90 is positioned in the vehicle speed zero position and the first speed stage area (the forward-side first speed stage area F1 and the rearward-side first speed stage area), the control device 100 realizes the first HMT transmitting state by having the input-side first solenoid valve 325*a* positioned in the supply position to cause the hydraulic pressure of the input-side first clutch mechanism 60*a* to be higher than or equal to an engagement hydraulic pressure (in the present embodiment, a set hydraulic pressure (clutch hydraulic pressure ON) defined by the relief valve 122), and having the input-side second solenoid valve 325*b* positioned in the drain position to cause the hydraulic pressure of the input-side second clutch mechanism 60*b* to be lower than the engagement hydraulic pressure (in the present embodiment, a drain hydraulic pressure (clutch hydraulic pressure OFF).

Thereupon, the control device 100 operates the transmitting state switching actuator 300 so that the output-side first and second clutch mechanisms 80*a*, 80*b* are brought into the engagement state and the disengagement state, respectively, thereby to realize a second element output state in which the rotational power of the second element is operatively transmitted to the speed change output shaft 45.

Specifically, as shown in FIG. 5, when the speed-change operating member 90 is positioned in the vehicle speed zero position and the first speed stage area (the forward-side first speed stage area F1 and the rearward-side first speed stage area), the control device 100 realizes the second element output state by having the output-side first solenoid valve 335*a* positioned in the supply position to cause the hydraulic pressure of the output-side first clutch mechanism 80*a* to be higher than or equal to the engagement hydraulic pressure (in the present embodiment, the set hydraulic pressure (clutch hydraulic pressure ON)), and having the output-side second solenoid valve 335*b* positioned in the drain position to cause the hydraulic pressure of the output-side second clutch mechanism 80*b* to be less than the engagement hydraulic pressure (in the present embodiment, the drain hydraulic pressure (clutch hydraulic pressure OFF)).

Meanwhile, when the speed-change operating member 90 is positioned in the second speed stage area (the forward-side second speed stage area F2 and the rearward-side second speed stage area), the control device 100 operates the transmitting state switching actuator 300 so that the input-side first and second input-side clutch mechanisms 60*a*, 60*b* are brought into the disengagement state and the engagement state, respectively, thereby to realize the second HMT transmitting state in which the second element acts as the reference power input portion and the first element acts as the combined power output portion.

Specifically, as shown in FIG. 5, when the speed-change operating member 90 is positioned in the second speed stage area (the forward-side second speed stage area F2 and the rearward-side second speed stage area), the control device 100 realizes the second HMT transmitting state by having the input-side first solenoid valve 325*a* positioned in the drain position to cause the hydraulic pressure of the input-side first clutch mechanism 60*a* to be lower than the engagement hydraulic pressure (in the present embodiment, the drain pressure (clutch hydraulic pressure OFF)), and having the input-side second solenoid valve 325*b* positioned in the supply position to cause the hydraulic pressure of the input-side second clutch mechanism 60*b* to be higher than or equal to the engagement hydraulic pressure (in the present embodiment, the set hydraulic pressure (clutch hydraulic pressure ON).

Thereupon, the control device 100 operates the transmitting state switching actuator 300 so that the output-side first and second clutch mechanisms 80*a*, 80*b* are brought into the disengagement state and the engagement state, respectively, thereby to realize a first element output state in which the rotational power of the first element is operatively transmitted to the speed change output shaft 45.

Specifically, as shown in FIG. 5, when the speed-change operating member 90 is positioned in the second speed stage area (the forward-side second speed stage area F2 and the rearward-side second speed stage area), the control device 100 realizes the first element output state by having the output-side first solenoid valve 335*a* positioned in the drain position to cause the hydraulic pressure of the output-side first clutch mechanism 80*a* to be lower than the engagement hydraulic pressure (in the present embodiment, the drain hydraulic pressure (clutch hydraulic pressure OFF)), and having the output-side second solenoid valve 335*b* positioned in the supply position to cause the hydraulic pressure of the output-side second clutch mechanism 80*b* to be higher than or equal to the engagement hydraulic pressure (in the present embodiment, the set hydraulic pressure (clutch hydraulic pressure ON)).

As shown in FIG. 5, the planetary gear mechanism 30 is so configured that, in the first HMT transmitting state, the rotational speed of the combined rotational power output from the second element is zero as the HST output is the first HST speed, and is increased as the HST output is changed from the first HST speed side to the second HST speed side, meanwhile, in the second HMT transmitting state, the rotational speed of the combined rotational power output from the first element is increased as the HST output is changed from the second HST speed side to the first HST speed side.

Further, the speed change ratio of the input-side first transmission mechanism 50*a* (input-side first speed change ratio) and the speed change ratio of the input-side second transmission mechanism 50*b* (input-side second speed change ratio) are so set that the rotational speed of the second element at the time when the HST output is set to the second HST speed in the first HMT transmitting state is same as that of the second element driven by the rotational power that is transmitted via the input-side second transmission mechanism 50*b* in the second HMT transmitting state, and the rotational speed of the first element at the time when the HST output is set to the second HST speed in the second HMT transmitting state is same as that of the first element driven by the rotational power that is transmitted via the input-side first transmission mechanism 50*a* in the first HMT transmitting state.

The control device 100 operates the HST speed change actuator 150 (in the present embodiment, the hydraulic servo mechanism 152) so that the HST output becomes the first HST speed according to the operation of the speed-change operating member 90 to the vehicle speed zero position, thereby to realize the zero speed of the drive rotational power, and also operates the HST speed change actuator 150 (in the present embodiment, the hydraulic servo mechanism 152) so that the HST output is changed from the first HST speed toward the second HST speed according to the accelerating operation of the speed-change operating member 90 from the vehicle speed zero position within the first speed stage area, thereby to accelerate the drive rotational power, that is output from the second element, according to the accelerating operation of the speed-change operating member 90 within the first speed stage area.

When the speed-change operating member 90 is shifted up from the forward-side first speed stage area F1 to the forward-side second speed stage area F2; the control device 100 is so configured as to, at a first/second speed stage shift-up start time point when the drive rotational power has reached a predetermined speed (first/second speed stage shift-up start speed), cause the clutch mechanism (i.e., the second clutch mechanism), which is disengaged in the first HMT transmitting state, of one clutch mechanism pair out of the input-side clutch mechanism pair and the output-side clutch mechanism pair, to be instantly shifted from the disengagement state to the engagement, and as to, at a first/second speed stage shift-up end time point after an elapse of a predetermined time from the first/second speed stage shift-up start time point, cause the clutch mechanism (i.e., the first clutch mechanism), which is engaged in the first HMT transmitting state, of the one clutch mechanism pair, to be instantly shifted from the engagement state to the disengagement state, thereby to realize a shift-up double transmitting state in which both of the first and second clutch mechanisms in the one clutch mechanism pair are engaged during the period from the first/second speed stage shift-up start time point to the first/second speed stage shift-up end time point, meanwhile, in the shift-up double transmitting state, as to cause the first clutch mechanism, which is engaged in the first HMT transmitting state, of the other one clutch pair out of the input-side clutch mechanism pair and the output-side clutch mechanism pair, to be gradually shifted from the engagement state to the disengagement state while having the frictional plate being frictionally slid, and also as to the second clutch mechanism, which is disengaged in the first HMT transmitting state of the other one clutch mechanism pair, to be gradually shifted from the disengagement state to the engagement state while having the friction plate being frictionally slid, thereby to switch from the engagement state of the first clutch mechanism to the engagement state of the second clutch mechanism in the other one clutch mechanism pair.

According to the above configuration, the shift-up operation from the first HMT transmitting state to the second HMT transmitting state can be smoothly performed without causing a power transmission cutoff state.

Further, in the present embodiment, the speed change ratio of the output-side first transmission mechanism 70a (output-side first speed change ratio) and the speed change ratio of the output-side second transmission mechanism 70b (output-side second speed change ratio) are so set that the rotational speed that is realized on the speed change output shaft 45 when the HST output is set to the second HST speed in the first HMT transmitting state is substantially same as the rotational speed that is realized on the speed change output shaft 45 when the HST output is set to the second HST speed in the second HMT transmitting state.

In the present embodiment, as shown in FIG. 5, the first/second speed stage shift-up start speed is set to the speed of the drive rotational power that is realized when the HST output is set to the second HST speed in the first HMT transmitting state. According to the above configuration, it is possible to effectively prevent or reduce the vehicle traveling speed from changing at the time of switching between the first and second HMT transmitting states.

As described above, in the present embodiment, the output-side first and second clutch mechanisms 80a, 80b are each of the friction plate type, and thus, even if a slight speed difference is caused on the speed change output shaft 45 at the time of switching the transmitting state, it can be effectively absorbed by the frictional sliding of the friction plate.

The control device 100 can recognize that the drive rotational power reaches the first/second speed stage shift-up start speed by, for example, a signal from an output sensor 95 that detects the rotational speed of the travel output shaft 47, the speed change output shaft 45 or the motor shaft 16. In the present embodiment, as shown in FIG. 1, the output sensor 95 is so placed as to detect the rotational speed of the travel output shaft 47.

In the present embodiment, the input-side first and second solenoid valves 325a, 325b that switch supply and discharge of the operation oil to and from the input-side first and second clutch mechanisms 60a, 60b that form the input-side clutch mechanism pair are solenoid switching valves so that the increasing and decreasing of the hydraulic pressure of the input-side first and second clutch mechanisms 60a, 60b are instantly performed.

Meanwhile, the output-side first and second solenoid valves 335a, 335b that switch supply and discharge of the operation oil to and from the output-side first and second clutch mechanisms 80a, 80b that form the output-side clutch mechanism pair are solenoid proportional valves so that the increasing and decreasing rates of the hydraulic pressures of the output-side first and second clutch mechanisms 80a, 80b are adjustable.

In this case, the input-side clutch mechanism pair is the one clutch mechanism pair and the output-side clutch mechanism pair is the other one clutch mechanism pair.

That is, as shown in FIG. 5, the control device 100, at the first/second speed stage shift-up start time point, moves the input-side second solenoid valve 325b from the drain position to the supply position thereby to instantly shift the state of the input-side second clutch mechanism 60b, which is one of the input-side clutch mechanism pair that is in the disengagement state in the first HMT transmitting state, from the disengagement state to the engagement state, and, at the first/second speed stage shift-up end time point, moves the input-side first solenoid valve 325a from the supply position to the drain position thereby to instantly shift the state of the input-side first clutch mechanism 60a, which is of the input-side clutch mechanism pair that is in the engagement state in the first HMT transmitting state, from the engagement state to the disengagement state, so that the shift-up double transmitting state in which both the input-side first and second clutch mechanisms 60a, 60b of the input-side clutch mechanism pair are engaged is realized during the period from the first/second speed stage shift-up start time point to the first/second speed stage shift-up end time point.

Further, the control device 100 moves the output-side first solenoid valve 335a, which is the solenoid proportional valve, from the supply position to the drain position so as to gradually decrease the hydraulic pressure of the output-side first clutch mechanism 80*a* from the set hydraulic pressure (clutch hydraulic pressure ON) via the engagement hydraulic pressure to the drain hydraulic pressure (clutch hydraulic pressure OFF) so that the output-side first clutch mechanism 80*a* is gradually shifted from the engagement state to the disengagement state while having the friction plate frictionally slid, and also moves the output-side second solenoid valve 335*b*, which is the solenoid proportional valve, from the drain position to the supply position thereby so as to gradually increase the hydraulic pressure of the output-side second clutch mechanism 80*b* from the drain hydraulic pressure (clutch hydraulic pressure OFF) via the engagement hydraulic pressure to the set hydraulic pressure (clutch hydraulic pressure ON) so that the output-side second clutch mechanism 80*b* is gradually shifted from the disengagement state to the engagement state while having the friction plate frictionally slid. The control device 100 performs the thus configured switching from the engagement state of the output-side first clutch mechanism 80*a* to the engagement state of the output-side second clutch mechanism 80*b*, during the shift-up double transmitting state.

In the present embodiment, as shown in FIG. 5, the movement of the output-side first solenoid valve 335*a* from the supply position to the drain position and the movement of the output-side second solenoid valve 335*b* from the drain position to the supply position are performed before the first/second speed stage shift-up start time point.

In detail, at the time point when the rotational speed of the drive rotational power reaches a first/second speed stage shift-up preparation speed that is lower than the first/second speed stage shift-up start speed by a predetermined speed, the control device 100 moves the output-side first solenoid valve 335*a* from the supply position to the drain position and moves the output-side second solenoid valve 335*b* from the supply position to the drain position.

In this case, the hydraulic pressure increasing/decreasing rates of the output-side first and second solenoid valves 335*a*, 335*b*, which are the solenoid proportional valves, are so set that, during the period from the first/second speed stage shift-up start time point to the first/second speed stage shift-up end time point, the hydraulic pressure of the output-side first clutch mechanism 80*a* becomes from the set hydraulic pressure (clutch hydraulic pressure ON) to less than the engagement hydraulic pressure, and the hydraulic pressure of the output-side second clutch mechanism 80*b* becomes from the drain hydraulic pressure (clutch hydraulic pressure OFF) to more than or equal to the engagement hydraulic pressure, and then the hydraulic pressure of the output-side first clutch mechanism 80*a* reaches the drain hydraulic pressure (clutch hydraulic pressure OFF) and the hydraulic pressure of the output-side second clutch mechanism 80*b* reaches the set hydraulic pressure (clutch hydraulic pressure ON).

As shown in FIG. 5, when the speed-change operating member 90 is positioned within the second speed stage area (the forward-side second speed stage area F2 and the rearward-side second speed stage area), the control device 100 operates the HST speed change actuator 150 such that the HST output is changed from the second HST speed side to the first HST speed side according to the accelerating operation of the speed-change operating member 90, thereby to accelerate the drive rotational power.

When the speed-change operating member 90 is shifted up from the forward-side second speed stage area F2 to the forward-side third speed stage area F3; the control device 100 is so configured as to, at a second/third speed stage shift-up start time point when the drive rotational power has reached a predetermined second/third speed stage shift-up start speed, causes the output-side second clutch mechanism 80*b* and the forward-side clutch mechanism 410F to be instantly shifted from the engagement state to the disengagement state, and as to, at a second/third speed stage shift-up end time point after an elapse of a predetermined time from the second/third speed stage shift-up start time point, causes the output-side third clutch mechanism 80*c* to be shifted from the disengagement state to the engagement state, thereby to realize a shift-up free-running state in which the power transmission to the travel output shaft 47 is cut off during the period from the second/third speed stage shift-up start time point to the second/third speed stage shift-up end time point, and the control device 100, during the shift-up free-running state, also operates the HST speed change actuator 150 such that the HST output becomes a predetermined second/third speed stage switch speed.

Here, the predetermined second/third speed stage switch speed is defined as a speed that causes the rotational speed of the travel output shaft 47, which is realized by the rotational power operatively transmitted from the second element via the output-side third transmission mechanism 70*c*, to match or approach the rotational speed of the travel output shaft 47, which is realized by the rotational power operatively transmitted from the second element via the output-side second transmission mechanism 70*b* and the forward-side transmission mechanism 400F at the second/third speed stage shift-up start time point.

In the present embodiment, the second/third speed stage shift-up start speed that defines the second/third speed stage shift-up start time point is defined as the rotational speed of the travel output shaft 47 that is realized by the rotational power operatively transmitted, when the HST output is set to the first HST speed, from the second element via the output-side second transmission mechanism 70*b* and the forward-side transmission mechanism 400F.

In the present embodiment, as described above, the output-side third solenoid valve 335*c* that switch supply and discharge of the operation oil to and from the output-side third clutch mechanism 80*c* is a solenoid proportional valve.

The hydraulic pressure increasing rate of the output-side third solenoid valve 335*c* is so set that, during a predetermined period from the second/third speed stage shift-up start time point to the second/third speed stage shift-up end time point, the hydraulic pressure of the output-side third clutch mechanism 80*c* is gradually increased from the drain hydraulic pressure (clutch hydraulic pressure OFF) to the engagement hydraulic pressure.

In this case, the control device 100, at the second/third speed stage shift-up start time point, moves the output-side third solenoid valve 335*c* from the drain position to the supply position, making it possible to reliably realize the shift-up free-running state during the period from the second/third speed stage shift-up start time point to the second/third speed stage shift-up end time point.

When the speed-change operating member 90 is positioned in the forward-side third speed stage area F3, the control device 100 brings the output-side first and second clutch mechanisms 80*a*, 80*b* into the disengagement state and brings the output-side third clutch mechanism 80*c* into the engagement state with realizing the second HMT transmitting state, and also operates the HST speed change actuator 150 such that the rotational speed of the drive rotational power becomes the rotational speed that corresponds to the operating position of the speed-change operating member 90.

In detail, as shown in FIG. 5, when the speed-change operating member 90 is positioned in the forward-side third speed stage area F3, the control device 100 operates the HST speed change actuator 150 so that the rotational speed of the HST output is changed from the second/third speed stage switch speed side to the first HST speed side according to the accelerating operation of the speed-change operating member 90.

When the speed-change operating member 90 is positioned in the forward-side third speed stage area F3, there is no need to transmit a power from the speed change output shaft 45 to the travel output shaft 47; therefore, the control device 100 disengages the forward-side clutch mechanism 410F, as shown in FIG. 5.

Hereinafter, the speed change control that the control device 100 performs when the speed-change operating member 90 is operated in a decelerating direction will be described.

Figure 6:
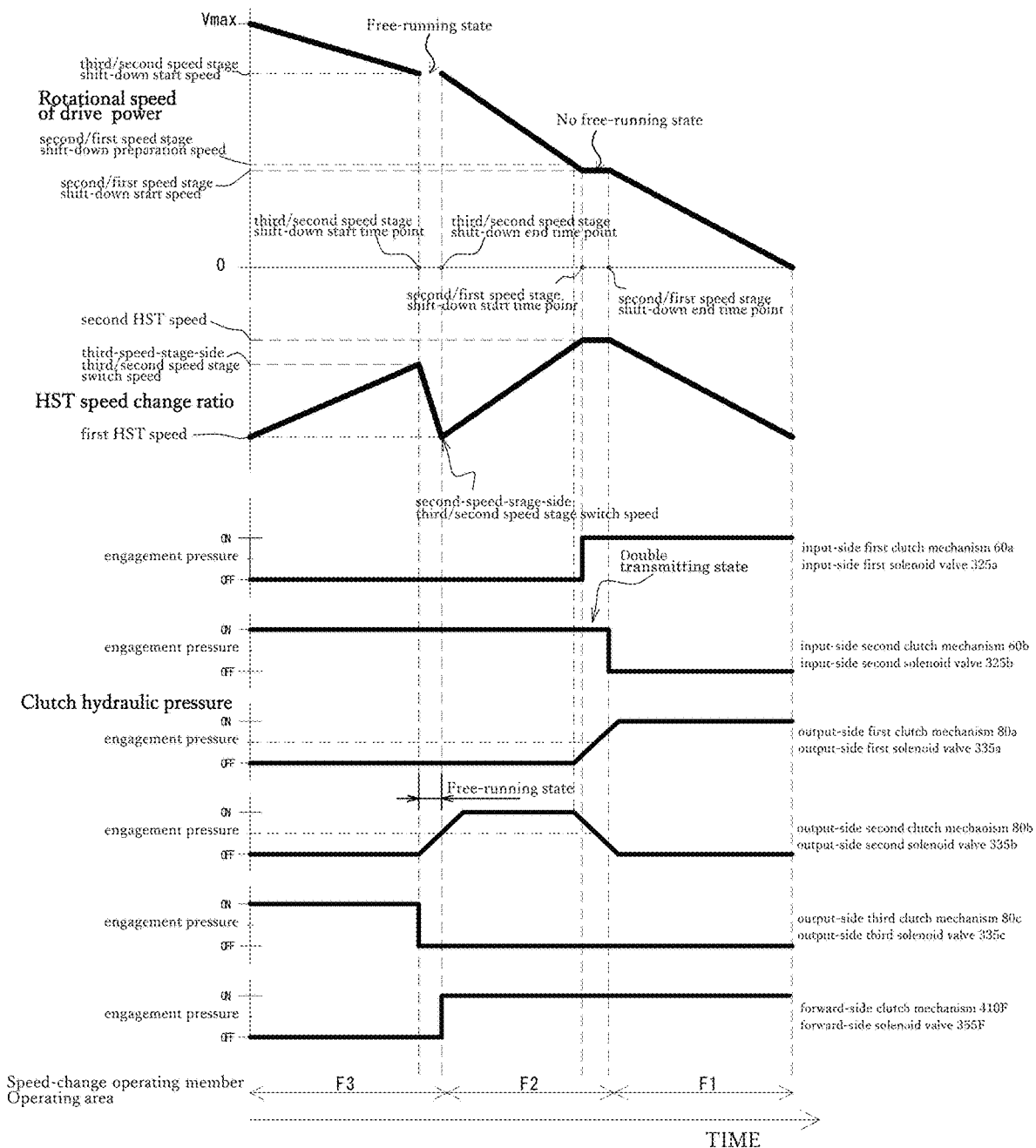
FIG. 6 is a grapy showing a relation among the time lapse, the rotational speed of the drive rotational power of the transmission structure according to the embodiment, the output rotational speed of the HST, and the hydraulic pressures of the clutch mechanisms, in a case where the speed-change operating member is operated in a decelerating direction from a forward-side third speed stage area via a forward-side second speed stage area to a forward-side first speed stage area.

FIG. 6 shows a relation among the time lapse, the rotational speed of the drive rotational power of the transmission structure 1, the output rotational speed of the HST 10, and the hydraulic pressures of the clutch mechanisms 60a-60b, 80a-80c and 410F, in a case where the speed-change operating member 90 is operated in the decelerating direction from the forward-side third speed stage area F3 via the forward-side second speed stage area F2 to the forward-side first speed stage area F1.

As shown in FIG. 6, when the speed-change operating member 90 is positioned in the forward-side third speed stage area F3, the control device 100, with the second HMT transmitting state being realized, disengages the output-side first and second clutch mechanisms 80a, 80b and engages the output-side third clutch mechanism 80c and disengages the forward-side clutch mechanism 410F, and then operates the HST speed change actuator 150 so that the rotational speed of the HST output changes from the first HST speed side to the second HST speed side according to the decelerating operation of the speed-change operating member 90, thereby to decrease, according to the decelerating operation of the speed-change operating member 90, the rotational speed of the drive rotational power operatively transmitted from the first element via the output-side third transmission mechanism 70c and the output-side third clutch mechanism 80c to the travel output shaft 47.

When the speed-change operating member 90 is shifted down from the forward-side third speed stage area F3 to the forward-side second speed stage area F2; the control device 100 is so configured as to, at the third/second speed stage shift-down start time point when the drive rotational power has reached a predetermined speed (third/second speed stage shift-down start speed), causes the output-side third clutch mechanism 80c to be shifted from the engagement state to the disengagement state, and as to, at a third/second speed stage shift-down end time point after an elapse of a predetermined time from the third/second speed stage shift-down start time point, causes the output-side second clutch mechanism 80b and the forward-side clutch mechanism 410F to be shifted from the disengagement state to the engagement state, thereby to realize a shift-down free-running state in which the power transmission path to the travel output shaft 47 is cut off during the period from the third/second speed stage shift-down start time point to the third/second speed stage shift-down end time point.

In the present embodiment, as shown in FIG. 6, the hydraulic pressure increasing rate of the output-side second solenoid valve 335b is so set that, during the predetermined time period from the third/second speed stage shift-down start time point to the third/second speed stage shift-down end time point, the hydraulic pressure of the output-side second clutch mechanism 80b is gradually increased from drain hydraulic pressure (clutch hydraulic pressure OFF) to engagement hydraulic pressure.

Meanwhile, as shown in FIG. 6, the output-side third solenoid valve 335c is so set as to, when changed from the supply position to the drain position, instantly lower the hydraulic pressure of the corresponding output-side third clutch mechanism 80c from the set hydraulic pressure (clutch hydraulic pressure ON) to the drain hydraulic pressure (clutch hydraulic pressure OFF).

Further, the forward-side solenoid valve 355F, when changed from the drain position to the supply position, instantly ups the hydraulic pressure of the corresponding forward-side clutch mechanism 410F from the drain hydraulic pressure (clutch hydraulic pressure OFF) to the engagement hydraulic pressure (in the present embodiment, the set hydraulic pressure (clutch hydraulic pressure ON)).

As shown in FIG. 6, the control device 100 is so configured, at the third/second speed stage shift-down start time point, as to move the output-side third solenoid valve 335c from the supply position to the drain position and move the output-side second solenoid valve 335b from the drain position to the supply position, and at the third/second speed stage shift-down end time point, as to move the forward-side solenoid valve 355F from the drain position to the supply position, thereby to reliably realize the shift-down free-running state in the predetermined time period from the third/second speed stage shift-down start time point to the third/second speed stage shift-down end time point.

Further, the control device 100 is so configured as to change the speed of the HST 10 via the HST speed change actuator 150 in the shift-down free-running state such that the rotational speed of the travel output shaft 47 rotatably driven via the output-side second transmission mechanism 70b and the forward-side transmission mechanism 400F at the third/second speed stage shift-down end time point matches or approaches the rotational speed of the travel output shaft 47 rotatably driven via the output-side third transmission mechanism 70c at the third/second speed stage shift-down start time point.

Here, the predetermined third/second speed stage switching speed is defined as a speed that causes the rotational speed, which is realized on the travel output shaft 47 when the HST output is set to the third/second speed stage switching speed in the state in which the rotational power is operatively transmitted from the first element via the output-side third transmission mechanism 70c to the travel output shaft 47, to match or approach the rotational speed, which can be realized on the travel output shaft 47 in the state in which the rotational power is operatively transmitted from the first element via the output-side second transmission mechanism 70b and the forward-side transmission mechanism 400F to the travel output shaft 47.

In the present embodiment, as shown in FIG. 6, the third/second speed stage switching speed is defined as a speed that causes the rotational speed, which is realized on the travel output shaft 47 when the HST output is set to the third/second speed stage switching speed in the state in which the rotational power is operatively transmitted from the first element via the output-side third transmission mechanism 70c to the travel output shaft 47, to match or approach the rotational speed, which is realized on the travel output shaft 47 when the HST output is set to the first HST speed in the state in which the rotational power is operatively transmitted from the first element via the output-side second transmission mechanism 70*b* and the forward-side transmission mechanism 400F to the travel output shaft 47.

Preferably, the third/second speed stage switching speed is substantially the same speed as the second/third speed stage switching speed. The above configuration can simplify the control structure of the control device 100.

As shown in FIG. 6, when the speed-change operating member 90 is positioned in the forward-side second speed stage area F2, the control device 100, with the second HMT transmitting state realized, brings the output-side second clutch mechanism 80*b* and the forward-side clutch mechanism 410F into the engagement state and the output-side first and third clutch mechanisms 80*a*, 80*c* into the disengagement state, and then operates the HST speed change actuator 150 so that the rotational speed of the HST output is changed from the first HST speed side to the second HST speed side according to the decelerating operation of the speed-change operating member 90, thereby to decelerate the drive rotational power according to the decelerating operation of the speed-change operating member 90.

When the speed-change operating member 90 is shifted down from the forward-side second speed stage area F2 to the forward-side first speed stage area F1; the control device 100 is so configured, at a second/first speed stage shift-down start time point when the drive rotational power reaches a predetermined speed (the second/first speed stage shift-down start speed), as to instantly transfer, from the disengagement state to the engagement state, the first clutch mechanism (the input-side first clutch mechanism 60*a*) on one clutch mechanism pair (for example, the input-side clutch mechanism) out of the input-side clutch mechanism pair and the output-side clutch mechanism pair, and at a second/first speed stage shift-down end time point after an elapse of a predetermined time from the second/first speed stage shift-down start time point, as to instantly transfer, from the engagement state to the disengagement state, the second clutch mechanism (the input-side second clutch mechanism 60*b*) of the one clutch mechanism pair (the input-side clutch mechanism pair), thereby to realize a shift-down double transmitting state in which both of the first and second clutch mechanisms in the one clutch mechanism pair (the input-side clutch mechanism pair) are engaged during the period from the second/first speed stage shift-down start time point to the second/first speed stage shift-down end time point, meanwhile, in the shift-down double transmitting state, as to, while having the friction plates frictionally slid, transfer, from the disengagement state to the engagement state, the first clutch mechanism (the output-side first clutch mechanism 80*a*) of the other one clutch mechanism pair (the output-side clutch mechanism pair) out of the input-side clutch mechanism pair and the output-side clutch mechanism pair, and as to, while having the friction plate frictionally slid, transfer, from the engagement state to the disengagement state, the second clutch mechanism (the output-side second clutch mechanism 80*b*) of the other one clutch mechanism pair, thereby to switch from the engagement state of the second clutch mechanism to the engagement state of the first clutch mechanism in the other one clutch mechanism pair (the output-side clutch mechanism pair).

According to the above configuration, the shift-down movement from the second HMT transmitting state to the first HMT transmitting state can be smoothly performed without causing a power transmission cutoff state.

In the present embodiment, as shown in FIG. 6, the second/first speed stage shift-down start speed is set to the speed of the drive rotational power that is realized when the HST output is set to have the second HST speed in the second HMT transmitting state.

As described above, in the present embodiment, the output-side first and second solenoid valves 335*a*, 335*b* that switch supply and discharge of the operation oil to and from the output-side first and second clutch mechanisms 80*a*, 80*b* that form the output-side clutch mechanism pair are solenoid proportional valves, making it possible to adjust the increasing/decreasing rates of the hydraulic pressures of the output-side first and second clutch mechanisms 80*a*, 80*b*.

In this case, the input-side clutch mechanism pair is the one clutch mechanism pair and the output-side clutch mechanism pair is the other one clutch mechanism pair.

As shown in FIG. 6, the control device 100, at the second/first speed stage shift-down start time point, moves the input-side first solenoid valve 325*a* from the drain position to the supply position, and instantly transfers, from the disengagement state to the engagement state, the input-side first clutch mechanism 60*a* of the input-side clutch mechanism pair that is in the disengagement state in the second HMT transmitting state, and at the second/first speed stage shift-down end time point, moves the input-side second solenoid valve 325*b* from the supply position to the drain position, and instantly transfers, from the engagement state to the disengagement state, the input-side second clutch mechanism 60*b* of the input-side clutch mechanism pair that is in the engagement state in the second HMT transmitting state, thereby to realize the shift-down double transmitting state in which both of the input-side first and second clutch mechanisms 60*a*, 60*b* in the input-side clutch mechanism pair are engaged during the period from the second/first speed stage shift-down start time point to the second/first speed stage shift-down end time point.

Further, the control device 100 moves the output-side second solenoid valve 335*b*, which is of a solenoid proportional valve, from the supply position to the drain position thereby to gradually decrease the hydraulic pressure of the output-side second clutch mechanism 80*b* from the set hydraulic pressure (clutch hydraulic pressure ON) to less than the engagement hydraulic pressure (in detail, drain hydraulic pressure (clutch hydraulic pressure OFF)) so as to cause the output-side second clutch mechanism 80*b* to be gradually shifter from the engaged state to the disengaged state thereby while having the friction plate frictionally slid, and moves the output-side first solenoid valve 335*a*, which is of a solenoid proportional valve, from the drain position to the supply position thereby to gradually increase the hydraulic pressure of the output-side first clutch mechanism 80*a* from the drain hydraulic pressure (clutch hydraulic pressure OFF) to more than or equal to the engagement hydraulic pressure (in detail, set hydraulic pressure (clutch hydraulic pressure ON)) so as to cause the output-side first clutch mechanism 80*a* to be gradually shifted from the disengagement state to the engagement state while having the friction plates frictionally slid, performing the switching from the engagement state of the output-side second clutch mechanism 80*b* to the engagement state of the output-side first clutch mechanism 80*a* during the shift-down double transmitting state.

In the present embodiment, as shown in FIG. 6, the movement of the output-side second solenoid valve 335*b* from the supply position to the drain position and the movement of the output-side first solenoid valve 335*a* from the drain position to the supply position are performed prior to the second/first speed stage shift-down start time point.

In detail, the control device 100 is so configured that, when the rotational speed of the drive rotational power reaches a second/first speed stage shift-down preparation speed that is faster than the second/first speed stage shift-down start speed by a predetermined speed, the control device 100 moves the output-side second solenoid valve 335b from the supply position to the drain position and moves the output-side first solenoid valve 335a from the drain position to the supply position.

In this case, the hydraulic pressure increasing/decreasing rates of the output-side first and second solenoid valves 335a, 335b, which are solenoid proportional valves, are so set that, in the shift-down double transmitting state from the second/first speed stage shift-down start time point to the second/first speed stage shift-down end time point, the hydraulic pressure of the output-side first clutch mechanism 80a increases from the drain hydraulic pressure (clutch hydraulic pressure OFF) to more than or equal to the engagement hydraulic pressure, and the hydraulic pressure of the output-side second clutch mechanism 80b decreases from the set hydraulic pressure (clutch hydraulic pressure ON) to less than the engagement hydraulic pressure, and after an elapse of a predetermined time from the second/first speed stage shift-down end time point, the hydraulic pressure of the output-side first clutch mechanism 80a reaches the set hydraulic pressure (clutch hydraulic pressure ON), and the hydraulic pressure of the output-side second clutch mechanism 80b reaches the drain hydraulic pressure (clutch hydraulic pressure OFF).

In the present embodiment, as described above, the output-side first and second solenoid valves 335a, 335b are solenoid proportional valves so that the hydraulic pressures of the first and second clutch mechanisms 80a, 80b can be gradually increased and decreased, while the input-side first and second solenoid valves 325a, 325b are solenoid switching valves so that the hydraulic pressures of the input-side first and second clutch mechanisms 60a, 60b are instantly increased and decreased. However, as a matter of course, the present invention is not limited to the above embodiment.

Figure 7:
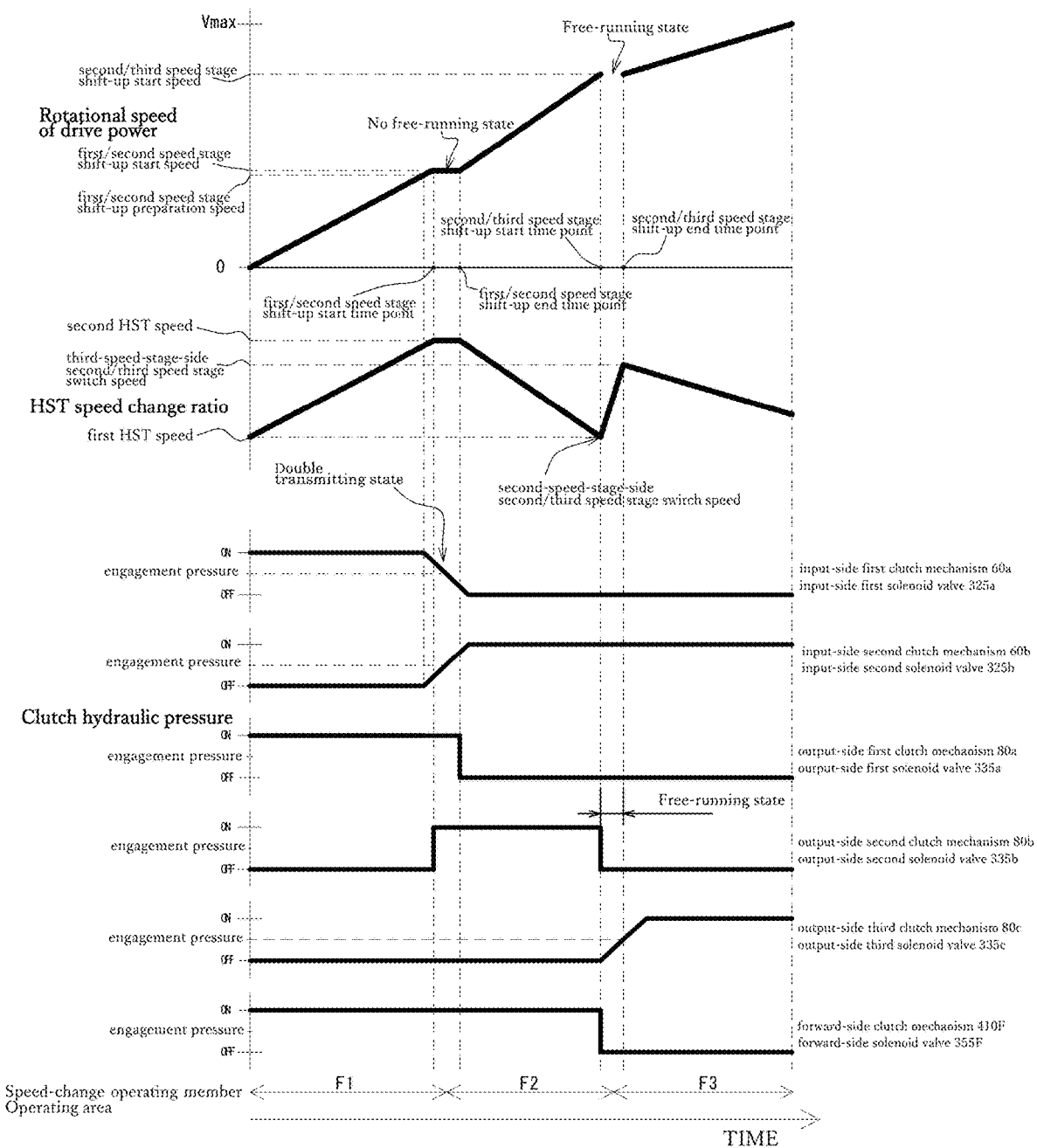
FIG. 7 is a graph showing a relation among the time lapse, the rotational speed of the drive rotational power of the transmission structure according to a first modified example of the embodiment, the output rotational speed of the HST, and the hydraulic pressures of the clutch mechanisms, in a case where the speed-change operating member is operated in the forward-side accelerating direction from the vehicle speed zero position.
Figure 8:
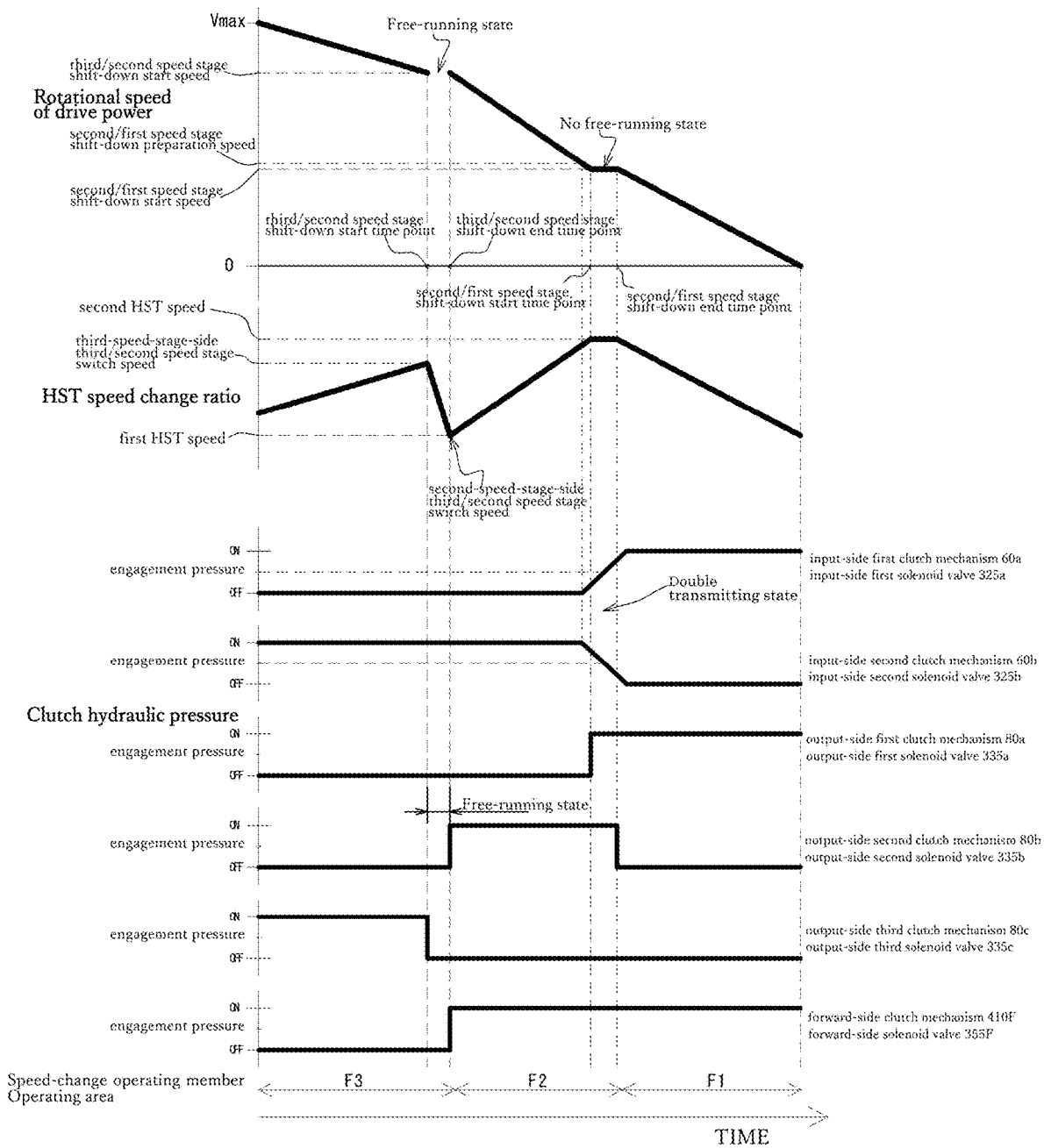
FIG. 8 is a grapy showing a relation among the time lapse, the rotational speed of the drive rotational power of the transmission structure according to the first modified example, the output rotational speed of the HST, and the hydraulic pressures of the clutch mechanisms, in a case where the speed-change operating member is operated in the decelerating direction from the forward-side third speed stage area via the forward-side second speed stage area to the forward-side first speed stage area.

For example, it may be so modified to use solenoid switching valves as the output-side first and second solenoid valves 335a, 335b, and use solenoid proportional valves as the input-side first and second solenoid valves 325a, 325b. FIGS. 7 and 8 show graphs of a first modified example in which the thus modification is applied, and corresponds to FIGS. 5 and 6, respectively.

Here, the control structure at the time when the speed stage is changed between the forward-side second speed stage and the forward-side third speed stage.

Figure 9:
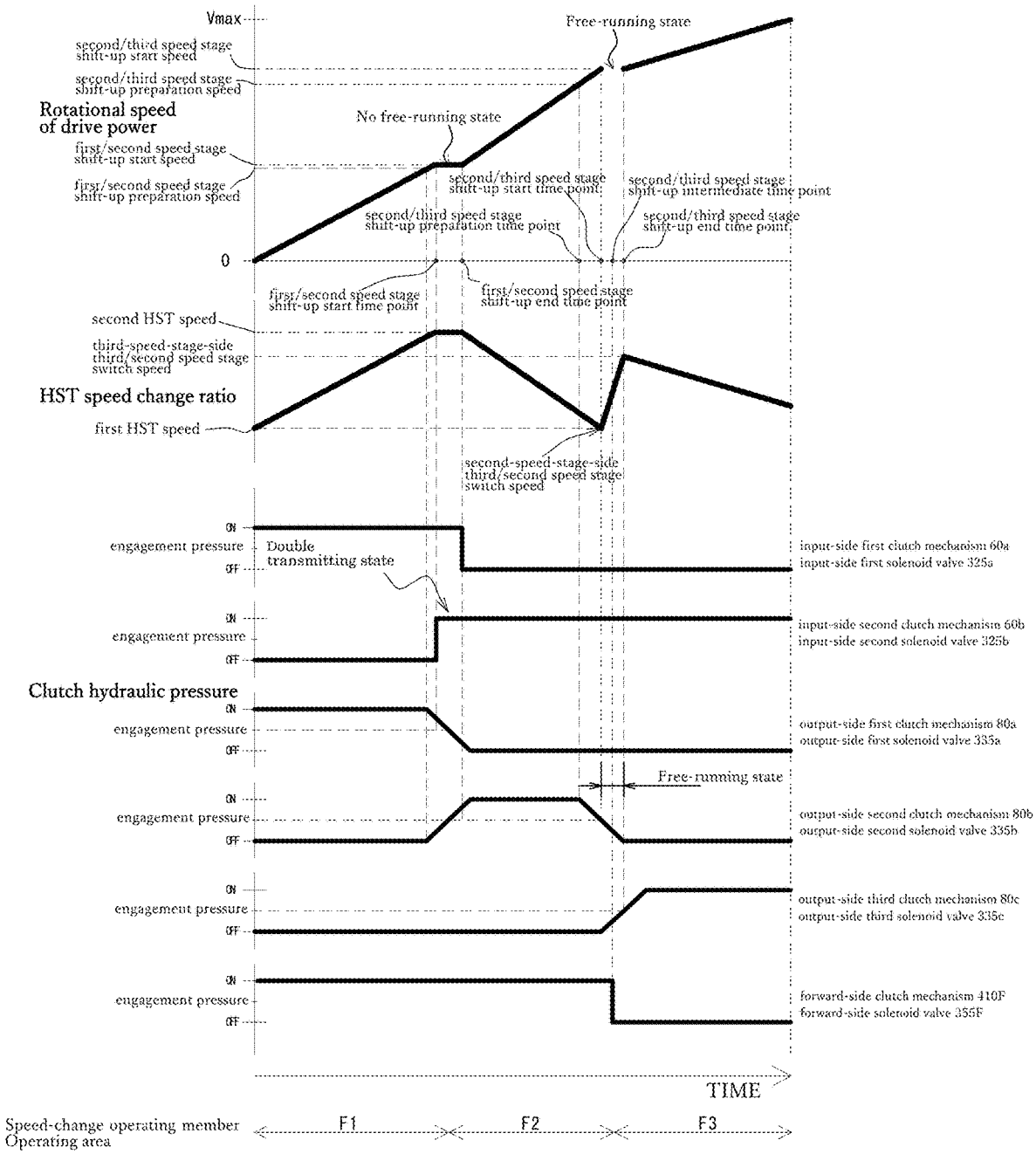
FIG. 9 is a graph showing a relation among the time lapse, the rotational speed of the drive rotational power of the transmission structure according to a second modified example of the embodiment, the output rotational speed of the HST, and the hydraulic pressures of the clutch mechanisms, in a case where the speed-change operating member is operated in the forward-side accelerating direction from the vehicle speed zero position.

FIG. 9 is a graph showing a relation among the time lapse, the rotational speed of the drive rotational power of a transmission structure according to a second modified example, the output rotational speed of the HST, and the hydraulic pressures of the clutch mechanisms, in a case where the speed-change operating member 90 is operated in the forward-side accelerating direction from the vehicle speed zero position in the transmission structure according to the second modified example.

The second modified example is different from the present embodiment in the control structure that is performed in the shift-up operation from the forward-side second speed stage F2 to the forward-side third speed stage F3.

Specifically, as shown in FIG. 9, in the second modified example, when the speed-change operating member 90 is shifted up from the forward-side second speed stage area to the forward-side third speed stage area, the control device 100 realizes the shift-up free-running state in which the power transmission to the travel output shaft 47 is cut off during the period from the second/third speed stage shift-up start time point to the second/third speed stage shift-up end time point, by starting, at a second/third speed stage shift-up preparation time point when the drive rotational power has reached the second/third speed stage shift-up preparation speed, the transition of one (the output-side second clutch mechanism 80b in FIG. 9) of the output-side second clutch mechanism 80b and the forward-side clutch mechanism 410F from the engagement state to the disengagement state while having the friction plates frictionally slid and then bringing, at the second/third speed stage shift-up start time point after an elapse of a predetermined time from the second/third speed stage shift-up preparation time point, the one of the output-side second clutch mechanism 80b and the forward-side clutch mechanism 410F into the disengagement state, shifting, at a second/third speed stage shift-up intermediate time point after an elapse of a predetermined time from the second/third speed stage shift-up start time point, the other one (the forward-side clutch mechanism 410F in FIG. 9) of the output-side second clutch mechanism 80b and the forward-side clutch mechanism 410F from the engagement state to the disengagement state, and shifting, at the second/third speed stage shift-up end time point after an elapse of a predetermined time from the second/third speed stage shift-up intermediate time point, the output-side third clutch mechanism 80c from the disengagement state to the engagement state.

Further, the control device 100 is so configured as to change the speed of the HST 10 via the HST speed change actuator 150 in the shift-up free-running state such that the rotational speed of the travel output shaft 47 rotatably driven via the output-side third transmission mechanism 70c at the second/third speed stage shift-up end time point matches or approaches the rotational speed of the travel output shaft 47 just before the output-side third clutch mechanism 80c is shifted to the engagement state.

In the second modified example shown in FIG. 9, the rotational speed of the HST output is changed from the second-speed-stage-side second/third speed stage switching speed (the first HST speed in this example) to the third-speed-stage-side second/third speed stage switching speed during the shift-up free-running state from the second/third speed stage shift-up start time point to the second/third speed stage shift-up end time point.

Figure 10:
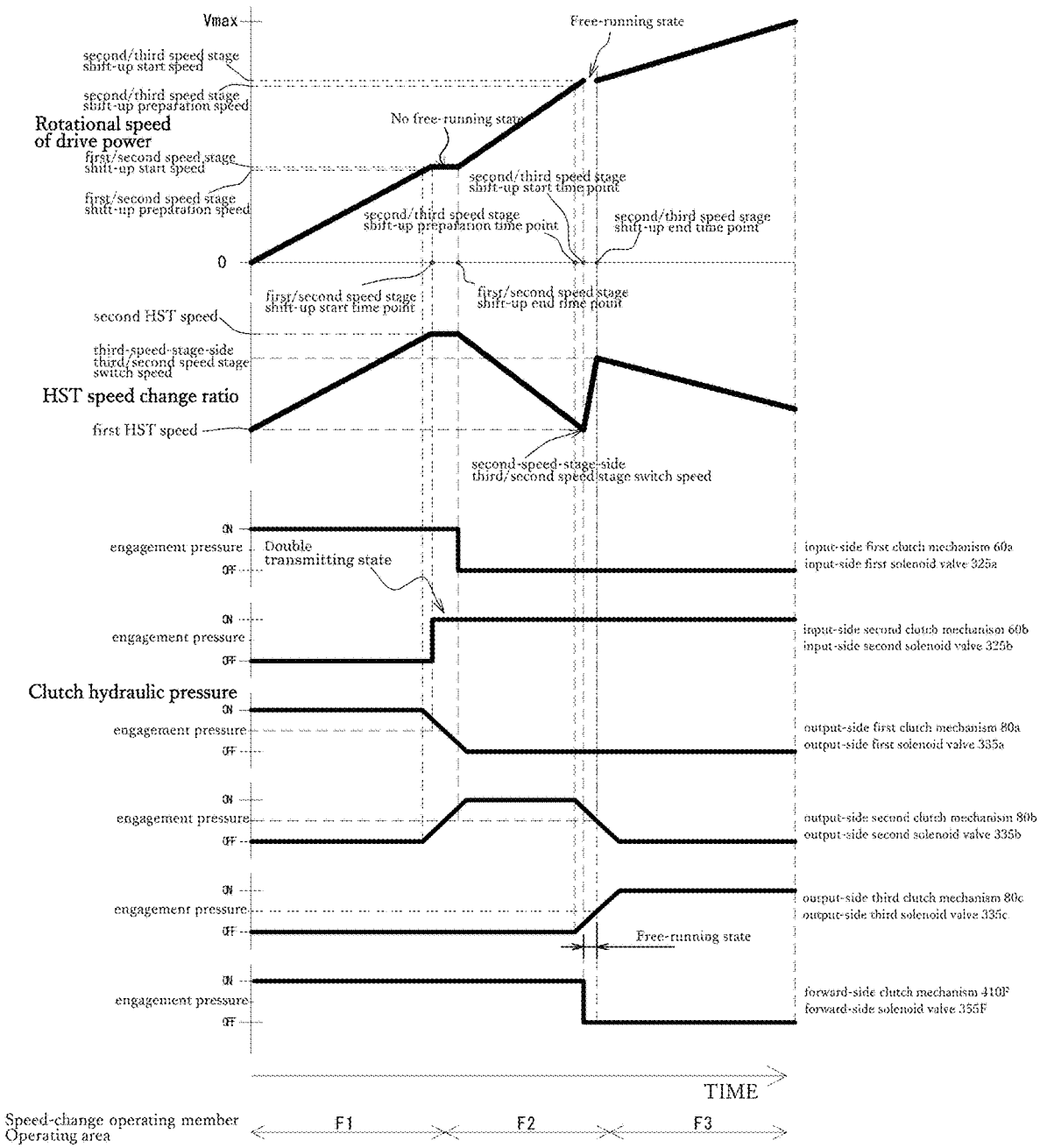
FIG. 10 is a graph showing a relation among the time lapse, the rotational speed of the drive rotational power of the transmission structure according to a third modified example of the embodiment, the output rotational speed of the HST, and the hydraulic pressures of the clutch mechanisms, in a case where the speed-change operating member is operated in the forward-side accelerating direction from the vehicle speed zero position.

FIG. 10 is a graph showing a relation among the time lapse, the rotational speed of the drive rotational power of a transmission structure according to a third modified example, the output rotational speed of the HST, and the hydraulic pressures of the clutch mechanisms, in a case where the speed-change operating member 90 is operated in the forward-side accelerating direction from the vehicle speed zero position in the transmission structure according to the third modified example.

The third modified example is different from the present embodiment also in the control structure that is performed in the shift-up operation from the forward-side second speed stage F2 to the forward-side third speed stage F3.

Specifically, as shown in FIG. 10, in the third modified example, when the speed-change operating member 90 is shifted up from the forward-side second speed stage area to the forward-side third speed stage area, the control device 100 realizes the shift-up free-running state in which the power transmission to the travel output shaft 47 is cut off during the period from the second/third speed stage shift-up start time point to the second/third speed stage shift-up end time point, by starting, at the second/third speed stage shift-up preparation time point when the drive rotational power has reached the second/third speed stage shift-up preparation speed, the transition of the output-side second clutch mechanism 80*b* from the engagement state to the disengagement state while having the friction plates frictionally slid and the transition of the output-side third clutch mechanism 80*c* from the disengagement state to the engagement state while having the friction plates frictionally slid, and at the second/third speed stage shift-up end time point after the elapse of the predetermined time from the second/third speed stage shift-up preparation time point, bringing the output-side second clutch mechanism 80*b* into the disengagement state while bringing the output-side third clutch mechanism 80*c* into the engagement state, and shifting, at the time point (that is, the second/third speed stage shift-up start time point) before the second/third speed stage shift-up start time point, the forward-side clutch mechanism 410F from the engagement state to the disengagement state.

Further, the control device 100 is so configured as to change the speed of the HST 10 via the HST speed change actuator 150 in the shift-up free-running state such that the rotational speed of the travel output shaft 47 rotatably driven via the output-side third transmission mechanism 70*c* at the second/third speed stage shift-up end time point matches or approaches the rotational speed of the travel output shaft 47 just before the output-side third clutch mechanism 80*c* is shifted to the engagement state.

Also in the third modified example shown in FIG. 10, the rotational speed of the HST output is changed from the second-speed-stage-side second/third speed stage switching speed (the first HST speed in this example) to the third-speed-stage-side second/third speed stage switching speed during the shift-up free-running state from the second/third speed stage shift-up start time point to the second/third speed stage shift-up end time point.

Figure 11:
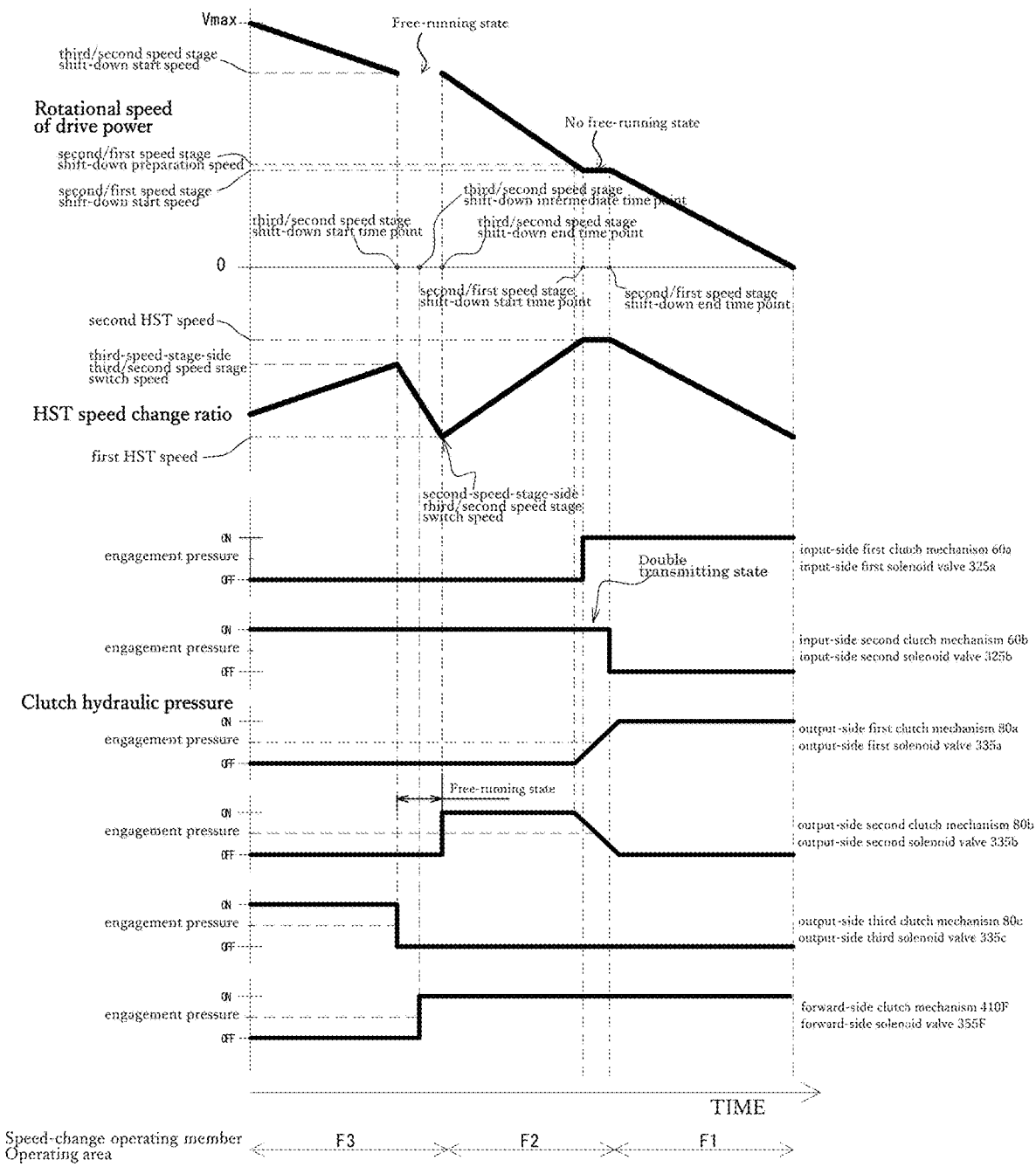
FIG. 11 is a grapy showing a relation among the time lapse, the rotational speed of the drive rotational power of the transmission structure according to a fourth modified example, the output rotational speed of the HST, and the hydraulic pressures of the clutch mechanisms, in a case where the speed-change operating member is operated in the decelerating direction from the forward-side third speed stage area via the forward-side second speed stage area to the forward-side first speed stage area.

FIG. 11 is a graph showing a relation among the time lapse, the rotational speed of the drive rotational power of a transmission structure according to a fourth modified example, the output rotational speed of the HST, and the hydraulic pressures of the clutch mechanisms, in a case where the speed-change operating member 90 is operated in the decelerating direction from the forward-side third speed stage area via the forward-side second speed stage area to the forward-side first speed stage area.

The fourth modified example is different from the present embodiment in the control structure that is performed in the shift-down operation from the forward-side third speed stage F3 to the forward-side second speed stage F2.

Specifically, as shown in FIG. 11, in the fourth modified example, when the speed-change operating member 90 is shifted down from the forward-side third speed stage area to the forward-side second speed stage area, the control device 100 realizes the shift-down free-running state in which the power transmission to the travel output shaft 47 is cut off during the period from the third/second speed stage shift-down start time point to the third/second speed stage shift-down end time point, by shifting, at the third/second speed stage shift-down start time point when the drive rotational power has reached the predetermined third/second speed stage shift-down start speed, the output-side third clutch mechanism 80*c* from the engagement state to the disengagement state, shifting, at a third/second speed stage shift-down intermediate time point after the elapse of the predetermined time from the third/second speed stage shift-down start time point, the forward-side clutch mechanism 410F from the disengagement state to the engagement state, and shifting, at the third/second speed stage shift-down end time point after the elapse of the predetermined time from the third/second speed stage shift-down intermediate time point, the output-side second clutch mechanism 80*b* from the disengagement state to the engagement state.

Further, the control device 100 is so configured as to change the speed of the HST 10 via the HST speed change actuator 150 in the shift-down free-running state such that the rotational speed of the travel output shaft 47 rotatably driven via the output-side second transmission mechanism 70*b* and the forward-side transmission mechanism 400F at the third/second speed stage shift-down end time point matches or approaches the rotational speed of the travel output shaft 47 just before the output-side second clutch mechanism 80*b* is shifted to the engagement state.

In the fourth modified example shown in FIG. 11, the rotational speed of the HST output is changed from the third-speed-stage-side third/second speed stage switching speed to the second-speed-stage-side third/second speed stage switching speed during the shift-down free-running state from the third/second speed stage shift-down start time point to the third/second speed stage shift-down end time point.

According to the fourth modified example, the transition of the output-side second clutch mechanism 80*b* from the disengagement state to the engagement state in the shift-down operation from the forward-side third speed stage to the forward-side second speed stage can be performed in a state where a rotational speed difference between a driving side and a driven side in the output-side second clutch mechanism 80*b* is reduced.

Accordingly, it can be prevented that a large reverse torque is transmitted from the side of the travel output shaft 47 to the main driving shaft 212 in the shift-down operation from the forward-side third speed stage to the forward-side second speed state, and thereby to effectively prevent an engine stall of the drive source 210 caused by an overload or the like.

Figure 12:
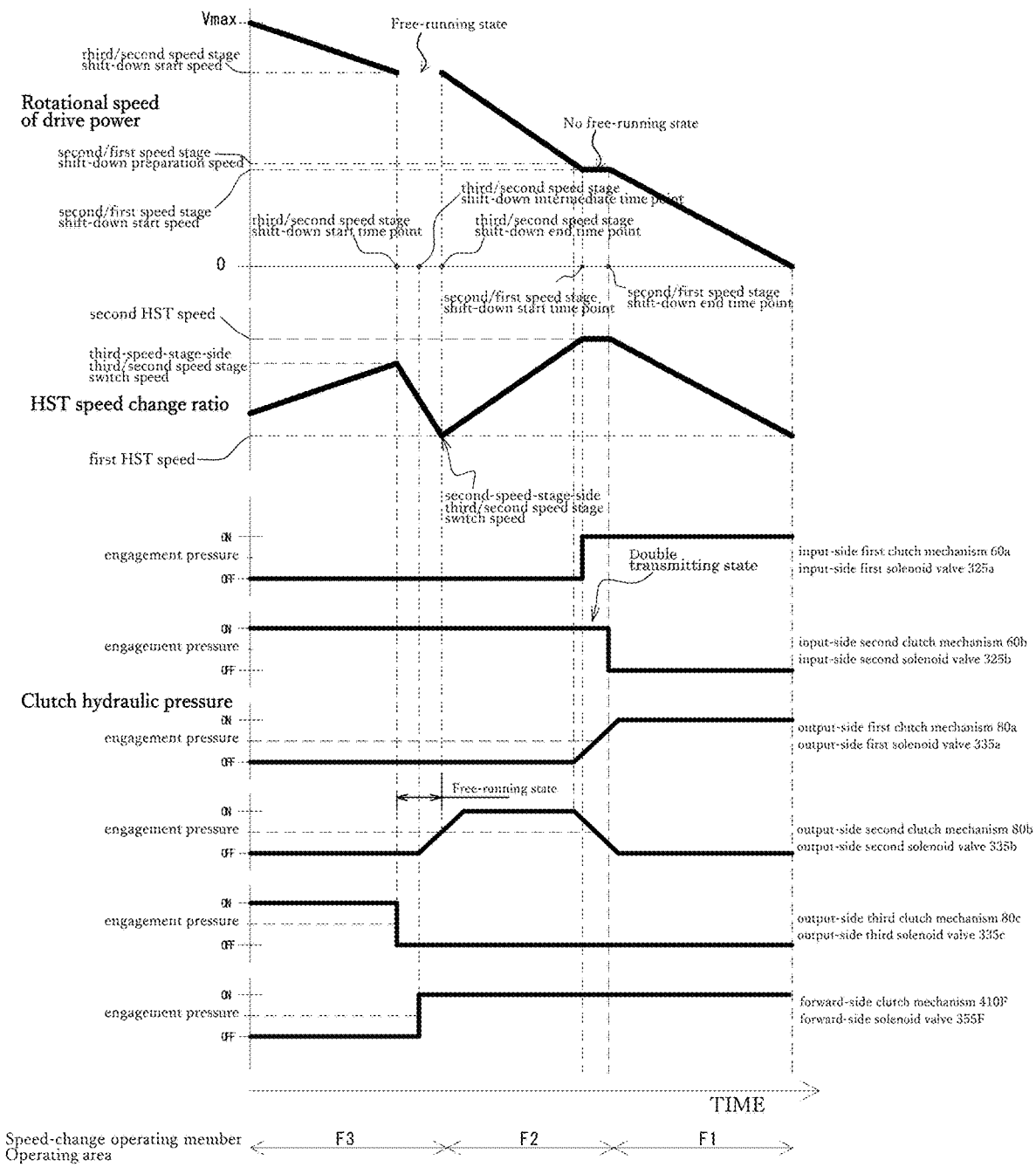
FIG. 12 is a grapy showing a relation among the time lapse, the rotational speed of the drive rotational power of the transmission structure according to a fifth modified example, the output rotational speed of the HST, and the hydraulic pressures of the clutch mechanisms, in a case where the speed-change operating member is operated in the decelerating direction from the forward-side third speed stage area via the forward-side second speed stage area to the forward-side first speed stage area.

FIG. 12 is a graph showing a relation among the time lapse, the rotational speed of the drive rotational power of a transmission structure according to a fifth modified example, the output rotational speed of the HST, and the hydraulic pressures of the clutch mechanisms, in a case where the speed-change operating member 90 is operated in the decelerating direction from the forward-side third speed stage area via the forward-side second speed stage area to the forward-side first speed stage area.

The fifth modified example is different from the fourth modified example only in that the transition of the output-side second clutch mechanism 80*b* from the disengagement state to the engagement state is gradually performed in such a manner that the friction plates are frictionally slid.

Figure 13:
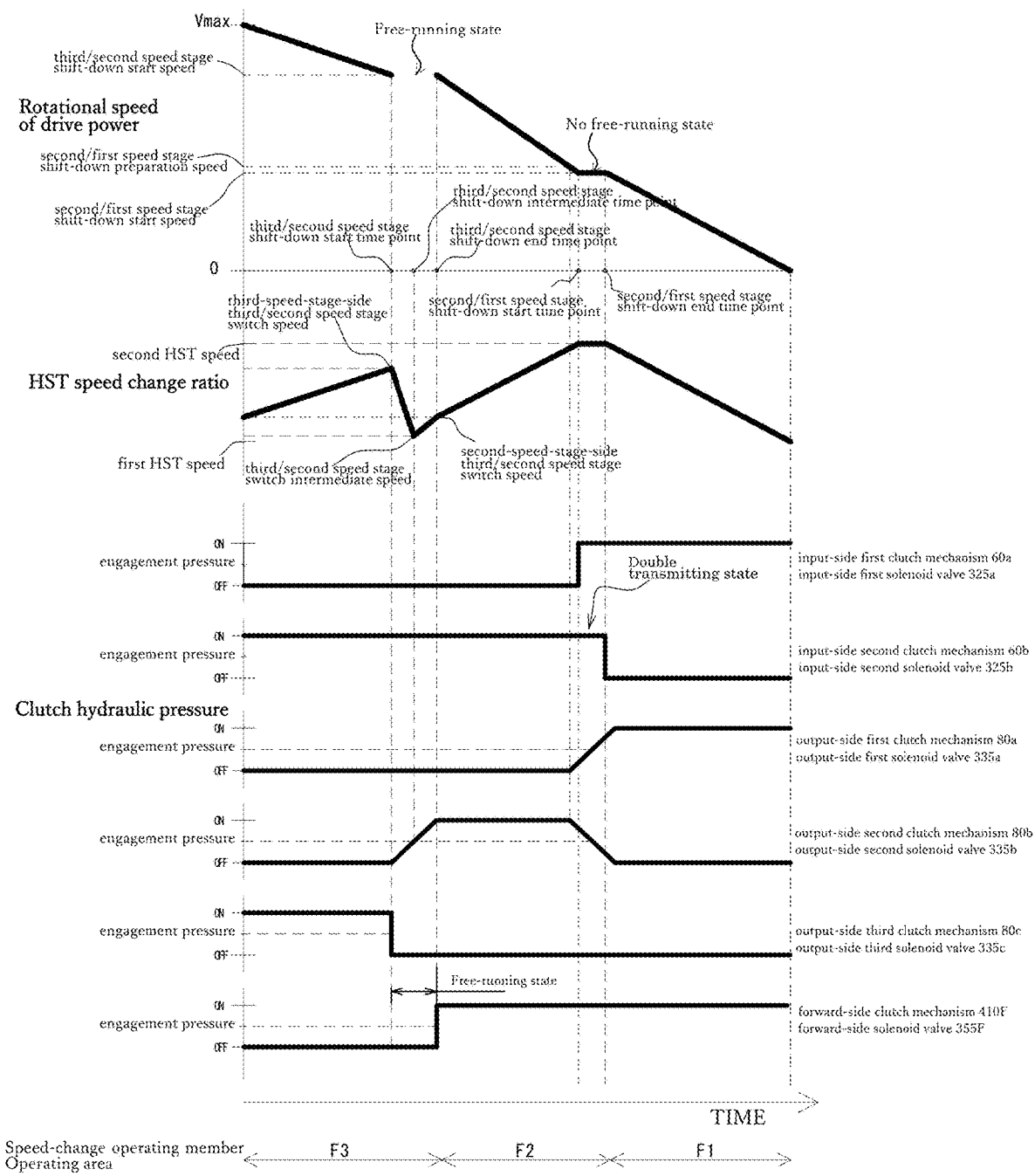
FIG. 13 is a grapy showing a relation among the time lapse, the rotational speed of the drive rotational power of the transmission structure according to a sixth modified example, the output rotational speed of the HST, and the hydraulic pressures of the clutch mechanisms, in a case where the speed-change operating member is operated in the decelerating direction from the forward-side third speed stage area via the forward-side second speed stage area to the forward-side first speed stage area.

FIG. 13 is a graph showing a relation among the time lapse, the rotational speed of the drive rotational power of a transmission structure according to a sixth modified example, the output rotational speed of the HST, and the hydraulic pressures of the clutch mechanisms, in a case where the speed-change operating member 90 is operated in the decelerating direction from the forward-side third speed stage area via the forward-side second speed stage area to the forward-side first speed stage area.

Regarding a control structure performed at the shift-down from the forward-side third speed stage F3, the sixth modified example is different from the fourth and fifth modified examples.

Specifically, as shown in FIG. 13, in the sixth modified example, when the speed-change operating member 90 is shifted down from the forward-side third speed stage area to the forward-side second speed stage area, the control device 100 realizes the shift-down free-running state in which the power transmission to the travel output shaft 47 is cut off during the period from the third/second speed stage shift-down start time point to the third/second speed stage shift-down end time point, by shifting, at the third/second speed stage shift-down start time point when the drive rotational power has reached the predetermined third/second speed stage shift-down start speed, the output-side second clutch mechanism 80b from the engagement state to the disengagement state, shifting, at the third/second speed stage shift-down intermediate time point after the elapse of the predetermined time from the third/second speed stage shift-down start time point, the output-side second clutch mechanism 80b from the disengagement state to the engagement state, and shifting, at the third/second speed stage shift-down end time point after the elapse of the predetermined time from the third/second speed stage shift-down intermediate time point, the forward-side clutch mechanism 410F from the disengagement state to the engagement state.

The control device 100 changes the rotational speed of the output of the HST 10 via the HST speed change actuator 150, during a period between the time point (that is, the third/second speed stage shift-down start time point) when the output-side third clutch mechanism 80c is shifted from the engagement state to the disengagement state and the time point (that is, the third/second speed stage shift-down intermediate time point) when the output-side second clutch mechanism 80b is shifted from the disengagement state to the engagement state, in such a manner as that the rotational speed of the speed change output shaft 45 rotatably driven via the output-side second transmission mechanism 70b at the time point (that is, the third/second speed stage shift-down intermediate time point) when the output-side second clutch mechanism 80b is shifted from the disengagement state to the engagement state matches or approaches the actual rotational speed realized on the speed change output shaft 45 just before the output-side second clutch mechanism 80b is shifted to the engagement state.

Further, the control device 100 changes the rotational speed of the output of the HST 10 via the HST speed change actuator 150, during a period between the time point when the output-side second clutch mechanism 80b is shifted from the disengagement state to the engagement state and the time point when the forward-side clutch mechanism 410F is shifted from the disengagement state to the engagement state, in such a manner as that the rotational speed of the travel output shaft 47 rotatably driven via the output-side second transmission mechanism 70b and the forward-side transmission mechanism 400F at the time point (that is, the third/second speed stage shift-down end time point) when the forward-side clutch mechanism 410F is shifted from the disengagement state to the engagement state matches or approaches the actual rotational speed realized on the travel output shaft 47 just before the forward-side clutch mechanism 410F is shifted to the engagement state.

Specifically, in theory, the rotational power is not transmitted from the drive source 210 to the speed change output shaft 45 at the time when the forward-side third speed stage is in the engagement state, since the output-side second clutch mechanism 80b is disengaged at the time.

However, in a below-described transmission case 500 that accommodates the transmission structure, oil is stored for lubricating and cooling. In the disengagement state of the output-side second clutch mechanism 80b, the rotational power is actually transmitted via stored oil from the driving side to the driven side of the output-side second clutch mechanism 80b so that the speed change output shaft 45 is rotated.

Considering this point, in the sixth modified example, the HST performs a speed change (hereinafter referred to as a first-step speed change), at the time point (the third/second speed stage shift-down intermediate time point) when only the output-side second clutch mechanism 80b is shifted from the disengagement state to the engagement state, in such a manner as that the rotational speed of the speed change output shaft 45 rotatably driven via the output-side second transmission mechanism 70b matches or approaches the actual rotational speed of the speed change output shaft 45 rotated via the stored oil at that time point, and then performs a speed change (hereinafter referred to as a second-step speed change), at the time point (the third/second speed stage shift-down end time point) when the forward-side clutch mechanism 410F is shifted from the disengagement state to the engagement state, in such a manner as that the rotational speed of the travel output shaft 47 rotatably driven via the output-side second transmission mechanism 70b and the forward-side transmission mechanism 400F matches or approaches the rotational speed of the travel output shaft 47 just before the forward-side clutch mechanism 410F is shifted to the engagement state.

The configuration makes it possible to prevent a large reverse torque from being transmitted from the side of the travel output shaft 47 to the main driving shaft 212 in the shift-down operation from the forward-side third speed stage to the forward-side second speed state, and thereby to effectively prevent an engine stall of the drive source 210 caused by an overload or the like.

As shown in FIG. 13, the first-step speed change is configured so that the rotational speed of the HST output is changed from the third-speed-stage-side third/second speed stage switching speed to a third/second speed stage switching intermediate speed, and the second-step speed change is configured so that the rotational speed of the HST output is changed from the third/second speed stage switching intermediate speed to a second-speed-stage-side third/second speed stage switching speed.

Figure 14:
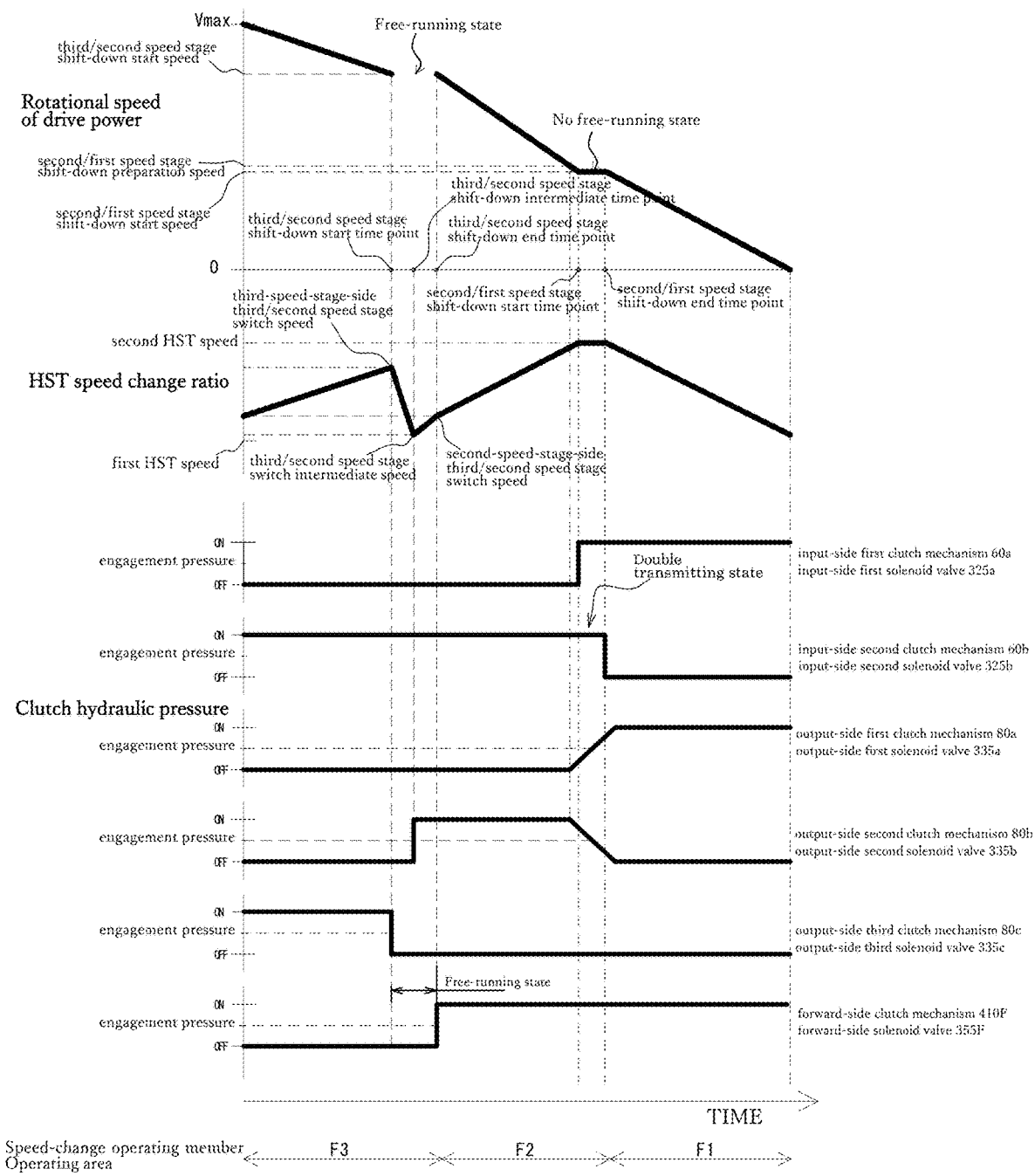
FIG. 14 is a grapy showing a relation among the time lapse, the rotational speed of the drive rotational power of the transmission structure according to a seventh modified example, the output rotational speed of the HST, and the hydraulic pressures of the clutch mechanisms, in a case where the speed-change operating member is operated in the decelerating direction from the forward-side third speed stage area via the forward-side second speed stage area to the forward-side first speed stage area.

FIG. 14 is a graph showing a relation among the time lapse, the rotational speed of the drive rotational power of a transmission structure according to a seventh modified example, the output rotational speed of the HST, and the hydraulic pressures of the clutch mechanisms, in a case where the speed-change operating member 90 is operated in the decelerating direction from the forward-side third speed stage area via the forward-side second speed stage area to the forward-side first speed stage area.

As shown in FIG. 14, the seventh modified example is different from the sixth modified example only in that the transition of the output-side second clutch mechanism 80b from the disengagement state to the engagement state is instantly performed.

Figure 15:
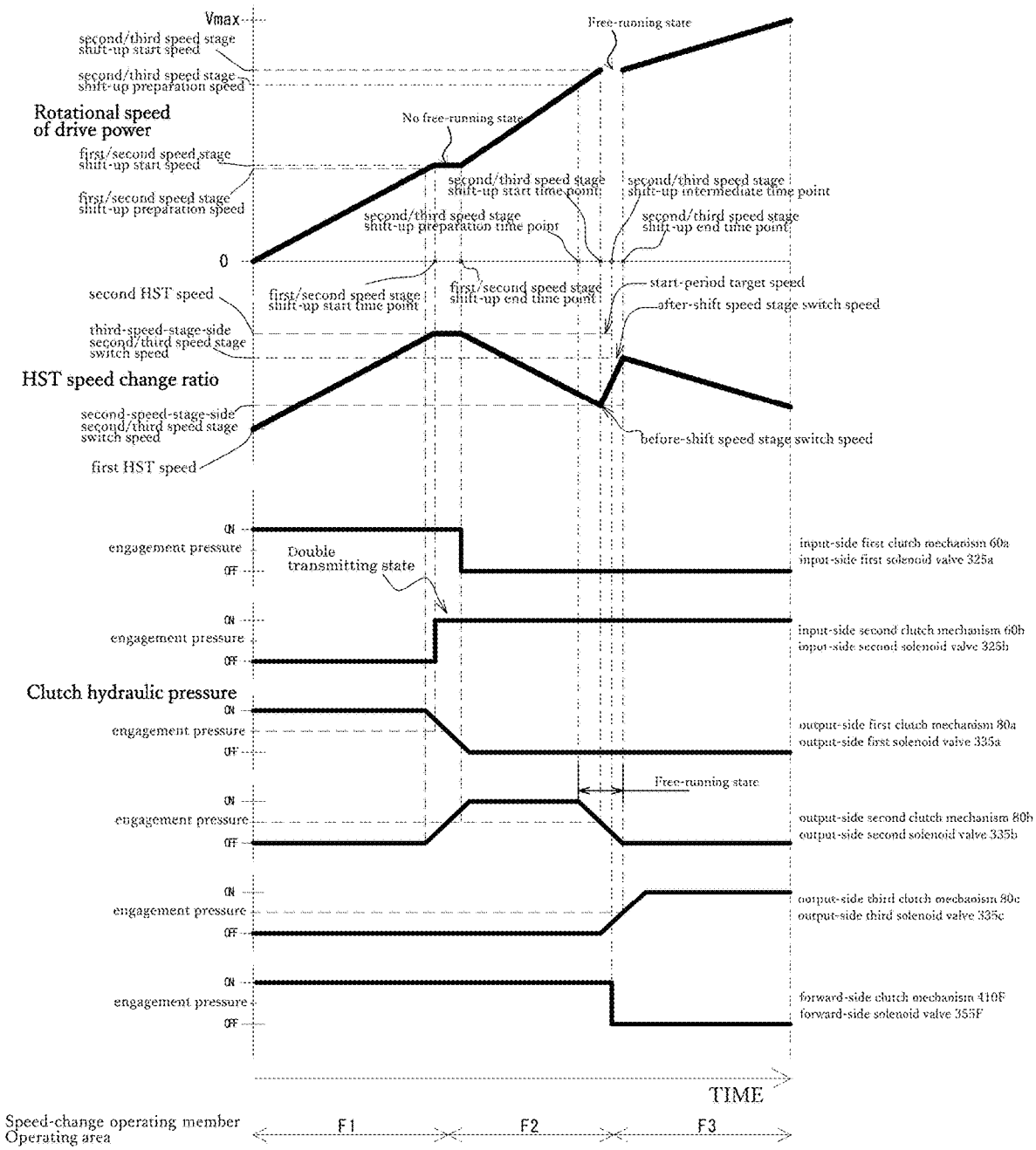
FIG. 15 is a graph showing a relation among the time lapse, the rotational speed of the drive rotational power of the transmission structure according to an eighth modified example of the embodiment, the output rotational speed of the HST, and the hydraulic pressures of the clutch mechanisms, in a case where the speed-change operating member is operated in the forward-side accelerating direction from the vehicle speed zero position.

FIG. 15 is a graph showing a relation among the time lapse, the rotational speed of the drive rotational power of a transmission structure according to an eighth modified example, the output rotational speed of the HST, and the hydraulic pressures of the clutch mechanisms, in a case where the speed-change operating member 90 is operated in the forward-side accelerating direction from the vehicle speed zero position.

The eighth modified example is different from the second modified example in the HST speed-change control that is performed in the shift-up operation from the forward-side second speed stage to the forward-side third speed stage is changed.

In the second modified example (see FIG. 9), the control device 100 performs the HST speed-change control in the free-running state from the second/third speed stage shift-up start time point to the second/third speed stage shift-up end time point with setting, as a target rotational speed, a rotational speed (that is, the third-speed-stage-side second/third speed stage switch speed) that the HST 100 should output at the second/third speed stage shift-up end time point.

Meanwhile, in the eighth modified example, as shown in FIG. 15, the control device 100 performs the HST speed-change control in the shift-up operation from the forward-side second speed stage to the forward-side third speed stage with setting, as the target rotational speed, a start-period target speed that is increased to an opposite side of an after-shift speed stage switch speed (that is, the third-speed-stage-side second/third speed stage switch speed), which the HST 10 should output at the second/third speed stage shift-up end time point, from the actual rotational speed of the HST output at the second/third speed stage shift-up start time point, in a start period from the second/third speed stage shift-up start time point to a time point after an elapse of a predetermined time from the second/third speed stage shift-up start time point. Further, the control device 100 performs the HST speed-change control with setting, as the target rotational speed, an HST output rotational speed that causes the rotational speed of the travel output shaft 47, which is realized by the rotational power operatively transmitted via the output-side third transmission mechanism 70c at the time point when the output-side third clutch mechanism 80c is shifted to the engagement state, to match the actual rotational speed of the travel output shaft 47 just before the output-side third clutch mechanism 80c is shifted to the engagement state, after the start period.

The eighth modified example makes it possible to quickly perform the speed change of the HST 10 in the shift-up operation from the forward-side second speed stage to the forward-side third speed stage.

In the eighth modified example, the start-period target speed is one (the second HST speed in this example) of the first and second HST speeds that is positioned on an opposite side of the after-shift speed stage switch speed from the actual rotational speed of the HST output at the speed stage shift-up start time point.

Figure 16:
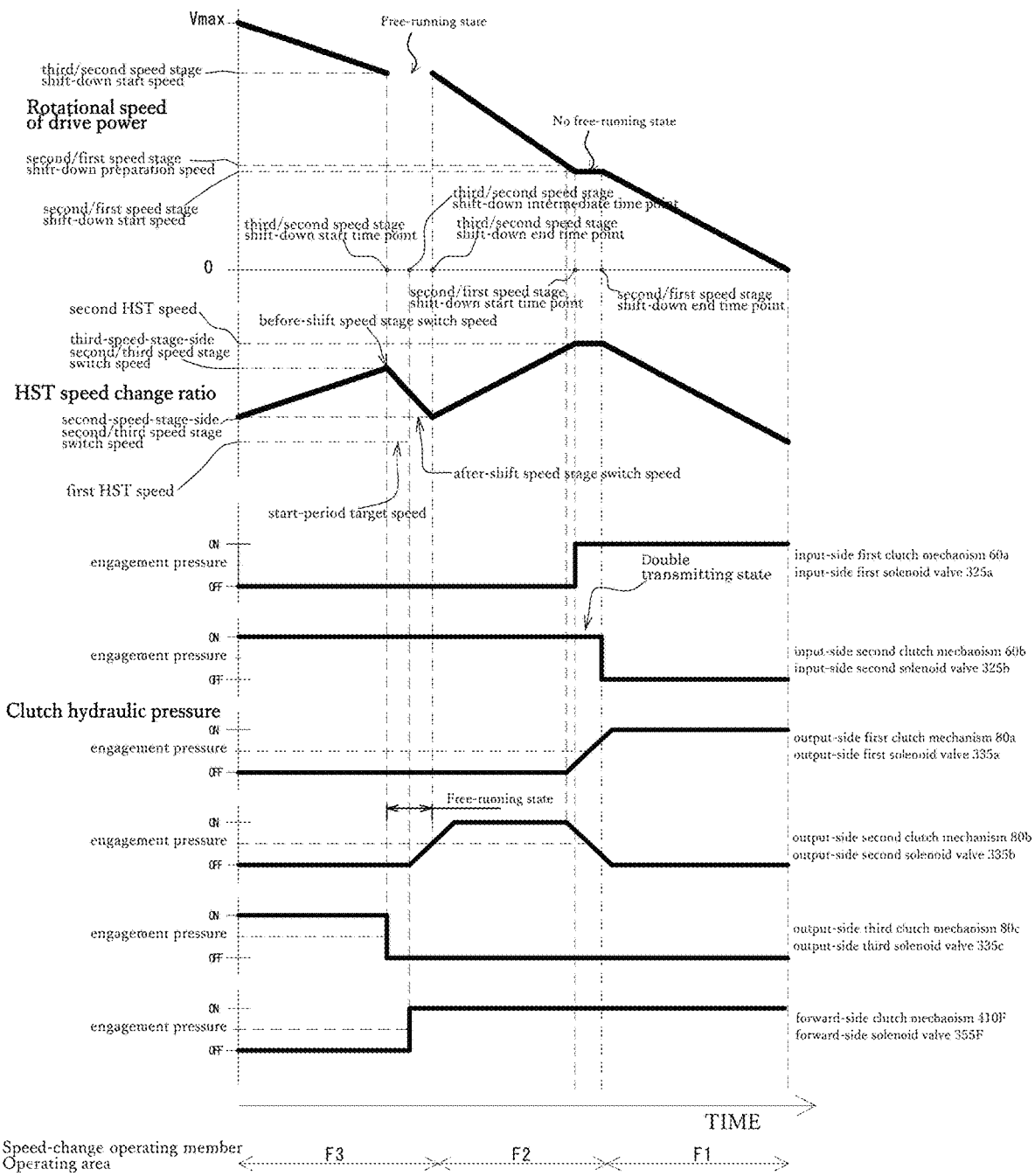
FIG. 16 is a grapy showing a relation among the time lapse, the rotational speed of the drive rotational power of the transmission structure according to a ninth modified example, the output rotational speed of the HST, and the hydraulic pressures of the clutch mechanisms, in a case where the speed-change operating member is operated in the decelerating direction from the forward-side third speed stage area via the forward-side second speed stage area to the forward-side first speed stage area.

FIG. 16 shows a relation among the time lapse, the rotational speed of the drive rotational power of a transmission structure according to a ninth modified example, the output rotational speed of the HST, and the hydraulic pressures of the clutch mechanisms, in a case where the speed-change operating member 90 is operated in the decelerating direction from the forward-side third speed stage area via the forward-side second speed stage area to the forward-side first speed stage area.

The ninth modified example is different from the fifth modified example in the HST speed-change control that is performed in the shift-down operation from the forward-side third speed stage to the forward-side second speed stage is changed.

In the fifth modified example (see FIG. 12), the control device 100 performs the HST speed-change control in the free-running state from the third/second speed stage shift-down start time point to the third/second speed stage shift-down end time point with setting, as a target rotational speed, a rotational speed (that is, second-speed-stage-side third/second speed stage switch speed, and the first HST speed in FIG. 12) that the HST 100 should output at the third/second speed stage shift-down end time point.

Meanwhile, in the ninth modified example, as shown in FIG. 16, the control device 100 performs the HST speed-change control in the shift-down operation from the forward-side third speed stage to the forward-side second speed stage with setting, as the target rotational speed, a start-period target speed that is increased to an opposite side of an after-shift speed stage switch speed (that is, the second-speed-stage-side third/second speed stage switch speed), which the HST 10 should output at the third/second speed stage shift-down end time point, from the actual rotational speed of the HST output at the third/second speed stage shift-down start time point, in a start period from the third/second speed stage shift-up start time point to a time point after an elapse of a predetermined time from the third/second speed stage shift-up start time point. Further, the control device 100 performs the HST speed-change control with setting, as the target rotational speed, an HST output rotational speed that causes the rotational speed of the travel output shaft 47, which is realized by the rotational power operatively transmitted via the output-side second transmission mechanism 70b and the forward-side transmission mechanism 400F at the time point when the output-side second clutch mechanism 80b is shifted to the engagement state, to match the actual rotational speed of the travel output shaft 47 just before the output-side second clutch mechanism 80b is shifted to the engagement state, after the start period. The ninth modified example makes it possible to quickly perform the speed change of the HST 10 in the shift-down operation from the forward-side third speed stage to the forward-side second speed stage.

In the ninth modified example, the start-period target speed is one (the first HST speed in this example) of the first and second HST speeds that is positioned on an opposite side of the after-shift speed stage switch speed from the actual rotational speed of the HST output at the speed stage shift-down start time point.

Needless to say, It is possible to apply the HST speed-change control in the eighth and ninth modified examples to the present embodiment and another modified examples.

The following is a description of the installation structure of the transmission structure 1. In the present embodiment, the HST 10, the planetary gear mechanism 30, the input-side first and second transmission mechanisms 50a, 50b, the input-side first and second clutch mechanisms 60a, 60b, the output-side first and second transmission mechanisms 70a, 70b, the output-side first and second clutch mechanisms 80a, 80b, the speed change intermediate shaft 43, the speed change output shaft 45, and the travel output shaft 47 are housed in a transmission case 500 of the work vehicle 200.

In detail, as shown in FIG. 3, the transmission case 500 has a hollow case body 510. In the present embodiment, the case body 510 has first and second cases 512, 515 connected to each other in series along the longitudinal direction.

The transmission case 500 has a first bearing plate 520 that partitions the internal space of the case body 510 into front and rear sections, and a second bearing plate 530 that positioned on a rearward side of the first bearing plate 520 in the front-rear direction of the vehicle and that further partitions the internal space of the rear section of the case body 510 into front and rear parts.

That is, the first and second bearing plates 520, 530 partition the internal space of the case body 510 into a front chamber 510F on the front side of the first bearing plate 520, a middle chamber 510M sandwiched between the first and second bearing plates 520, 530 in the front-rear direction, and a rear chamber 510R on the rear side of the second bearing plate 530.

As shown in FIG. 3, in the present embodiment, the first bearing plate 520 is detachably connected to the first case 512 near the rear opening of the first case 512 via a bolt or any other fastening member, while the second bearing plate 530 is detachably connected to the second case 515 near the front opening of the second case 515 via a bolt or any other fastening member.

As shown in FIGS. 1 and 3, the main driving shaft 212, the speed change intermediate shaft 43, the speed change output shaft 45 and the travel output shaft 47 are, in a state of being along the vehicle forward/rearward direction, supported by the first and second bearing plates 520 and 530 in a rotatable manner around the axis line.

As shown in FIG. 3, the input-side first and second clutch mechanisms 60a, 60b are, in a state of being placed in the middle chamber 510M, supported by the main driving shaft 212.

The input-side first and second transmission mechanisms 50a, 50b are, in a state of being placed in the middle chamber 510M, supported by the main driving shaft 212 and the speed change intermediate shaft 43.

As shown in FIG. 3, on the rear side of the second bearing plate 530, the transmission case 500 has a third bearing plate 540 provided in the case body 510. In the present embodiment, the third bearing plate 540 is formed integrally with the case body 510 (the second case 515).

The output-side first and second clutch mechanisms 80a, 80b, in a state of being placed in the middle chamber 510M, are supported by the speed change output shaft 45.

The output-side first and second transmission mechanisms 70a, 70b, in a state of being placed in the middle chamber 510M, are supported by the speed change intermediate shaft 43 and the speed change output shaft 45.

The output-side third clutch mechanism 80c, in a state of being placed in the middle chamber 510M, is supported by the travel output shaft 47.

The output-side third transmission mechanism 70c, in a state of being placed in the middle chamber 510M, is supported by the speed change output shaft 45 and the travel output shaft 47.

As shown in FIG. 3, the speed change output shaft 45 and the travel output shaft 47 each has the rear end side extending rearward beyond the second bearing plate 530 and supported by the third bearing plate 540 in a rotatable manner around the axis line.

That is, the speed change output shaft 45 and the travel output shaft 47, in a state of extending over the middle chamber 510M and the rear chamber 510R, are supported by the first, second and third bearing plates 520, 530, 540.

The forward-side clutch mechanism 410F and the rearward-side clutch mechanism 410R are supported by a portion of the travel output shaft 47 that is positioned in the rear chamber 510R.

The forward-side transmission mechanism 400F and the rearward-side transmission mechanism 400R are supported by portions of the speed change output shaft 45 and the travel output shaft 47 that are positioned in the rear chamber 510R.

Figure 17:
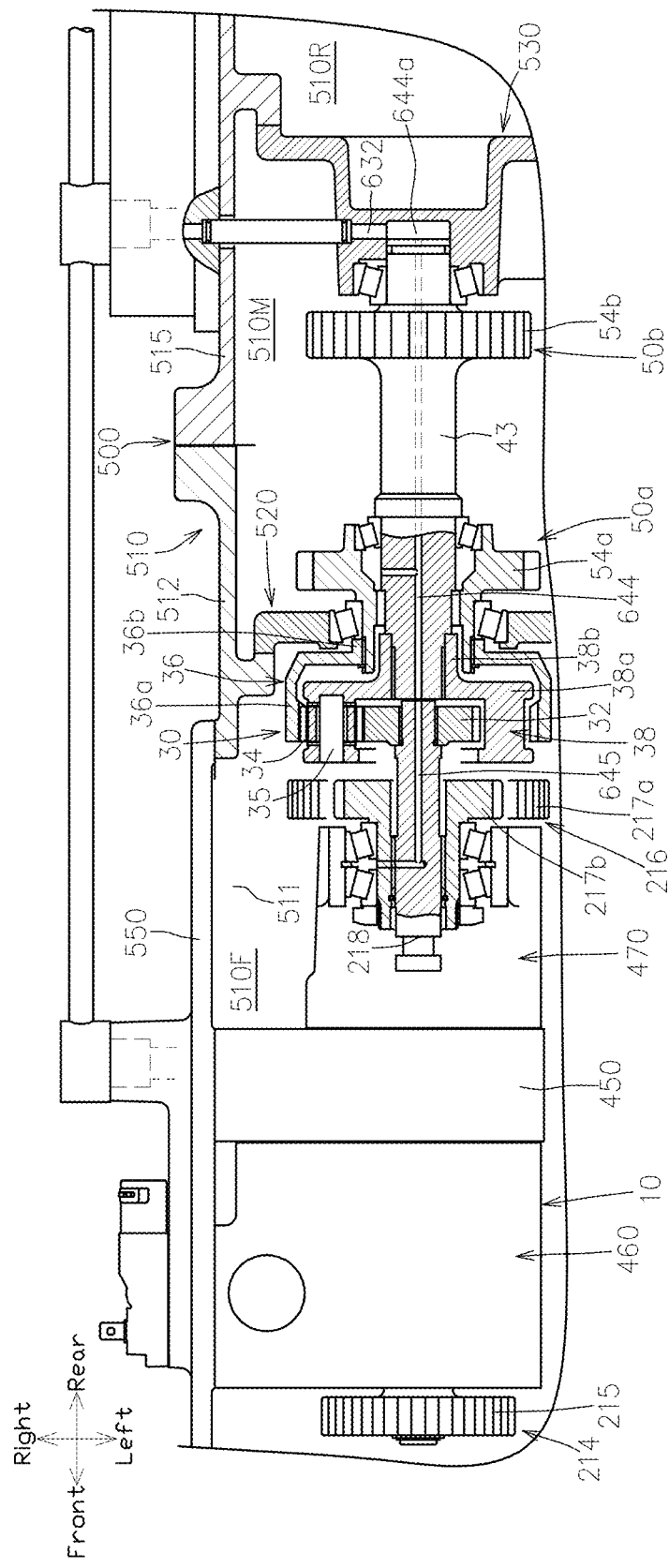
FIG. 17 is a cross-sectional view along the line XVII-XVII in FIG. 3.

FIG. 17 shows a cross-sectional view along the line XVII-XVII in FIG. 3. Further, FIG. 18 shows a transversal-cross-sectional development view of the transmission structure 1.

Figure 18:
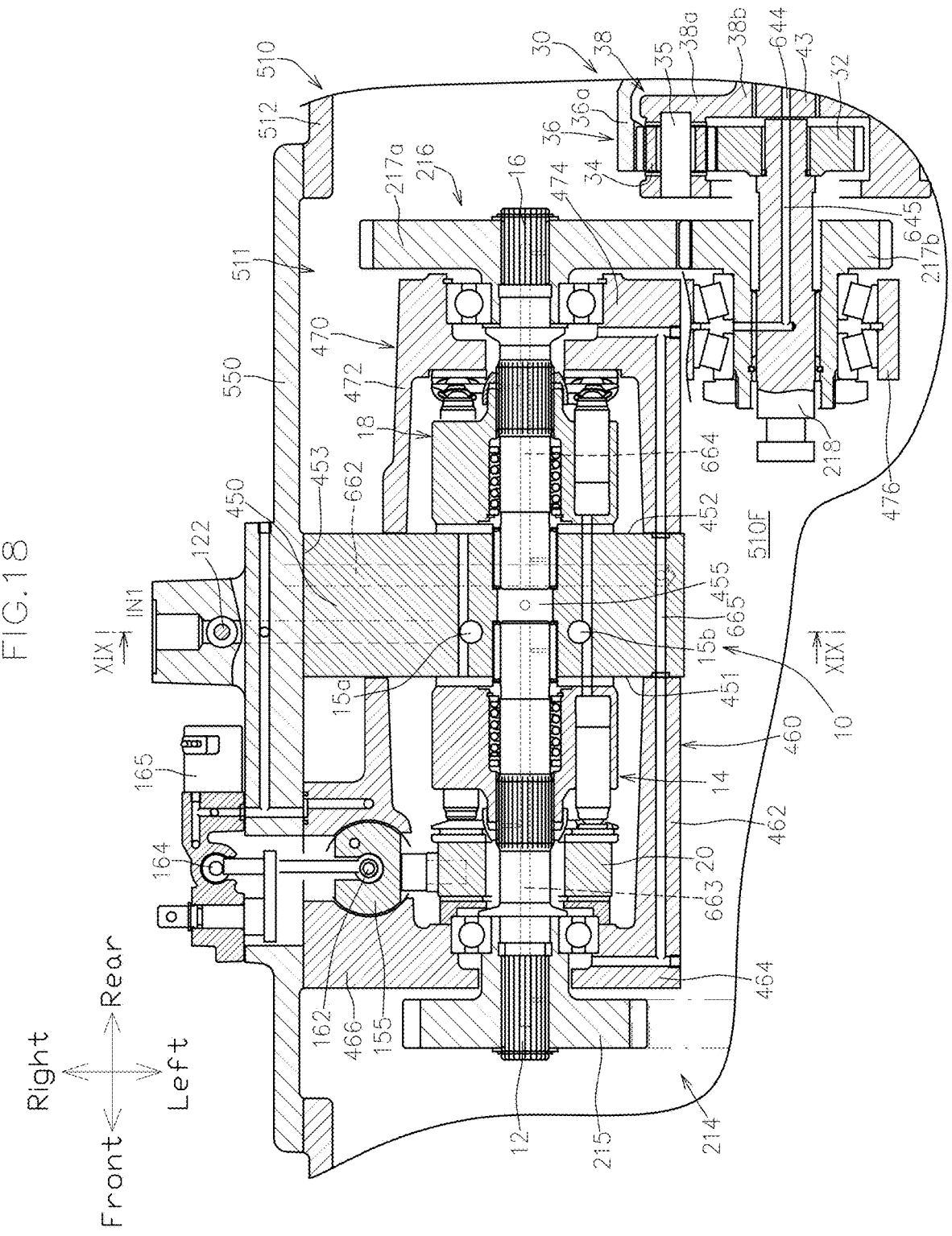
FIG. 18 shows a transversal-cross-sectional development view of the transmission structure.

As shown in FIGS. 3, 17 and 18, the planetary gear mechanism 30 is arranged coaxially with the speed change intermediate shaft 43 and placed in the front chamber 510F.

Specifically, the planetary gear mechanism 30 further has, in addition to the sun gear 32, the planetary gear 34, the carrier 38 and the internal gear 36, a carrier pin 35 that supports the planetary gear 34 in a rotatable manner around the axis line.

As shown in FIGS. 17 and 18, the speed change intermediate shaft 43 has the front end portion extending through the first bearing plate 520 into the front chamber 510F, and the carrier 38 is supported on the speed change intermediate shaft 43.

That is, the carrier 38 has a flange portion 38a that supports the carrier pin 35 and a shaft portion 38b that is fitted over to the front end portion of the speed change intermediate shaft 43 in a relatively non-rotatable manner around the axis line with respect thereto.

As shown in FIG. 17, the internal gear 36 has a ring gear portion 36a that meshes with the planetary gear 34 and a cylinder portion 36b that is fitted over to a shaft portion of the input-side first driven gear 54a in a relative non-rotatable manner around the axis line, the portion of the input-side first driven gear 54a being supported by the speed change intermediate shaft 43 in a relatively rotatable manner around the axis line.

In the present embodiment, as shown in FIG. 18, the HST 10 has the pump shaft 12 and the motor shaft 16 that are coaxially placed with each other.

In detail, the HST 10 has the HST pump 14, the pump shaft 12, the HST motor 18, the motor shaft 16 and the output adjusting member 20, as well as a center section 450 formed with the pair of HST lines 15a, 15b, a pump case 460 so connected to the center section 450 as to form a pump space that accommodates the HST pump 14, and a motor case 470 so connected to the center section 450 as to form a motor space that accommodates the HST motor 18.

As shown in FIG. 18, the center section 450 has a first face 451 that faces the first direction (front of the vehicle in the illustrated embodiment) and includes a pump face on which the HST pump 14 is slid, and a second face 452 that faces the second direction (rear of the vehicle in the illustrated embodiment) opposite the first direction and includes a motor face on which the HST motor 18 is slid.

The pump case 460 has a hollow peripheral wall portion 462 for surrounding the HST pump 14, and an end wall portion 464 for closing an opening on a distal end side of the peripheral wall portion 462, and is connected to the center section 450 in a state of an end surface on a proximal end side of the peripheral wall section 462 in contact with the first face 451.

The pump shaft 12 has a proximal end portion that is bearing-supported in a bearing hole 455 formed in the center section 450, and a distal end portion that is, in a state of extending outward from the end wall portion 464 of the pump case 460, directly or indirectly bearing-supported by the end wall portion 464.

In the present embodiment, the distal end portion of the pump shaft 12 that extends outwardly from the end wall portion 464 supports an HST input gear 215 forming the HST input gear train 214 in a relatively non-rotatable manner with respect thereto, and a shaft portion of the HST input gear 215 is supported by the end wall portion 464 via a bearing member.

The motor case 470 has a hollow peripheral wall portion 472 for surrounding the HST motor 18, and an end wall portion 474 for closing an opening on a distal end side of the peripheral wall portion 472, and is connected to the center section 450 in a state of an end surface of the peripheral wall section 472 on a proximal end side in contact with the second face 452.

The motor shaft 16 has a proximal end portion that is bearing-supported in the bearing hole 455, and a distal end portion that is, in a state of extending outward from the end wall portion 474 of the motor case 470, directly or indirectly bearing-supported by the end wall portion 474.

In the present embodiment, the distal end portion of the motor shaft 16 that extends outwardly from the end wall portion 474 supports an HST output first gear 217a forming the HST output gear train 216 in a relatively non-rotatable manner with respect thereto, and a shaft portion of the HST output first gear 217a is supported by the end wall portion 474 via a bearing member.

The HST output gear train 216 has the HST output first gear 217a, an HST output second gear 217b that meshes with the HST output first gear 217a, and an HST output shaft 218 that supports the HST output second gear 217b in a relatively non-rotatable manner with respect thereto.

The HST output shaft 218 has a distal end portion that supports the sun gear 32 in a relatively non-rotatable manner with respect thereto.

The motor case 470 is provided with an extending portion 476 that extends outward from the peripheral wall portion 472 or the end wall portion 474 thereby to support, via a bearing member, the proximal end portion of the HST output shaft 218 in a rotatable manner around the axis line.

In the present embodiment, as shown in FIG. 180, the case body 510 of the transmission case 500 is provided with a mount opening 511 through which an HST assembly assembled with the center section 450, the pump shaft 12, the HST pump 14, the pump case 460, the motor shaft 16, the HST motor 18, the motor case 470, the HST input gear 215 and the HST output gear train 216 is inserted.

In the present embodiment, the mount opening 511 is formed in the first case 512 in such a manner as to open the front chamber 510F to the outside.

The HST assembly is connected to a mount plate 550 that is attached to the outer surface of the case body 510 while closing the mount opening 511.

That is, the HST assembly is fixed within the front chamber 510F by mounting the mount plate 550, to which the HST assembly is connected, on the outer surface of the case body 510.

As shown in FIG. 18, in the present embodiment, the pump case 460 and the center section 450 are connected to the mount plate 550.

That is, the pump case 460 is provided with a connecting portion 466 that is extended outwardly from the peripheral wall portion 462 and the end wall portion 464 and is in contact with the mount plate 550. Also, the center section 450 is configured to have a third face 453 that is orthogonal to both the first face 451 and the second face 452 and is in contact with the mount plate 550.

As shown in FIG. 18, the servo piston 155 is housed in the connecting portion 466 of the pump case 460. In the present embodiment, the servo switching valve 162 is housed in an axial hole formed in the servo piston 155, and the mount plate 550 houses the operating piston 164 operatively connected to the servo switching valve 162, and the output adjusting valve 165 that adjusts the operation oil supplied to the operating piston 164.

The transmission structure 1 according to the present embodiment further has a lubricant supply mechanism 600 that supplies a lubricant to various component members.

The lubricant supply mechanism 600 is so configured as to use an oil from a hydraulic pressure source different from the hydraulic pressure source (the first hydraulic pressure pump 110) for the operation oil line 120 that supplies the operation oil to the HST 10 (and the hydraulic servo mechanism 152) as well as the input-side first and second clutch mechanisms 60a, 60b, the output-side first, second and third clutch mechanisms 80a, 80b, 80c, and the forward and rearward-side clutch mechanisms 410F, 410R.

As in the present embodiment, separating the operation oil line 120 for the HST 10 and the input-side first and second clutch mechanisms 60a, 60b, the output-side first, second and third clutch mechanisms 80a, 80b, 80c, and the forward and rearward-side clutch mechanisms 410F, 410R from a lubricant line 620 can effectively suppress the hydraulic pressure fluctuation of the operation oil line 120.

In detail, as shown in FIG. 2, the lubricant supply mechanism 600 has a second hydraulic pump 610 operatively driven by the drive source 210, the lubricant line 620 to which the discharged oil from the second hydraulic pump 610 is supplied, a transmitting rotational shaft lubrication line 630 that has a base end portion fluidly connected to the lubricant line 620 and that guides a lubricant toward a transmitting rotational shaft to which the power is transmitted by the input-side first and second transmission mechanisms 50a, 50b, the output-side first, second and third transmission mechanisms 70a, 70b, 70c, and the forward and rearward-side transmission mechanisms 400F, 400R, and also toward the planetary gear mechanism 30, and an HST lubrication line 660 (see FIG. 4) that has a base end portion fluidly connected to the lubricant line 620 and that guides the lubricant toward the HST 10.

In the present embodiment, the main driving shaft 212, the speed change intermediate shaft 43, the speed change output shaft 45 and the travel output shaft 47 are included in the transmitting rotational shaft.

In this case, as shown in FIGS. 2, 3 and 17, the lubricant supply mechanism 600 further has a main driving shaft hole 642 that is formed in the main driving shaft 212 along the axial direction and that receives and relays an oil from the transmitting rotational shaft lubrication line 630, a speed change intermediate shaft hole 644 that is formed in the speed change intermediate shaft 43 along the axial direction and that receives and relays an oil from the transmitting rotational shaft lubrication line 630, a speed change output shaft hole 646 that is formed in the speed change output shaft 45 along the axial direction and that receives and relays an oil from the transmitting rotational shaft lubrication line 630, and a travel output shaft hole 648 that is formed in the travel output shaft 47 along the axial direction and that receives and relays an oil from the transmitting rotational shaft lubrication line 630.

At a position corresponding to a predetermined lubrication site, the main driving shaft hole 642, the speed change intermediate shaft hole 644, the speed change output shaft hole 646, and the travel output shaft hole 648 are each open on the outer surface.

As shown in FIG. 17, in the present embodiment, the speed change intermediate shaft 43 and the HST output shaft 218 are coaxially placed to be opposite each other, and the HST output shaft 218 is formed with an HST output shaft hole 645 that receives and relays a part of the oil flowing through the speed change intermediate shaft hole 644.

In detail, the speed change intermediate shaft hole 644 is open on the end face opposite the HST output shaft 218. The HST output shaft hole 645 is open on the end face opposite the speed change intermediate shaft 43 so that the oil from the speed change intermediate shaft hole 644 can be received and relayed, and, at a position corresponding to a predetermined lubrication site, is opened on the outer surface so that the oil received and relayed from the speed change intermediate shaft hole 644 is guided to the predetermined lubrication site.

As shown in FIG. 3, FIG. 17, etc., one of the first and second bearing plates 520, 530 (the second bearing plate 530 in the present embodiment) is formed with a transmitting rotational shaft lubricant oil passage 632 forming the transmitting rotational shaft lubrication line 630, and receiving-relaying portions 642*a*, 644*a*, 646*a*, 648*a* for the oils from the transmitting rotational shaft lubricant oil passage 632 to the main driving shaft hole 642, the speed change intermediate shaft hole 644, the speed change output shaft hole 646, and the travel output shaft hole 648, respectively.

Further, in the present embodiment, the oil receiving-relaying in the input-side first and second supply-discharge lines 320*a*, 320*b*, the output-side first, second and third supply-discharge lines 330*a*, 330*b*, 330*c*, and the forward and rearward-side supply-discharge lines 350F, 350R are performed in one of the bearing plates (the second bearing plate 530 in the present embodiment).

In detail, the input-side first supply-discharge line 320*a* has an input-side first oil supply-discharge line (not shown) formed in the one bearing plate (the second bearing plate 530 in the present embodiment) and an input-side first axial oil passage 321*a* (see FIG. 3) formed in the main driving shaft 212 along the axial direction.

The input-side first axial oil passage 321*a* has a base end side that opens on the outer surface of a portion of the main driving shaft 212 bearing-supported by the one bearing plate (the second bearing plate 530 in the present embodiment) so as to be fluidly connected to the input-side first oil supply-discharge path (not shown) via an oil receiving-relaying portion 322*a*, and a tip side that is open to the oil chamber of the corresponding clutch mechanism 60*a*.

The input-side second supply-discharge line 320*b* has an input-side second supply-discharge oil passage (not shown) formed in the one bearing plate (the second bearing plate 530 in the present embodiment), and an input-side second axial oil passage 321*b* formed in the main driving shaft 212 along the axial direction (see FIG. 3).

The input-side second axial oil passage 321*b* has a base end side that opens on the outer surface of the portion of the main driving shaft 212 bearing-supported by the one bearing plate (the second bearing plate 530 in the present embodiment) and that is fluidly connected to the input-side second oil supply-discharge passage via an oil receiving-relaying portion 322*b*, and a tip side that is open to the oil chamber of the corresponding clutch mechanism 60*b*.

The output-side first supply-discharge line 330*a* has an output-side first supply-discharge oil passage (not shown) formed in the one bearing plate (the second bearing plate 530 in the present embodiment), and an output-side first axial oil passage 331*a* (see FIG. 3) formed in the speed change output shaft 45 along the axial direction.

The output-side first axial oil passage 331*a* has a base end side that opens on of the outer surface of a portion of the speed change output shaft 45 bearing-supported by the one bearing plate (the second bearing plate 530 in the present embodiment) so as to be fluidly connected to the output-side first oil supply-discharge passage via the oil receiving-relaying portion 322*a*, and a tip side that is open to the oil chamber of the corresponding o clutch mechanism 80*a*.

The output-side second supply-discharge line 330*b* has an output-side second supply-discharge oil passage (not shown) formed in the one bearing plate (the second bearing plate 530 in the present embodiment), and an output-side second axial oil passage 331*b* (see FIG. 3) formed in the speed change output shaft 45 along the axial direction.

The output-side second axial oil path 331*b* has a base end side that opens on the outer surface of a portion of the speed change output shaft 45 bearing-supported by the one bearing plate (the second bearing plate 530 in the present embodiment) so as to be fluidly connected to the output-side second oil supply-discharge passage via an oil receiving-relaying portion 322*b*, and a tip side that is open to the oil chamber of the corresponding clutch mechanism 80*b*.

The forward-side supply-discharge line 350F has a forward-side supply-discharge oil passage (not shown) formed in the one bearing plate (the second bearing plate 530 in the present embodiment), and a forward-side axial oil path 351F (see FIG. 3) formed in the travel output shaft 47 along the axial direction.

The forward-side axial oil passage 351F has a base end side that opens on the outer surface of a portion of the travel output shaft 47 bearing-supported by the one bearing plate (the second bearing plate 530 in the present embodiment) so as to be fluidly connected to the forward-side supply-discharge oil passage via an oil receiving-relaying portion 352F, and a tip side that is open to the oil chamber of the corresponding clutch mechanism 410F.

The rearward-side supply-discharge line 350R has a rearward-side supply-discharge oil path (not shown) formed in the one bearing plate (the second bearing plate 530 in the present embodiment), and a rearward-side axial oil path 351R (see FIG. 3) formed in the travel output shaft 47 along the axial direction.

The rearward-side axial oil path 351R has a base end side that opens on the outer surface of a portion of the travel output shaft 47 bearing-supported by the one bearing plate (the second bearing plate 530 in the present embodiment) so as to be fluidly connected to the rearward-side supply-discharge oil passage via an oil receiving-relaying portion 352R, and a tip side that is open to the oil chamber of the corresponding clutch mechanism 410R.

The output-side third supply-discharge line 330*c* has an output-side third supply-discharge oil passage (not shown) formed in the one bearing plate (the second bearing plate 530 in the present embodiment), and an output-side third axial oil passage 331*c* (see FIG. 3) formed in the travel output shaft 47 along the axial direction.

The output-side third axial oil passage 331*c* has a base end side that opens on the outer surface of a portion of the travel output shaft 47 bearing-supported by the one bearing plate (the second bearing plate 530 in the present embodiment) so as to be fluidly connected to the output-side third oil supply-discharge passage via an oil receiving-relaying portion 332*c*, and a tip side that is open to the oil chamber of the corresponding clutch mechanism 80*c*.

Figure 19:
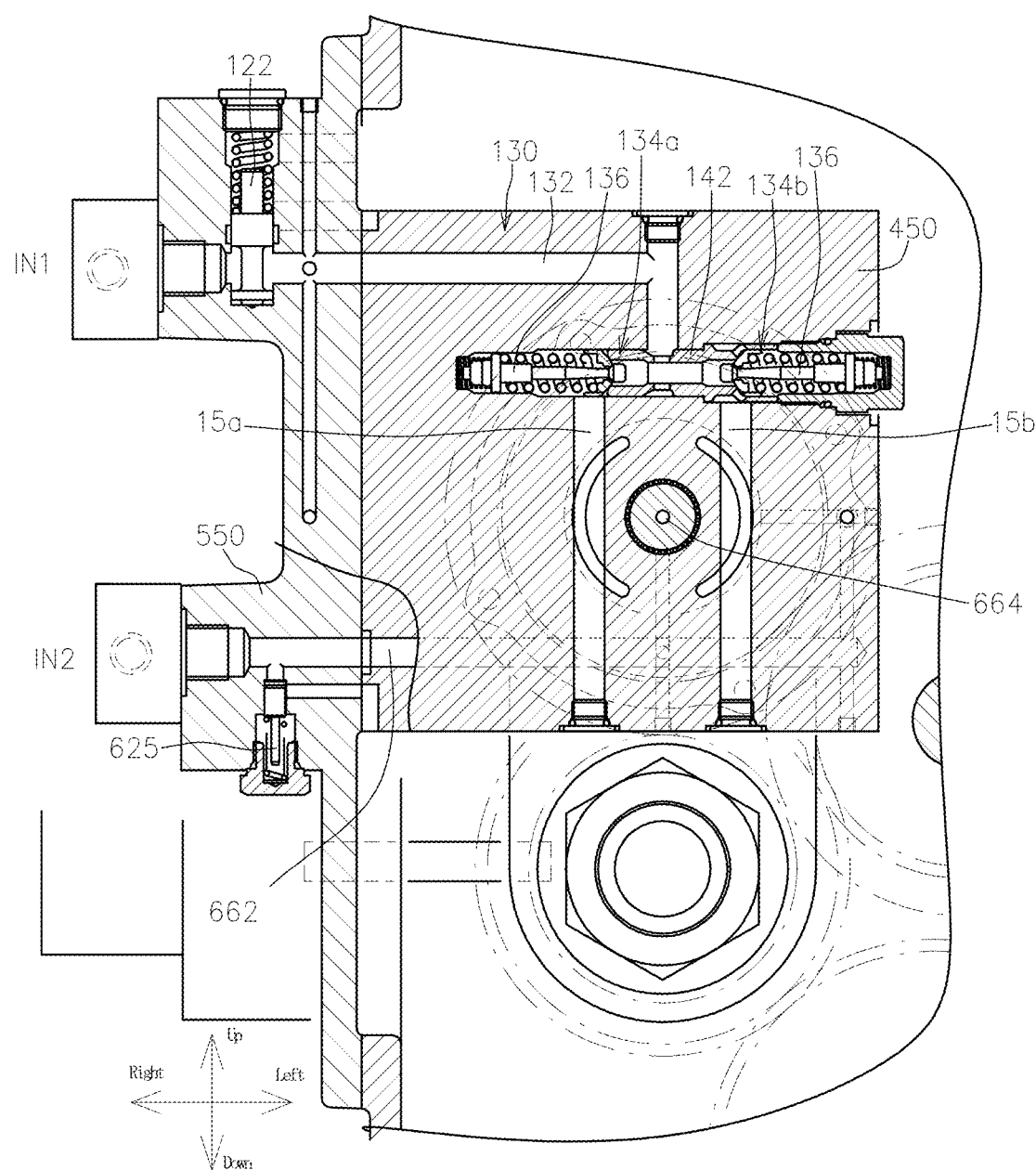
FIG. 19 is a cross-sectional view along the line XIX-XIX in FIG. 18.

FIG. 19 shows a cross-sectional view along the line XIX-XIX in FIG. 18. As shown in FIGS. 18 and 19, the HST lubrication line 660 has an HST lubricant passage 662 that is formed in the mount plate 550 and the center section 450 so as to have one end opening on the outer surface of the mount plate 550 thereby to form the HST lubrication port IN2. To the HST lubrication port IN2, an end of the lubricant line 620 shown in FIG. 2 is fluidly connected.

As shown in FIG. 18, the base end portions (opposite end portions) of the pump shaft 12 and the motor shaft 16 are supported by the bearing hole 455 with a gap present between each other, and the HST lubricant passage 662 is so formed as to guide a part of the oil into the gap.

the HST lubrication line 660 further has a pump shaft hole 663 and a motor shaft hole 664 that are formed in the pump shaft 12 and the motor shaft 16, respectively, along the axial direction in a manner to guide, to a predetermined lubrication area, the oil in the gap, and an oil passage 665 formed in the center section 450, the pump case 460 and the motor case 470 in a manner to guide, to a predetermined lubrication site, a portion of the oil in the HST lubricant passage 662.

The lubricant supply mechanism 600 has a lubricant pressure setting relief valve 625 that sets the hydraulic pressure of the lubricant line 620. In the present embodiment, the lubricant pressure setting relief valve 625 is mounted on the mount plate 550 so as to act on the HST lubricant passage 662.

1 transmission structure
10 HST
30 planetary gear mechanism
45 speed change output shaft
47 travel output shaft
50a, 50b input-side first and second transmission mechanisms
60a, 60b input-side first and second clutch mechanisms
70a-70c output-side first to third transmission mechanisms
80a-80c output-side first to third clutch mechanisms
90 speed-change operating member
100 control device
152 hydraulic servo mechanism (HST speed change actuator)
210 drive source
212 main drive shaft
325a, 325b input-side first and second solenoid valves
335a-335c output-side first to third solenoid valves
355F, 355R forward-side and rearward-side solenoid valves
400F, 400R forward-side and rearward-side transmission mechanisms
410F, 41R forward-side and rearward-side clutch mechanisms

What is claimed is:

1. A transmission structure continuously changing a rotational speed of a rotational power that is operatively transmitted from a drive source and outputting a rotational power whose rotational speed has been changed toward a driving wheel, the transmission structure comprising:
   an HST that continuously changes the rotational speed of the rotational power operatively transmitted from the drive source to a rotational speed including a range of at least between a first HST speed and a second HST speed in accordance with an operating position of an output adjusting member and that outputs a rotational power whose rotational speed has been changed;
   an HST speed change actuator that actuates the output adjusting member;
   a planetary gear mechanism that includes first to third elements and that is configured so that the third element acts as an input portion inputting the rotational power that the HST outputs;
   an input-side first transmission mechanism capable of operatively transmitting the rotational power, which operatively receives from the drive source, to the first element at an input-side first speed change ratio;
   an input-side second transmission mechanism capable of operatively transmitting the rotational power, which operatively receives from the drive source, to the second element at an input-side second speed change ratio;
   an input-side clutch mechanism pair including input-side first and second clutch mechanisms of a frictional plate type that engage and disengage the power transmissions of the input-side first and second transmission mechanisms, respectively;
   a speed change output shaft;
   an output-side first transmission mechanism capable of operatively transmitting the rotational power, which operatively receives from the second element, to the speed change output shaft at an output-side first speed change ratio;
   an output-side second transmission mechanism capable of operatively transmitting the rotational power, which operatively receives from the first element, to the speed change output shaft at an output-side second speed change ratio;
   an output-side clutch mechanism pair including output-side first and second clutch mechanisms that engage and disengage the power transmissions of the output-side first and second transmission mechanisms, respectively;
   a speed-change operating member capable of being operated within an area including a vehicle speed zero position, a first speed stage area and a second speed stage area that is arranged on a higher speed side than the first speed stage;
   a control device performing controls of the HST speed change actuator, the input-side clutch mechanisms and the output-side clutch mechanisms, wherein
   when the speed-change operating member is positioned in an area including the vehicle speed zero position and the first speed stage area, the control device causes the input-side first and second input-side clutch mechanisms to be brought into the engagement state and the disengagement state, respectively, thereby to realize a first HMT transmitting state in which the first element acts as a reference power input portion, which inputs a reference power from the drive source, and the second element acts as a combined power output portion, which outputs, toward the speed change output shaft, a combined rotational power, and then causes the output-side first and second clutch mechanisms to be brought into the engagement state and the disengagement state, respectively, thereby to operatively transmit the rotational power of the second element to the speed change output shaft,
   when the speed-change operating member is positioned in the second speed stage area, the control device causes the input-side first and second clutch mechanisms to be brought into the disengagement state and the engagement state, respectively, thereby to realize a second HMT transmitting state in which the second element acts as the reference power input portion and the first element acts as the combined power output portion, and then causing the output-side first and second clutch mechanisms to be brought into the disengagement state and the engagement state, respectively, thereby to operatively transmit the rotational power of the first element to the speed change output shaft,
   the planetary gear mechanism is so configured that the rotational speed of the rotational power output from the second element is zero when the rotational speed of the HST output is set to the first HST speed in the first HMT transmitting state,
   the input-side first and second speed change ratios are so set that the rotational speed of the second element at the time when the HST output is set to the second HST speed in the first HMT transmitting state is same as that of the second element driven by the rotational power that is operatively transmitted via the input-side second transmission mechanism in the second HMT transmitting state, and the rotational speed of the first element at the time when the HST output is set to the second HST speed in the second HMT transmitting state is same as that of the first element driven by the rotational power that is operatively transmitted via the input-side first transmission mechanism in the first HMT transmitting state, the control device operates the HST speed change actuator so that the HST output has the first HST speed according to the operation of the speed-change operating member to the vehicle speed zero position, and the HST output is accelerated according to the accelerating operation of the speed-change operating member from the vehicle speed zero position, and when the speed-change operating member is shifted up from the first speed stage area to the second speed stage area, the control device causes, at a first/second speed stage shift-up start time point when the drive rotational power has reached a predetermined first/second speed stage shift-up start speed, the second clutch mechanism of one clutch mechanism pair out of the input-side clutch mechanism pair and the output-side clutch mechanism pair to be instantly shifted from the disengagement state to the engagement, and causes, at a first/second speed stage shift-up end time point after an elapse of a predetermined time from the first/second speed stage shift-up start time point, the first clutch mechanism of the one clutch mechanism pair to be instantly shifted from the engagement state to the disengagement state, thereby to realize a shift-up double transmitting state in which both of the first and second clutch mechanisms in the one clutch mechanism pair are engaged during the period from the first/second speed stage shift-up start time point until the first/second speed stage shift-up end time point, and also causes, in the shift-up double transmitting state, the first clutch mechanism of the other one clutch pair out of the input-side clutch mechanism pair and the output-side clutch mechanism pair to be gradually shifted from the engagement state to the disengagement state while having the frictional plate being frictionally slid, and causes the second clutch mechanism of the other one clutch mechanism pair to be gradually shifted from the disengagement state to the engagement state while having the friction plate being frictionally slid, thereby to switch from the engagement state of the first clutch mechanism to the engagement state of the second clutch mechanism in the other one clutch mechanism pair.

2. The transmission structure according to claim 1, wherein the first/second speed stage shift-up start speed is set to a speed of the drive rotational power that is realized on the speed change output shaft via the output-side first transmission mechanism when the rotational speed of the HST output is set to the second HST speed in the first HMT transmitting state.

3. The transmission structure according to claim 1, wherein:
the input-side first and second clutch mechanisms and the output-side first and second clutch mechanisms each is of a hydraulic type in which the engagement state and the disengagement state are switched in response to supply and discharge of operation oil, the transmission structure is provided with an input-side solenoid valve pair including input-side first and second solenoid valves that switch supply and discharge of the operation oil to and from the input-side first and second clutch mechanisms, respectively, in response to the control by the control device and an output-side solenoid valve pair including output-side first and second solenoid valves that switch supply and discharge of the operation oil to and from the output-side first and second clutch mechanisms, respectively, in response to the control by the control device, the solenoid valves of one of the input-side solenoid valve pair and the output-side solenoid valve pair are solenoid proportional valves capable of gradually increasing and decreasing hydraulic pressures of the corresponding clutch mechanisms, and the solenoid valves of the other one of the input-side solenoid valve pair and the output-side solenoid valve pair are solenoid switching valves that instantly increase and decrease hydraulic pressures of the corresponding clutch mechanisms.

4. The transmission structure according to claim 1, wherein the output-side first and second speed change ratios are so set that the rotational speed that is realized on the speed change output shaft when the HST output is set to the second HST speed in the first HMT transmitting state is substantially same as the rotational speed that is realized on the speed change output shaft when the HST output is set to the second HST speed in the second HMT transmitting state.

5. The transmission structure according to claim 1, wherein the control device starts, before the first/second speed stage shift-up start time point, the shifting movement of the first clutch mechanism of the other one clutch pair from the engagement state to the disengagement state while the frictional plate being frictionally slid and the shifting movement of the second clutch mechanism of the other one clutch mechanism pair from the disengagement state to the engagement state while the friction plate being frictionally slid, and completes the shifting movements after the first/second speed stage shift-up end time point.

6. The transmission structure according to claim 1, wherein:
when the speed-change operating member is shifted down from the second speed stage area to the first speed stage area, the control device causes, at a second/first speed stage shift-down start time point when the drive rotational power reaches a predetermined second/first speed stage shift-down start speed, the first clutch mechanism of one clutch mechanism pair out of the input-side clutch mechanism pair and the output-side clutch mechanism pair to be instantly shifted from the disengagement state to the engagement state, and causes, at a second/first speed stage shift-down end time point after an elapse of a predetermined time from the second/first speed stage shift-down start time point, the second clutch mechanism of the one clutch mechanism pair to be instantly shifted from the engagement state to the disengagement state, thereby to realize a shift-down double transmitting state in which both of the first and second clutch mechanisms in the one clutch mechanism pair are engaged during the period from the second/first speed stage shift-down start time point until the second/first speed stage shift-down end time point, and the control device causes, in the shift-down double transmitting state, the first clutch mechanism of the other one clutch pair out of the input-side clutch mechanism pair and the output-side clutch mechanism pair to be gradually shifted from the disengagement state to the engagement state while having the frictional plate being frictionally slid, and causes the second clutch mechanism of the other one clutch mechanism pair to be gradually shifted from the engagement state to the disengagement state while having the friction plate being frictionally slid, thereby to switch from the engagement state of the second clutch mechanism to the engagement state of the first clutch mechanism in the other one clutch mechanism pair.

7. The transmission structure according to claim 6, wherein the second/first speed stage shift-down start speed is set to the speed of the drive rotational power that is realized on the speed change output shaft when the HST output is set to the second HST speed in the second HMT transmitting state.

8. The transmission structure according to claim 6, wherein the control device starts, before the second/first speed stage shift-down start time point, the shifting movement of the second clutch mechanism of the other one clutch pair from the engagement state to the disengagement state while the frictional plate being frictionally slid and the shifting movement of the first clutch mechanism of the other one clutch mechanism pair from the disengagement state to the engagement state while the friction plate being frictionally slid, and completes the shifting movements after the second/first speed stage shift-down end time point.

9. The transmission structure according to claim 6, wherein the rotational speed of the rotational power that defines the second/first speed stage shift-down start time point is substantially same as the rotational speed of the rotational power that defines the first/second speed stage shift-up start time point.

10. The transmission structure according to claim 1 further comprising:
a travel output shaft that outputs the drive rotational power toward the driving wheel;
a forward-side transmission mechanism and a rearward-side transmission mechanism that operatively transmit the rotational power of the speed change output shaft to the travel output shaft as a forward drive rotational power and a rearward drive rotational power, respectively, and
a friction plate type forward-side clutch mechanism and a friction plate type rearward-side clutch mechanism that engage and disengage the power transmissions of the forward-side transmission mechanism and rearward-side transmission mechanism, respectively, wherein
the HST is capable of outputting the rotational power in both forward and reverse directions so that the HST output having the first HST speed is the rotational power in one of the forward and rearward directions and the HST output having the second HST speed is the rotational power in the other one of the forward and rearward directions,
the planetary gear mechanism is so configured that the rotational speed of the combined rotational power output from the second element is increased as the rotational speed of the HST output is changed from the first HST speed side to the second HST speed side in the first HMT transmitting state, and the rotational speed of the combined rotational power output from the first element is increased as the rotational speed of the HST output is changed from the second HST speed side to the first HST speed side in the second HMT transmitting state, the first speed stage area includes a forward-side first speed stage area and a rearward-side first speed stage area, the second speed stage area includes a forward-side second speed stage area higher than the forward-side first speed stage area and a rearward-side second speed stage area higher than the rearward-side first speed stage area, and the control device causes the forward-side clutch mechanism and the rearward-side clutch mechanism to be engaged and disengaged, respectively, in response to the operation of the speed-change operating member to the forward side, and causes the forward-side clutch mechanism and the rearward-side clutch mechanism to be disengaged and engaged, respectively, in response to the operation of the speed-change operating member to the rearward side.

11. The transmission structure according to claim 10, wherein:
the forward-side and rearward-side clutch mechanisms each is of a hydraulic type in which the engagement state and the disengagement state are switched in response to supply and discharge of operation oil, and
the transmission structure is provided with a forward-rearward switch solenoid valve pair including forward-side and rearward-side solenoid valves that switch supply and discharge of the operation oil to and from the forward-side and rearward-side clutch mechanisms, respectively, in response to the control by the control device.

12. The transmission structure according to claim 10, further comprising:
an output-side third transmission mechanism capable of operatively transmitting, as a forward drive rotational power, the rotational power of the first element to the travel output shaft, the output-side third transmission mechanism having a speed change ratio set so that the rotational speed of the travel output shaft that is realized when the rotational power of the first element is operatively transmitted to the travel output shaft via the output-side third transmission mechanism is higher than that of the travel output shaft that is realized when the rotational power of the first element is operatively transmitted to the travel output shaft via the output-side second transmission mechanism and the forward-side transmission mechanism, and
an output-side third clutch mechanism that engages and disengages the power transmission of the output-side third transmission mechanism, wherein
the speed-change operating member is also operable in a forward-side third speed stage area higher than the forward-side second speed stage area,
when the speed-change operating member is positioned in the forward-side third speed stage area, the control device brings the output-side first and second clutch mechanisms into the disengagement state and also brings the output-side third clutch mechanism into the engagement state with realizing the second HMT transmitting state, and then also operates the HST speed change actuator such that the rotational speed of the drive rotational power becomes the rotational speed that corresponds to the operating position of the speed-change operating member,
when the speed-change operating member is shifted up from the forward-side second speed stage area to the forward-side third speed stage area, the control device causes, at a second/third speed stage shift-up start time point when the drive rotational power has reached a predetermined second/third speed stage shift-up start speed, the output-side second clutch mechanism and the forward-side clutch mechanism to be instantly shifted from the engagement state to the disengagement state, and causes, at a second/third speed stage shift-up end time point after an elapse of a predetermined time from the second/third speed stage shift-up start time point, the output-side third clutch mechanism to be shifted from the disengagement state to the engagement state, thereby to realize a shift-up free-running state in which the power transmission to the travel output shaft is cut off during the period from the second/third speed stage shift-up start time point to the second/third speed stage shift-up end time point, and the control device changes, during the shift-up free-running state, the rotational speed of the HST output via the HST speed change actuator so that the rotational speed of the travel output shaft that is driven, at the second/third speed stage shift-up end time point, by the rotational power operatively transmitted via the output-side third transmission mechanism matches or approaches the rotational speed of the travel output shaft that is driven, at the second/third speed stage shift-up start time point, by the rotational power operatively transmitted via the output-side second transmission mechanism and the forward-side transmission mechanism.

13. The transmission structure according to claim 10, further comprising:

an output-side third transmission mechanism capable of operatively transmitting, as a forward drive rotational power, the rotational power of the first element to the travel output shaft, the output-side third transmission mechanism having a speed change ratio set so that the rotational speed of the travel output shaft that is realized when the rotational power of the first element is operatively transmitted to the travel output shaft via the output-side third transmission mechanism is higher than that of the travel output shaft that is realized when the rotational power of the first element is operatively transmitted to the travel output shaft via the output-side second transmission mechanism and the forward-side transmission mechanism, and an output-side third clutch mechanism that engages and disengages the power transmission of the output-side third transmission mechanism, wherein the speed-change operating member is also operable in a forward-side third speed stage area higher than the forward-side second speed stage area, when the speed-change operating member is positioned in the forward-side third speed stage area, the control device brings the output-side first and second clutch mechanisms into the disengagement state and also brings the output-side third clutch mechanism into the engagement state with realizing the second HMT transmitting state, and then also operates the HST speed change actuator such that the rotational speed of the drive rotational power becomes the rotational speed that corresponds to the operating position of the speed-change operating member, when the speed-change operating member is shifted up from the forward-side second speed stage area to the forward-side third speed stage area, the control device causes one of the output-side second clutch mechanism and the forward-side clutch mechanism to be gradually shifted from the engagement state to the disengagement state while having the friction plates frictionally slid, causes, after an elapse of a predetermined time from the time point when the one of the output-side second clutch mechanism and the forward-side clutch mechanism is shifted to the disengagement state, the other one of the output-side second clutch mechanism and the forward-side clutch mechanism to be shifted from the engagement state to the disengagement state, and causes, after an elapse of a predetermined time from the time point when the other one of the output-side second clutch mechanism and the forward-side clutch mechanism is shifted to the disengagement state, the output-side third clutch mechanism to be shifted from the disengagement state to the engagement state, thereby to realize a shift-up free-running state in which the power transmission to the travel output shaft is cut off during the period from the time point when the one of the output-side second clutch mechanism and the forward-side clutch mechanism is shifted to the disengagement state until the time point when the output-side third clutch mechanism is shifted to the engagement state, and the control device changes, during the shift-up free-running state, the rotational speed of the HST output via the HST speed change actuator so that the rotational speed of the travel output shaft that is driven, at the time point when the output-side third clutch mechanism is shifted to the engagement state, by the rotational power operatively transmitted via the output-side third transmission mechanism matches or approaches the actual rotational speed realized on the travel output shaft just before the output-side third clutch mechanism is shifted to the engagement state.

14. The transmission structure according to claim 10, further comprising:

an output-side third transmission mechanism capable of operatively transmitting, as a forward drive rotational power, the rotational power of the first element to the travel output shaft, the output-side third transmission mechanism having a speed change ratio set so that the rotational speed of the travel output shaft that is realized when the rotational power of the first element is operatively transmitted to the travel output shaft via the output-side third transmission mechanism is higher than that of the travel output shaft that is realized when the rotational power of the first element is operatively transmitted to the travel output shaft via the output-side second transmission mechanism and the forward-side transmission mechanism, and an output-side third clutch mechanism that engages and disengages the power transmission of the output-side third transmission mechanism, wherein the speed-change operating member is also operable in a forward-side third speed stage area higher than the forward-side second speed stage area, when the speed-change operating member is positioned in the forward-side third speed stage area, the control device brings the output-side first and second clutch mechanisms into the disengagement state and also brings the output-side third clutch mechanism into the engagement state with realizing the second HMT transmitting state, and then also operates the HST speed change actuator such that the rotational speed of the drive rotational power becomes the rotational speed that corresponds to the operating position of the speed-change operating member, when the speed-change operating member is shifted up from the forward-side second speed stage area to the forward-side third speed stage area, the control device causes the output-side second clutch mechanism to be gradually shifted from the engagement state to the disengagement state while having the friction plates frictionally slid and causes the output-side third clutch mechanism to be gradually shifted from the disengagement state to the engagement state while having the friction plates frictionally slid, and also causes the forward-side clutch mechanism to be shifted from the engagement to the disengagement before the output-side third clutch mechanism is shifted to the engagement state, thereby to realize a shift-up free-running state in which the power transmission to the travel output shaft is cut off during the period from the time point when the forward-side clutch mechanism is shifted to the disengagement state until the time point when the output-side third clutch mechanism is shifted to the engagement state, and the control device changes, during the shift-up free-running state, the rotational speed of the HST output via the HST speed change actuator so that the rotational speed of the travel output shaft that is driven, at the time point when the output-side third clutch mechanism is shifted to the engagement state, by the rotational power operatively transmitted via the output-side third transmission mechanism matches or approaches the actual rotational speed realized on the travel output shaft just before the output-side third clutch mechanism is shifted to the engagement state.

15. The transmission structure according to claim 12, wherein:

the output-side third clutch mechanism is of a hydraulic type in which the engagement state and the disengagement state are switched in response to supply and discharge of operation oil, and the transmission structure is provided with an output-side third solenoid valve that switches supply and discharge of the operation oil to and from the output-side third clutch mechanism, in response to the control by the control device.

16. The transmission structure according to claim 12, wherein:

when the speed-change operating member is shifted down from the forward-side third speed stage area to the forward-side second speed stage area, the control device causes, at a third/second speed stage shift-down start time point when the drive rotational power has reached a predetermined third/second speed stage shift-down start speed, the output-side third clutch mechanism to be shifted from the engagement state to the disengagement state, and causes, at a third/second speed stage shift-up end time point after an elapse of a predetermined time from the third/second speed stage shift-up start time point, the output-side second clutch mechanism and the forward-side clutch mechanism to be shifted from the disengagement state to the engagement state, thereby to realize a shift-down free-running state in which the power transmission to the travel output shaft is cut off during the period from the third/second speed stage shift-down start time point until the third/second speed stage shift-down end time point, and the control device changes, during the shift-down free-running state, the rotational speed of the HST output via the HST speed change actuator so that the rotational speed of the travel output shaft that is driven, at the third/second speed stage shift-down end time point, by the rotational power operatively transmitted via the output-side second transmission mechanism and the forward-side transmission mechanism matches or approaches the rotational speed of the travel output shaft that is driven, at the third/second speed stage shift-down start time point, by the rotational power operatively transmitted via the output-side third transmission mechanism.

17. The transmission structure according to claim 16, wherein the third/second speed stage shift-down start speed is substantially same as the second/third speed stage shift-up start speed.

18. The transmission structure according to claim 10, further comprising:

an output-side third transmission mechanism capable of operatively transmitting, as a forward drive rotational power, the rotational power of the first element to the travel output shaft, the output-side third transmission mechanism having a speed change ratio set so that the rotational speed of the travel output shaft that is realized when the rotational power of the first element is operatively transmitted to the travel output shaft via the output-side third transmission mechanism is higher than that of the travel output shaft that is realized when the rotational power of the first element is operatively transmitted to the travel output shaft via the output-side second transmission mechanism and the forward-side transmission mechanism, and an output-side third clutch mechanism that engages and disengages the power transmission of the output-side third transmission mechanism, wherein the speed-change operating member is also operable in a forward-side third speed stage area higher than the forward-side second speed stage area, when the speed-change operating member is positioned in the forward-side third speed stage area, the control device brings the output-side first and second clutch mechanisms into the disengagement state and also brings the output-side third clutch mechanism into the engagement state with realizing the second HMT transmitting state, and then also operates the HST speed change actuator such that the rotational speed of the drive rotational power becomes the rotational speed that corresponds to the operating position of the speed-change operating member, when the speed-change operating member is shifted down from the forward-side third speed stage area to the forward-side second speed stage area, the control device performs the shifting movement of the output-side third clutch mechanism from the engagement state to the disengagement state, the shifting movement of the forward-side clutch mechanism from the disengagement state to the engagement state and the shifting movement of the output-side second clutch mechanism from the disengagement state to the engagement state in this order, thereby to realize a shift-down free-running state in which the power transmission to the travel output shaft is cut off during the period from the time point when the output-side third clutch mechanism is shifted to the disengagement state until the time point when the output-side second clutch mechanism is shifted to the engagement state, and the control device changes, during the shift-down free-running state, the rotational speed of the HST output via the HST speed change actuator so that the rotational speed of the travel output shaft that is driven, at the time point when the output-side second clutch mechanism is shifted to the engagement state, by the rotational power operatively transmitted via the output-side second transmission mechanism and the forward-side transmission mechanism matches or approaches the actual rotational speed that is realized on the travel output shaft just before the output-side second clutch mechanism is shifted to the engagement state.

19. The transmission structure according to claim 10, further comprising:
an output-side third transmission mechanism capable of operatively transmitting, as a forward drive rotational power, the rotational power of the first element to the travel output shaft, the output-side third transmission mechanism having a speed change ratio set so that the rotational speed of the travel output shaft that is realized when the rotational power of the first element is operatively transmitted to the travel output shaft via the output-side third transmission mechanism is higher than that of the travel output shaft that is realized when the rotational power of the first element is operatively transmitted to the travel output shaft via the output-side second transmission mechanism and the forward-side transmission mechanism, and
an output-side third clutch mechanism that engages and disengages the power transmission of the output-side third transmission mechanism, wherein
the speed-change operating member is also operable in a forward-side third speed stage area higher than the forward-side second speed stage area,
when the speed-change operating member is positioned in the forward-side third speed stage area, the control device brings the output-side first and second clutch mechanisms into the disengagement state and also brings the output-side third clutch mechanism into the engagement state with realizing the second HMT transmitting state, and then also operates the HST speed change actuator such that the rotational speed of the drive rotational power becomes the rotational speed that corresponds to the operating position of the speed-change operating member,
when the speed-change operating member is shifted down from the forward-side third speed stage area to the forward-side second speed stage area, the control device performs the shifting movement of the output-side third clutch mechanism from the engagement state to the disengagement state, the shifting movement of the output-side second clutch mechanism from the disengagement state to the engagement state and the shifting movement of the forward-side clutch mechanism from the disengagement state to the engagement state and in this order, thereby to realize a shift-down free-running state in which the power transmission to the travel output shaft is cut off during the period from the time point when the output-side third clutch mechanism is shifted to the disengagement state until the time point when t the forward-side clutch mechanism is shifted to the engagement state,
the control device changes, during a period between the time point when the output-side third clutch mechanism is shifted from the engagement state to the disengagement state and the time point when the output-side second clutch mechanism is shifted from the disengagement state to the engagement state, the rotational speed of the HST output via the HST speed change actuator so that the rotational speed of the speed change output shaft that is driven, at the time point when the output-side second clutch mechanism is shifted from the disengagement state to the engagement state, by the rotational power operatively transmitted via the output-side second transmission mechanism matches or approaches the actual rotational speed that is realized on the speed change output shaft just before the output-side second clutch mechanism is shifted to the engagement state, and
the control device changes, during a period between the time point when the output-side second clutch mechanism is shifted to the engagement state and the time point when the forward-side clutch mechanism is shifted to the engagement state, the rotational speed of the HST output via the HST speed change actuator so that the rotational speed of the travel output shaft that is driven via the output-side second transmission mechanism and the forward-side transmission mechanism at the time point when the forward-side clutch mechanism is shifted from the disengagement state to the engagement state matches or approaches the actual rotational speed realized on the travel output shaft just before the forward-side clutch mechanism is shifted to the engagement state.

20. The transmission structure according to claim 18, wherein the shifting movement of the output-side second clutch mechanism from the disengagement state to the engagement state in the shift-down operation from the forward-side third speed stage to the forward-side second speed stage is gradually performed.

21. The transmission structure according to claim 13, wherein:
during a start period from the speed stage shift-up start time point when starting the shifting movement from the forward-side second speed stage to the forward-side third speed stage until a time point after an elapse of a predetermined time from the speed stage shift-up start time point, the control device sets, as a target rotational speed of the HST output, a rotational speed that is increased to an opposite side of a third-speed-stage-side second/third speed stage switch speed from the actual rotational speed of the HST output at the shift-up start time point when one of the output-side second clutch mechanism and the forward-side clutch mechanism is shifted to the disengagement state, the third-speed-stage-side second/third speed stage switch speed being set to a rotational speed that makes the rotational speed of the travel output shaft, which is driven by the rotational power operatively transmitted via the output-side third transmission mechanism at the time when the output-side third clutch mechanism is shifted to the engagement state, coincident with the rotational speed of the travel output shaft at the shift-up start time point, and
after the start period, the control device sets, as the target rotational speed of the HST output, a rotational speed of the HST output that causes the rotational speed of the travel output shaft, which is driven by the rotational power operatively transmitted via the output-side third transmission mechanism at the time point when the output-side third clutch mechanism is shifted to the engagement state, to match the actual rotational speed realized on the travel output shaft just before the output-side third clutch mechanism is shifted to the engagement state.

22. The transmission structure according to claim 21, wherein the target rotational speed in the HST speed-change control during the start period is set to one of the first and second HST speeds that is positioned on an opposite side of the actual rotational speed of the HST output at the shift-up start time point.

23. The transmission structure according to claim 18, wherein:

during a start period from the speed stage shift-down start time point when starting the shifting movement from the forward-side third speed stage to the forward-side second speed stage until a time point after an elapse of a predetermined time from the speed stage shift-down start time point, the control device sets, as a target rotational speed of the HST output, a rotational speed that is increased to an opposite side of a second-speed-stage-side third/second speed stage switch speed from the actual rotational speed of the HST output at the shift-down start time point, the second-speed-stage-side third/second speed stage switch speed being set to a rotational speed that makes the rotational speed of the travel output shaft, which is driven by the rotational power operatively transmitted via the output-side second transmission mechanism and the forward-side transmission mechanism at the time when the output-side second clutch mechanism is shifted to the engagement state, coincident with the rotational speed of the travel output shaft, which is driven by the rotational power operatively transmitted via the output-side third transmission mechanism at the shift-down start time point, and after the start period, the control device sets, as the target rotational speed of the HST output, a rotational speed of the HST output that causes the rotational speed of the travel output shaft, which is driven by the rotational power operatively transmitted via the output-side second transmission mechanism and the forward-side transmission mechanism at the time point when the output-side second clutch mechanism (80b) is shifted to the engagement state, to match the actual rotational speed realized on travel output shaft just before the output-side second clutch mechanism is shifted to the engagement state.

24. The transmission structure according to claim 23, wherein the target rotational speed of the HST output during the start period is set to one of the first and second HST speeds that is positioned on an opposite side of the actual rotational speed of the HST output at the shift-down start time point.

* * * * *